(12) United States Patent
Rossano Rivera

(10) Patent No.: US 12,448,195 B1
(45) Date of Patent: Oct. 21, 2025

(54) REINFORCED CONTAINMENT SYSTEM

(71) Applicant: RING CIRCULAR LOGISTICS S.A. DE C.V., Naucalpan de Juárez (MX)

(72) Inventor: Luis Jesus Rossano Rivera, Puebla (MX)

(73) Assignee: RING CIRCULAR LOGISTICS S.A. DE C.V. (MX)

( * ) Notice: Subject to any disclaimer, the term of this patent is extended or adjusted under 35 U.S.C. 154(b) by 0 days.

(21) Appl. No.: 18/736,641

(22) Filed: Jun. 7, 2024

(51) Int. Cl.
| B65D 25/14 | (2006.01) |
| B65D 25/20 | (2006.01) |
| B65D 25/28 | (2006.01) |
| B65D 43/16 | (2006.01) |
| B65D 77/04 | (2006.01) |

(52) U.S. Cl.
CPC ......... B65D 77/0453 (2013.01); B65D 25/14 (2013.01); B65D 25/20 (2013.01); B65D 25/28 (2013.01); B65D 43/163 (2013.01)

(58) Field of Classification Search
CPC ........ B65D 25/14; B65D 25/20; B65D 25/28; B65D 43/163; B65D 77/0453
USPC ............... 206/509, 511; 220/495.01, 495.03, 220/495.06
See application file for complete search history.

(56) References Cited

U.S. PATENT DOCUMENTS

| 2017/0101229 | A1* | 4/2017 | Perek ................... B65D 43/163 |
| 2022/0106100 | A1* | 4/2022 | Clair ...................... A23B 2/708 |
| 2022/0348395 | A1* | 11/2022 | Kagimoto .......... B65D 81/3818 |
| 2022/0386579 | A1* | 12/2022 | Stokes ................... B65D 53/00 |
| 2023/0092514 | A1* | 3/2023 | Brocket ................ B25H 3/021 |
| | | | 206/509 |

* cited by examiner

Primary Examiner — Luan K Bui
(74) Attorney, Agent, or Firm — Defillo & Associates, Inc.; Evelyn A. Defillo

(57) ABSTRACT

A reinforced containment system for transferring a cargo from one point to another that includes an internal container housed in an external container covered by a cover where the external container and the internal container are stackable or maintain a configuration that allows them to be stackable, attachable and at the same time have insertion and a support device that allow a single particularly advantageous arrangement mode during treatment and handling of the transported cargo.

15 Claims, 56 Drawing Sheets

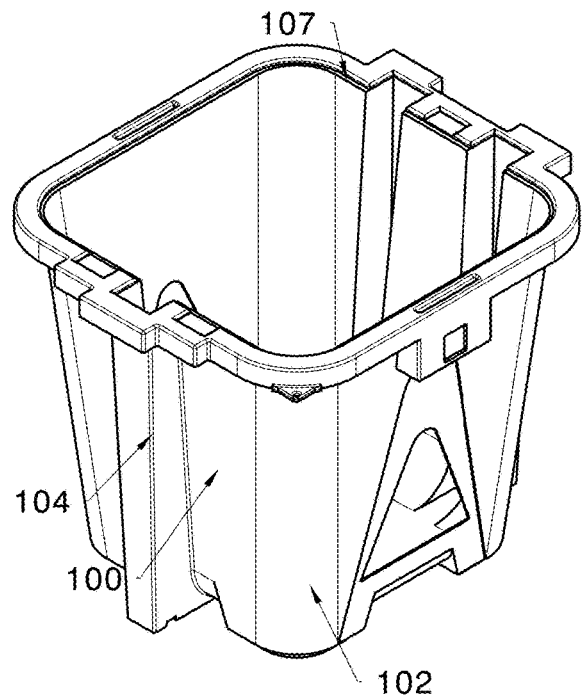 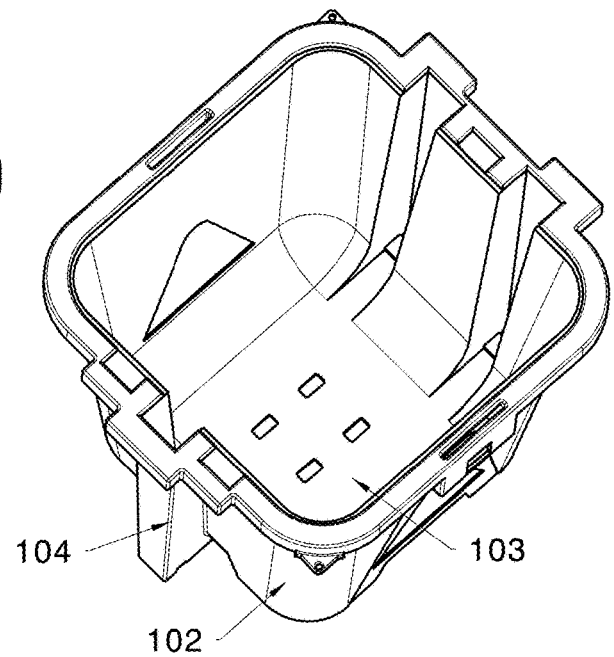
Figure 21a   Figure 21b
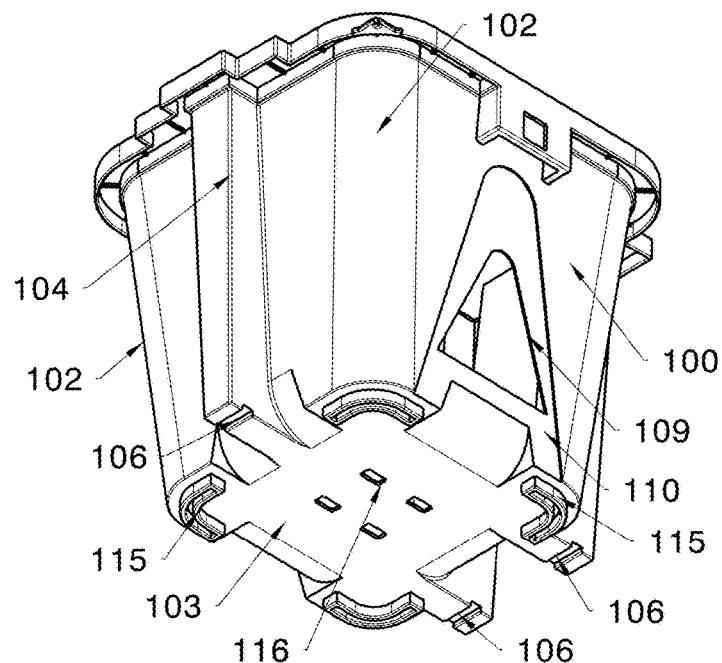
Figure 21c

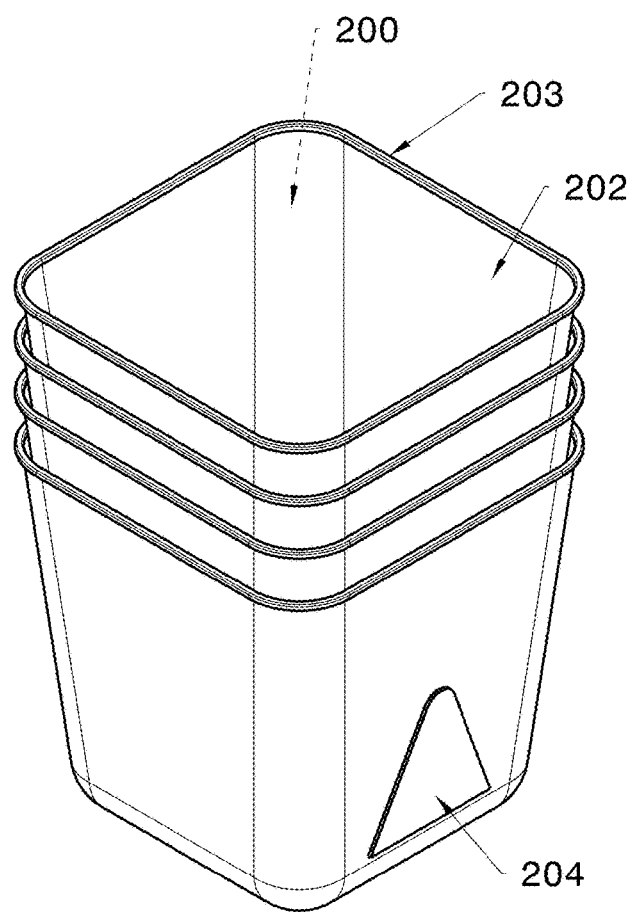
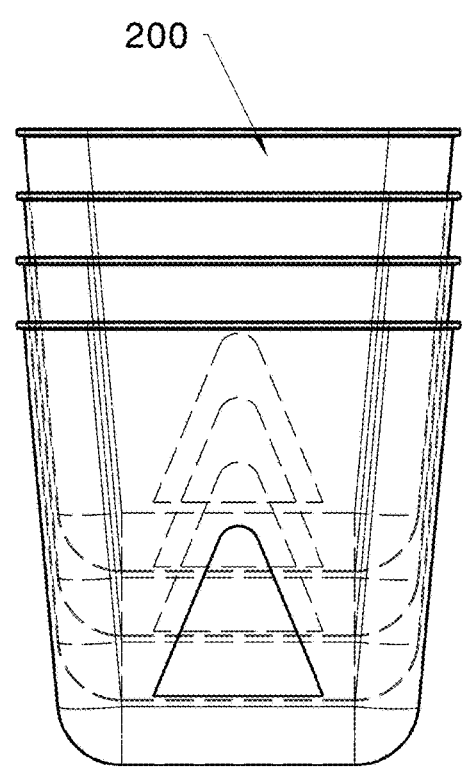
Figure 33
Figure 34

REINFORCED CONTAINMENT SYSTEM

TECHNICAL FIELD

The present invention pertains to the technical field of logistics and transportation, particularly to the field of equipment for performing operations of packaging; storage, and handling of materials, objects, substances and/or articles housed in containers as substitutes for bags, barrels, bottles, boxes, cans, cages, drums, jars, tanks, hoppers, or wooden containers. Moreover, the invention includes accessories for samples, stackable arrangements, arrangement of accommodation, reinforcements and closing means where it is also permissible to implement packaging sealing of packages, tracking, monitoring, among others.

BACKGROUND OF THE INVENTION

It is known that the use of containers has been used for many years to fulfill logistics and transportation activities for materials or objects. Traditionally, bags, boxes or some type of sealable receptacle body are manufactured with a configuration that prevents contact with the exterior, which can be made from different types of materials such as wood, plastic, metal or cellulose involving various manufacturing methods and depending on the use may even include means to promote easier handling in packing or accommodating tasks for the use of external machinery such as forklifts, elevators or hydraulic systems. However, while the problem of transport has been addressed by involving means for the transfer where the intervention of a machine or vehicle that lifts, accommodates and transfers a set of containers is sufficient, these containers are often difficult to handle especially in terms of logistics during transportation when they reach their final destination, which is when a user interacts directly with the container individually to dispose of the transported cargo.

Directly with the container, there are particular inconveniences during accommodation, preventing an orderly intervention, especially when the space available for such purposes is limited and/or a specific order with a specific sequence or stackable configuration is required to perform activities with the transported article or substance.

Additional problems during the transportation of objects involve the safety of the transported cargo. Often, the containers used for transportation do not have an appropriate stacking and accommodation arrangement suitable for the transported objects, initially affecting the transported product and even more so, the established safety protocols for loads near to the transported cargo. Moreover, related to potential damage to the transported product, there is a risk of damage due to extreme weather conditions or accidents during transportation, which can cause significant economic losses associated with the cargo as well as difficulties in delivering within an agreed time.

A traditional container comprises elements such as a body with a housing cavity, an opening or even an access gate and a locking or closing device that, during use, the cavity body is filled entirely or partially with objects or substances for transportation. Typically, the opening or gate is configured to be open in such a way that materials, utensils, objects or substances can be deposited inside, preventing any of these from falling out of the container while the locking or closing device is used to secure the opening or door in its closed position, thus preventing materials from being removed from the housing cavity. Often, this locking or closing device comprises a lock that can be opened by a key or combination to allow access to the objects deposited inside the container. It is also common for traditional containers to be identified with some type of label or marking to indicate what type of materials should be deposited in them; these labels can be printed directly on the body of the container or adhered to it.

In a not insignificant aspect and in view of the increased environmental awareness and the need for more efficient recycling methods, traditional containers fail to provide a structural arrangement that allows for a configuration better equipped with arrangements that allow for quick container recovery. The solutions presented so far have only consisted of using a simpler, lighter arrangement with thinner walls or involving materials made of cellulose such as cardboard for the manufacture of containers. However, this greatly compromises the transported cargo because, in the event of impact or vibrations causing displacement, the container may simply not withstand and could suffer structural failure. Therefore, there is a need to provide a structural arrangement that allows the cargo to be sufficiently protected and at the same time can provide (the container) a quick disposition for recycling in case it is not reused.

Another problem in the current technique is the lack of monitoring and control during the transportation of the cargo, as in many cases, the transported objects are vulnerable to theft, vandalism, and other actions due to improper use or handling of the containers used, especially in high-risk areas. This requires additional security measures, such as the implementation of seals or tracking, which in most cases, with the intention of not causing damage to the cargo, is placed in an improvised manner at best with a means that prevents its fall. Therefore, an additional problem concerns the lack of tracking means for the container, which can cause errors with consequences such as delays in the delivery of the cargo and even damage to the cargo because the time allocated for transportation is of paramount importance for its preservation, as in the case of food. Additionally, the lack of coordination between the different actors in cargo transport, such as the supplier, carrier, and final customer, can generate confusion and delays in the delivery of the cargo.

Finally, another problem associated with this field occurs during the use of containers in the final stage of object or substance transfer due to the lack of training of the personnel responsible for handling, transporting, and finally, as a particularly relevant action, disposing of the cargo stored in the container. This leads to handling errors of the containers, potentially causing damage to the objects, articles, or contamination of the transferred substances, which can result in irreparable damage to the cargo or even injuries to the personnel. This is because containers, in general, do not have a safe, intuitive structure for handling and a foolproof configuration that serves as a barrier to possible improper stacking, incorrect assembly, or overloading of the container. The traditional handling of a container is through the means of restraint that somehow withstand the weight of the container cargo when it is carried from one point to another by a user, a step that seems to have no inconveniences. However, normally, the end user handles the container as they see fit to achieve order in the place where the cargo is destined, resulting in a consequent lack of standardization in the arrangement, treatment, and disposition of the containers, which invariably generates delays due to the execution of disorderly procedures that prevent the implementation of improvements or work organization methods focused on continuous improvement and optimization of a production line or system by eliminating waste, elements that generate disorder, and generally activities that add no value to the process, turning most current technique containers into an impediment to achieving efficient results in a workplace.

In summary, the current problems during the transportation of objects fall on the container's structure as the main measure, leading to issues such as safety aspects, improper arrangement of containers, potential risks of invasion or damage to the cargo by climatic and accidental agents, monitoring and control problems, handling, arrangement, coordination, and treatment of the container by personnel, as well as the handling of the container after use, which can affect both the transport entity and the supplier and end user, possibly even causing economic losses and delays in cargo delivery Therefore, it is important to provide a container that is part of a general containment system that addresses the aforementioned problems and consequently enables the implementation of new protocols for loading, transporting, and delivering cargo, as well as improvements in the coordination of the aforementioned aspects to ensure more adequate and safe transportation. Although containers have evolved over time to be more efficient and attractive, the basic containment function for transporting objects remains the same. Therefore, they are an essential part of any effective logistics program and help promote even a culture of order, protection for the transported objects, and, not least, environmental care. Consequently, the present invention aims to provide a containment system for cargo transportation that overcomes the previous problems.

BRIEF DESCRIPTION OF THE INVENTION

It is therefore a main object of protection, a reinforced containment system that comprises an external container that receives an internal container where both are covered by a cover attachable to the external container characterized in that the external container comprises inclined walls where the bottom has a smaller section with respect to the upper part that defines an entrance whose perimeter includes a load frame as well as edge columns on each of the lateral edges that extend from the top to the bottom of the external container as well as a bottom wall from which load columns are erected asymmetrically on opposite sides of the external container, comprising an extension facing the outside of the external container and a lower slot, the upper surface of the load frame also comprising column receivers in cavity shape and an internal loading flange for the internal container which encompasses the internal periphery of the loading frame, providing a lower level with respect to the level of the column receivers and which supports the upper periphery of the internal container when it is inserted into the external container. In turn, the internal container has a bottom whose external part is coincident with the internal portion of the bottom wall of the external container as well as rounded edges and side walls that rise from the bottom with a slope parallel to the side walls of the external container further providing a support frame coincident with the internal loading flange that protrudes or has a higher level with respect to the top of the loading frame when the internal container is inserted into the external container while the cover encompasses the outer periphery of the upper part of the external container and comprises movable pressure closing means on at least two of its sides as well as a receiving base for the lower part of the external container and an accommodation arrangement that comprises an assemblable configuration by means of an insertion portion and a portion receiver on opposite sides of the cover.

BRIEF DESCRIPTION OF THE FIGURES

FIG. 21a shows a top isometric view of the external container (100).

FIG. 21b shows a top isometric view of the external container (100).

FIG. 21c shows a lower isometric view of the external container (100).

FIG. 33 shows a top isometric view of the internal container (200) in a nestable arrangement.

FIG. 34 shows a side view of the internal container (200) in a nestable arrangement.

DETAILED DESCRIPTION OF THE INVENTION

Figure 1:
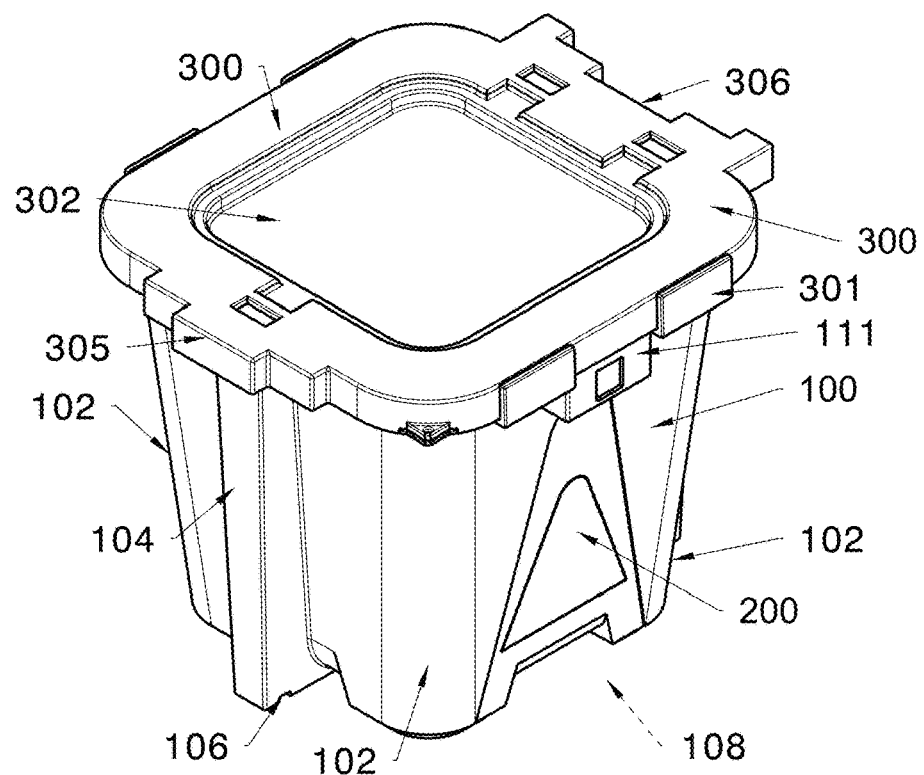
FIG. 1 shows a top-isometric view of the reinforced containment system.
Figure 2:
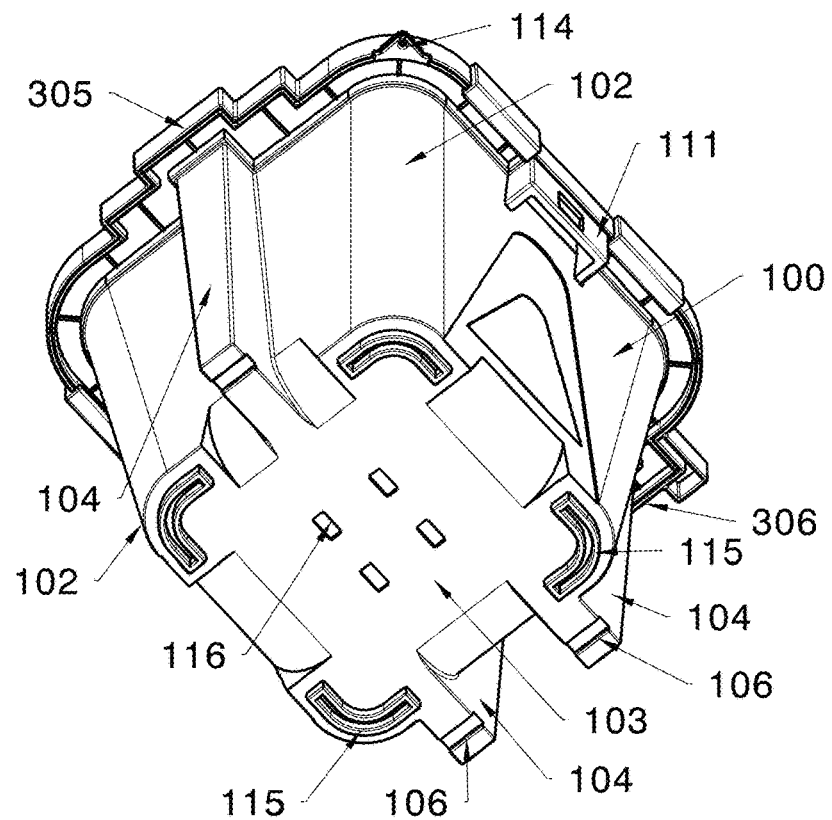
FIG. 2 shows a bottom-isometric view of the reinforced containment system.
Figure 3A:
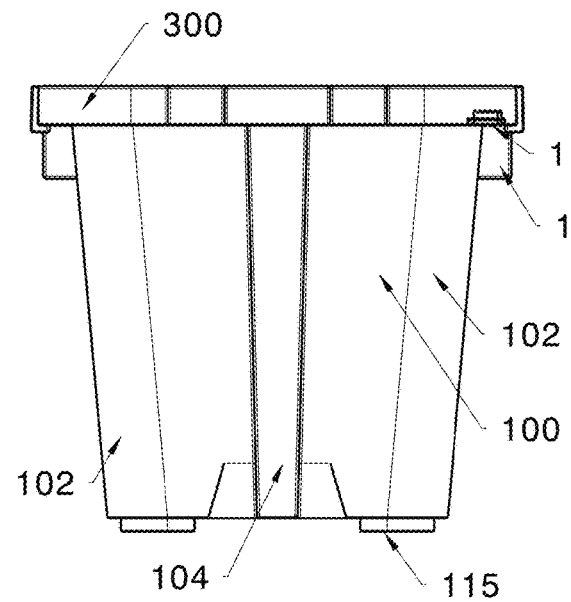
FIG. 3a shows a side view of the reinforced containment system with cover fastening means in closed position.
Figure 3B:
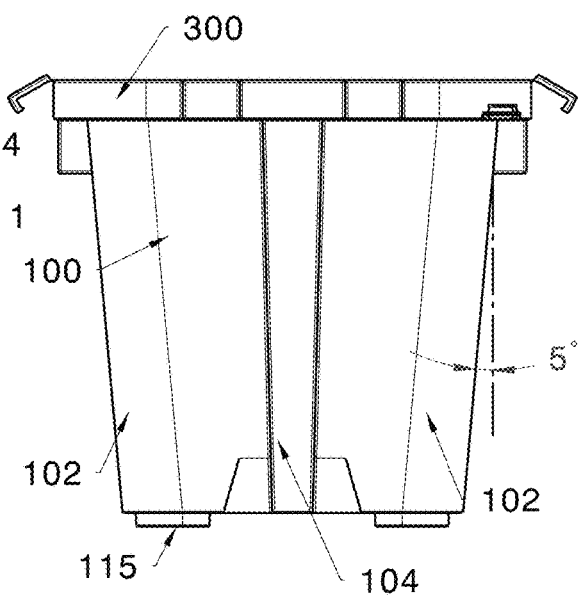
FIG. 3b shows a side view of the reinforced containment system with cover fastening means in open position.
Figure 3C:
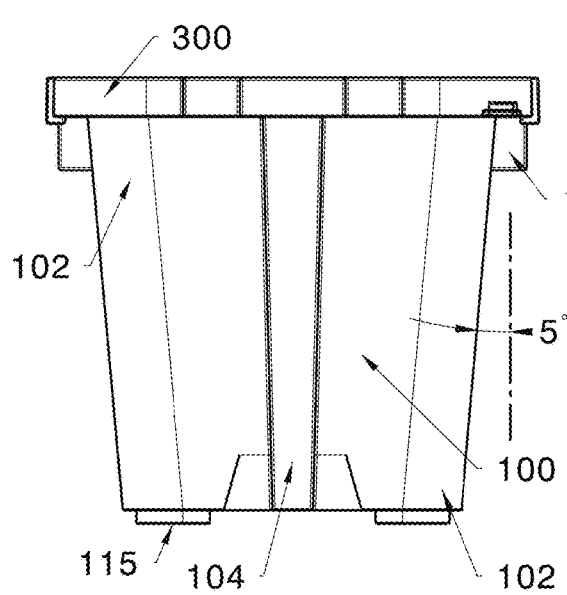
FIG. 3c shows a side view of the reinforced containment system with cover fastening means in closed position.
Figure 3D:
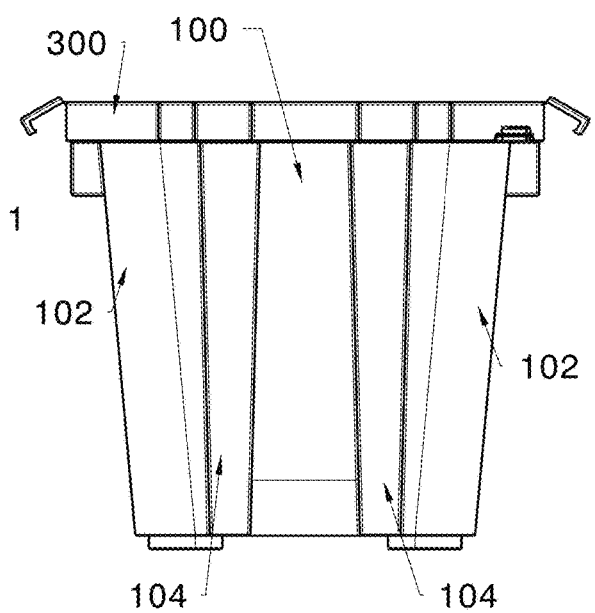
FIG. 3d shows a side view of the reinforced containment system with cover fastening means in the open position.
Figure 4:
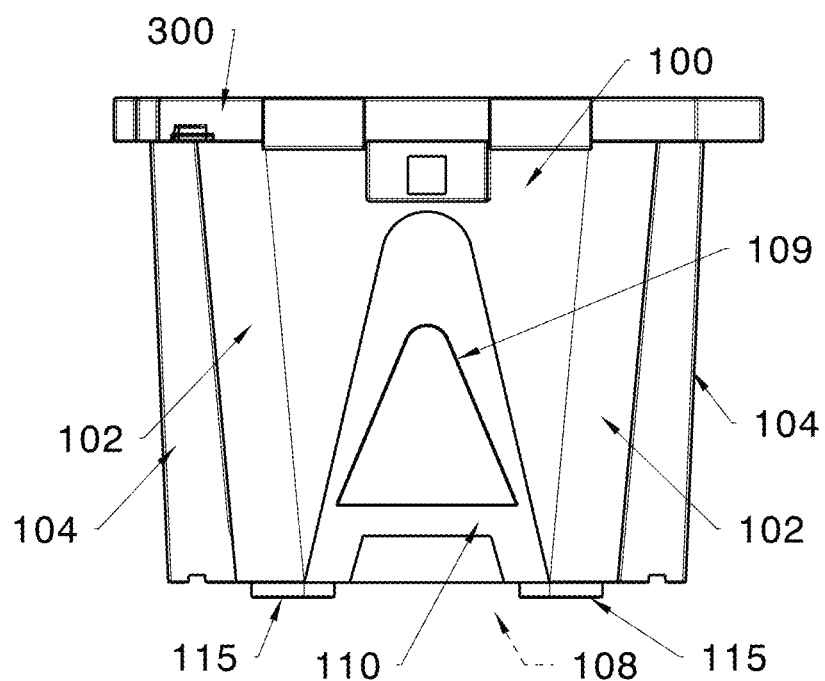
FIG. 4 shows a side view of the reinforced containment system.
Figure 5:
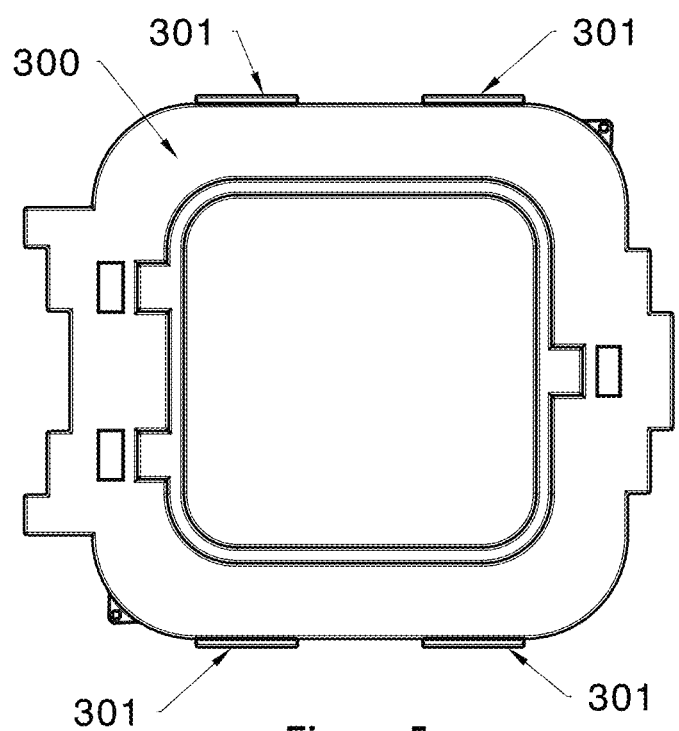
FIG. 5 shows a top view of the reinforced containment system.
Figure 6:
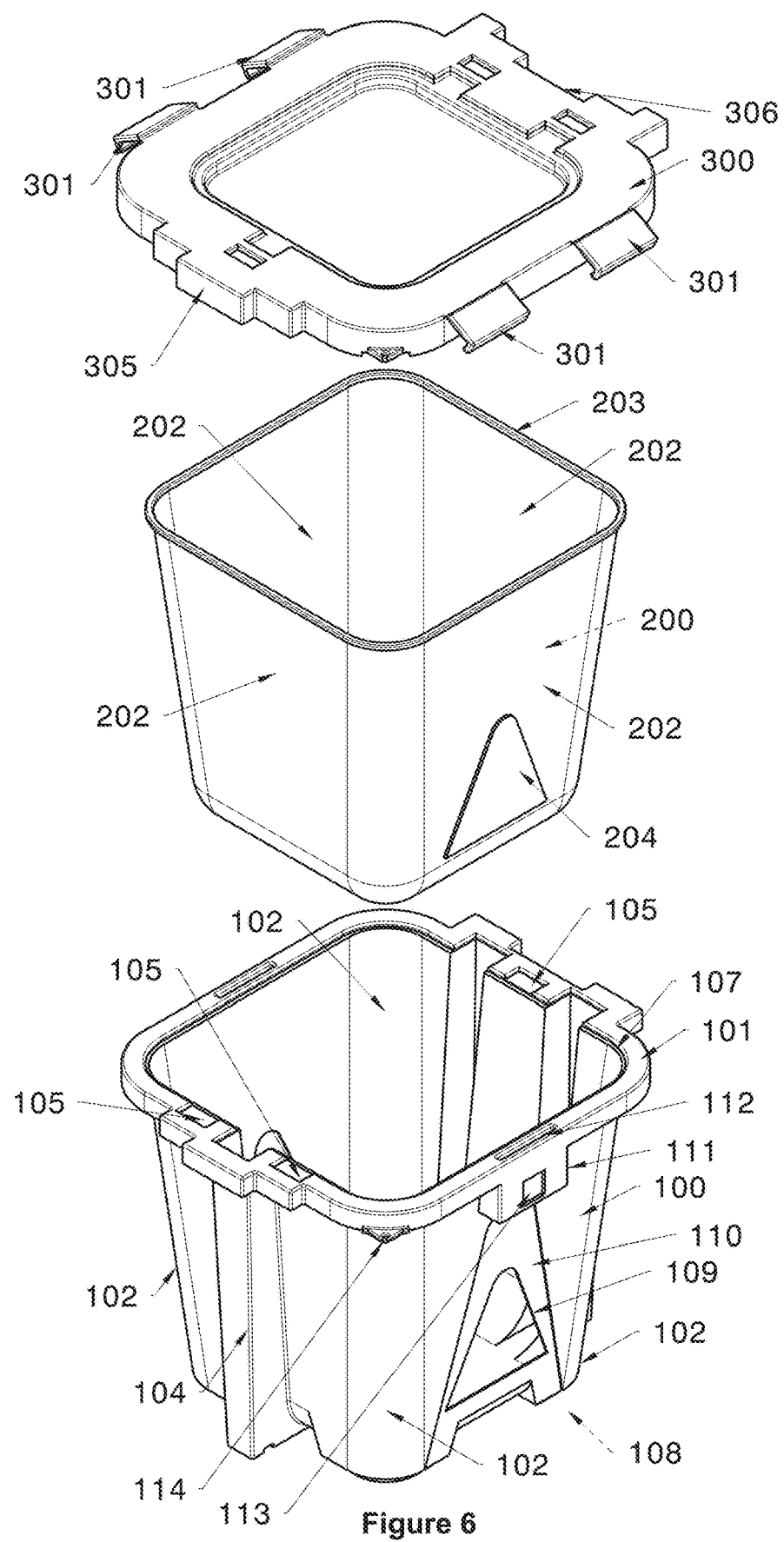
FIG. 6 shows a top exploded isometric view of the reinforced containment system.
Figure 7:
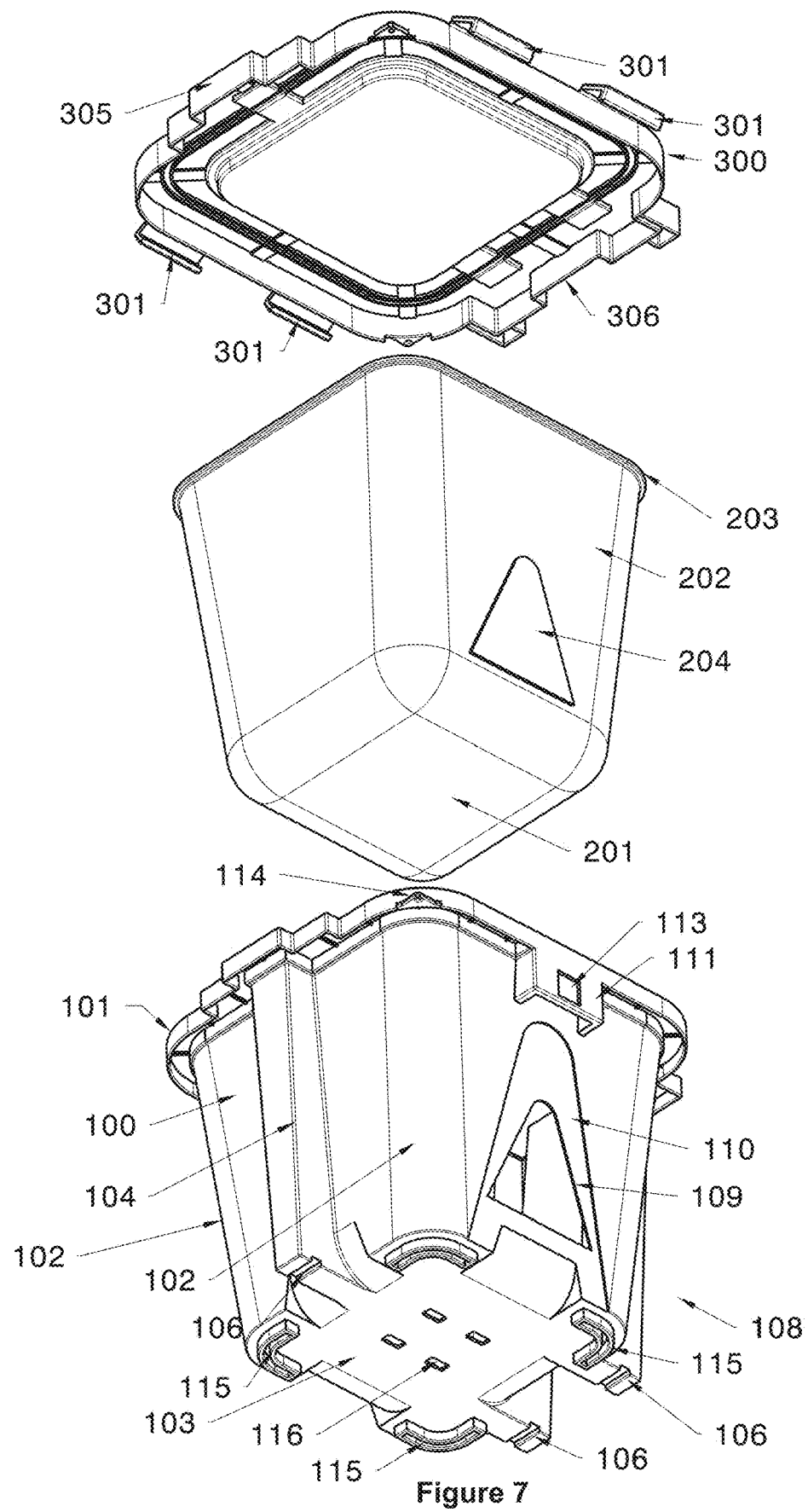
FIG. 7 shows a bottom exploded isometric view of the reinforced containment system.
Figure 8:
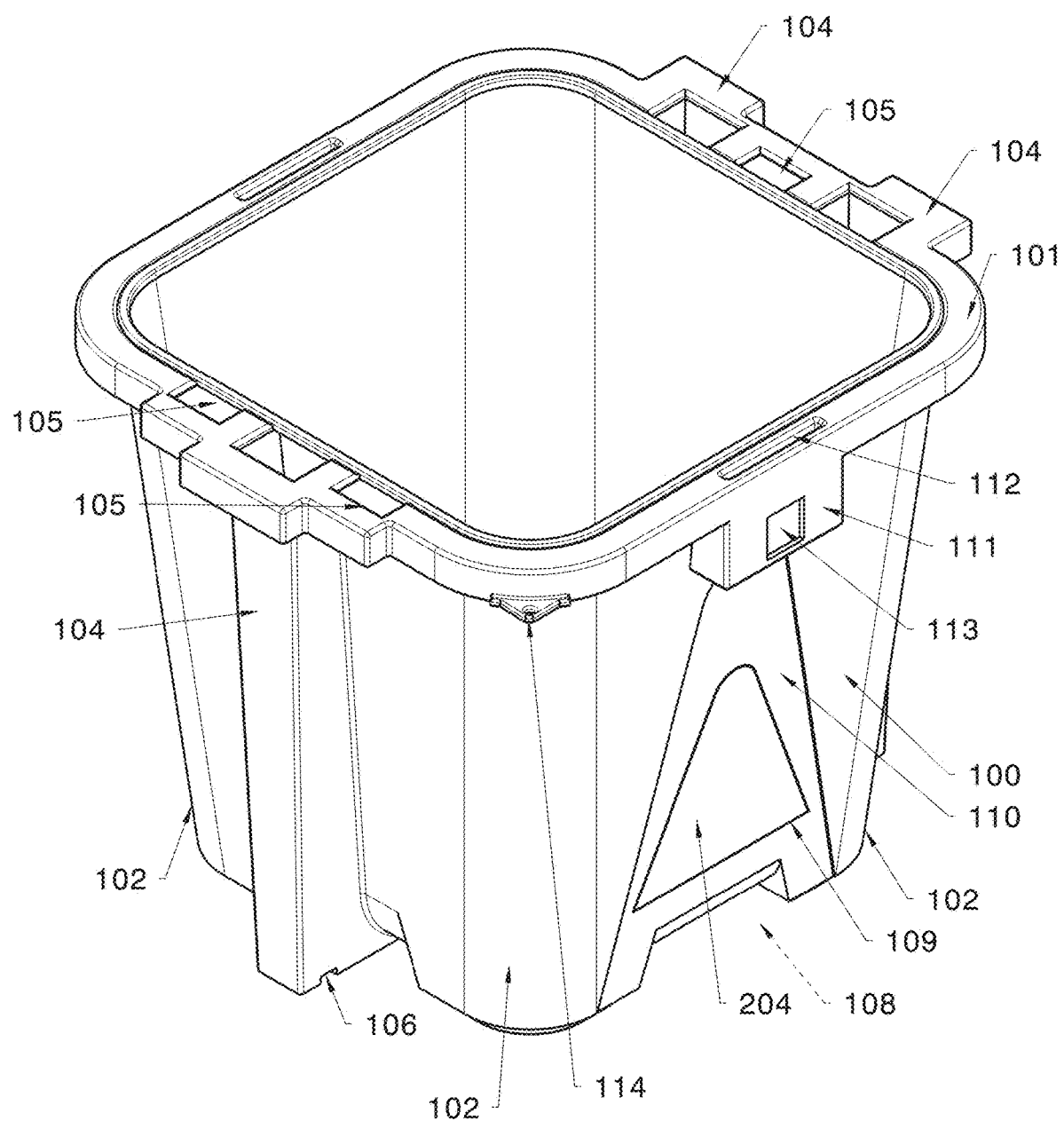
FIG. 8 shows a top isometric view of the external container (100) and the internal container (200) of the reinforced containment system.
Figure 9:
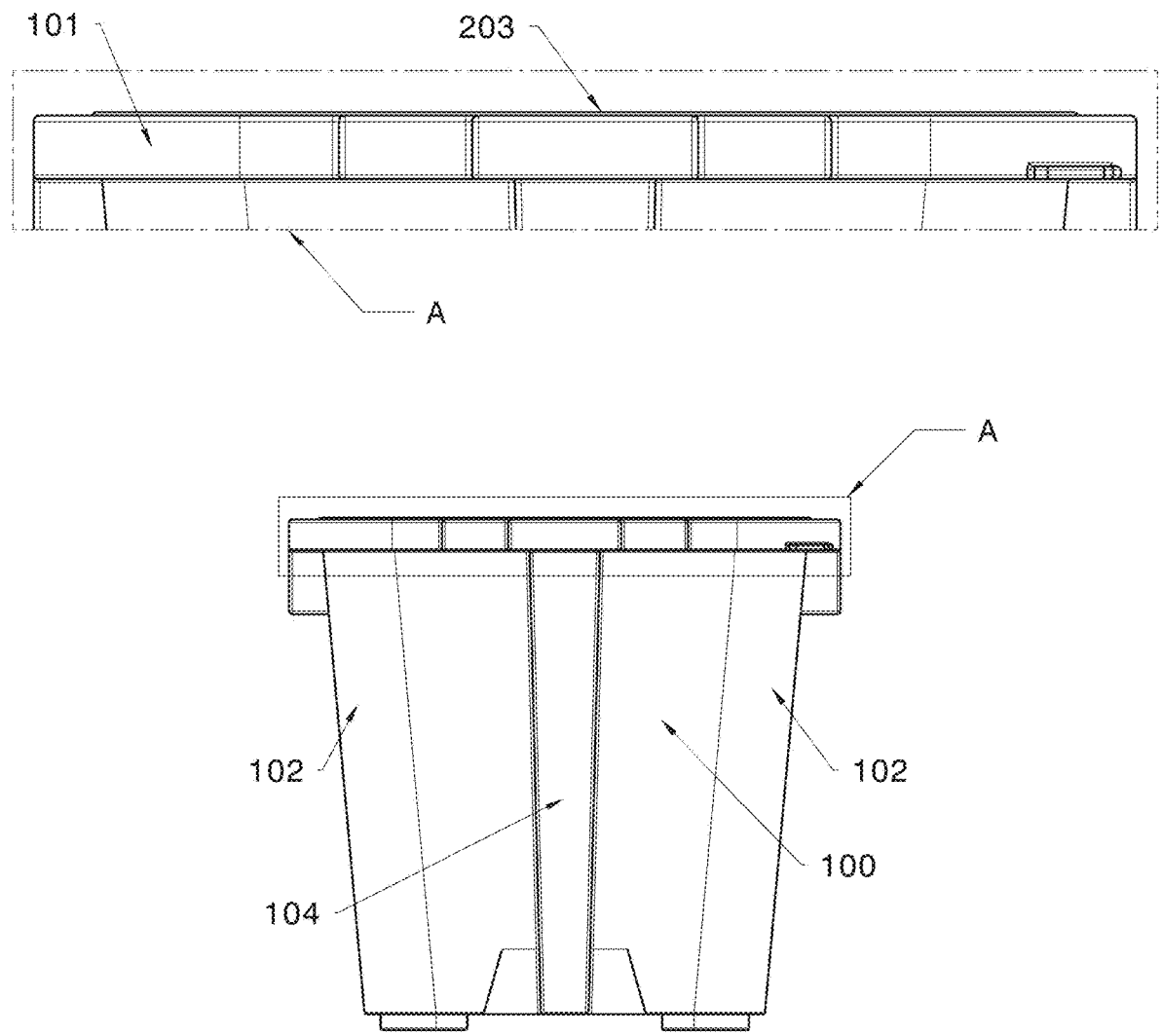
FIG. 9 shows a side view of the external container (100) and the internal container (200) of the reinforced containment system with an enlargement of section A.
Figure 10:
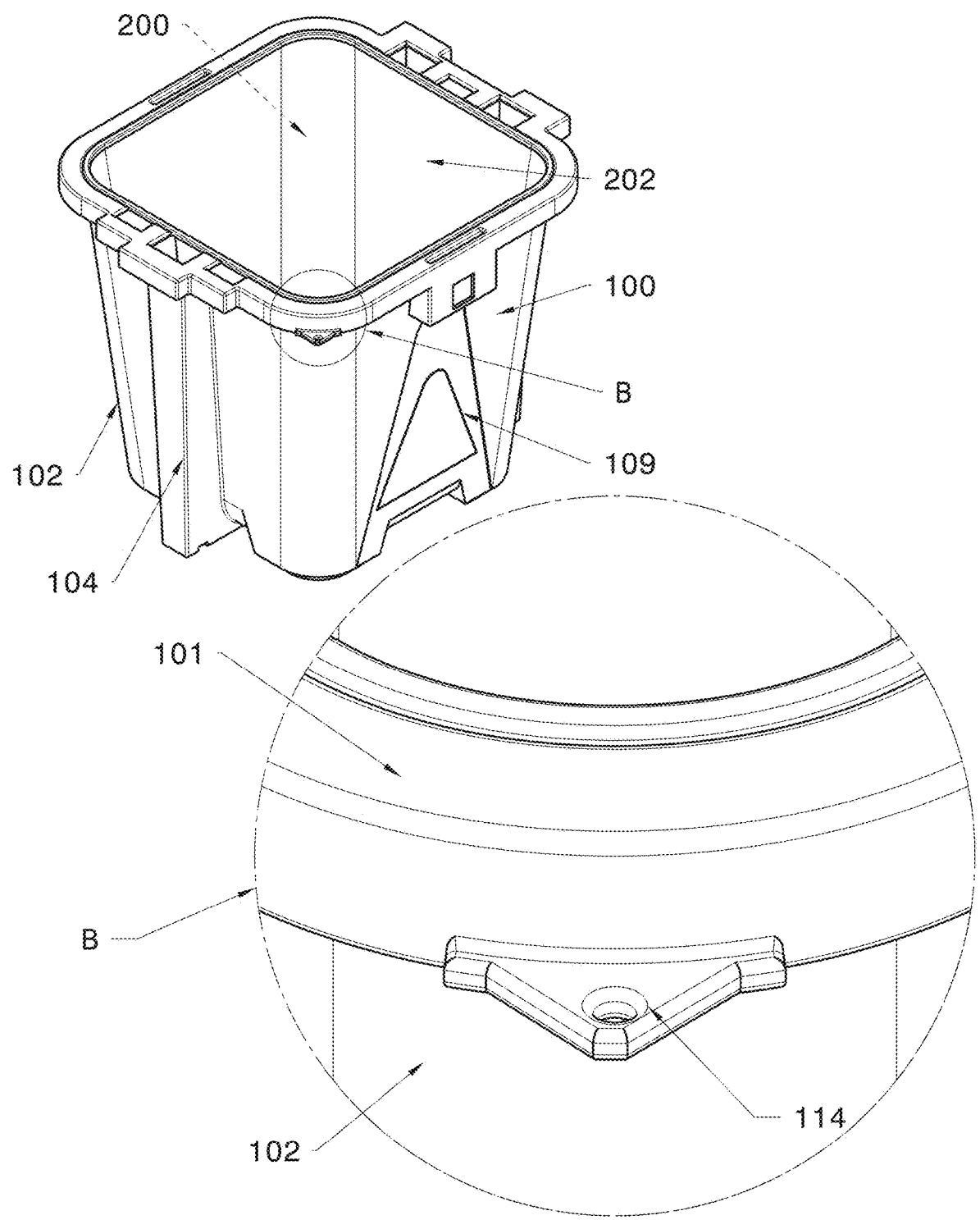
FIG. 10 shows a top isometric view of the external container (100) and the internal container (200) of the reinforced containment system with an enlargement of section B.
Figure 11:
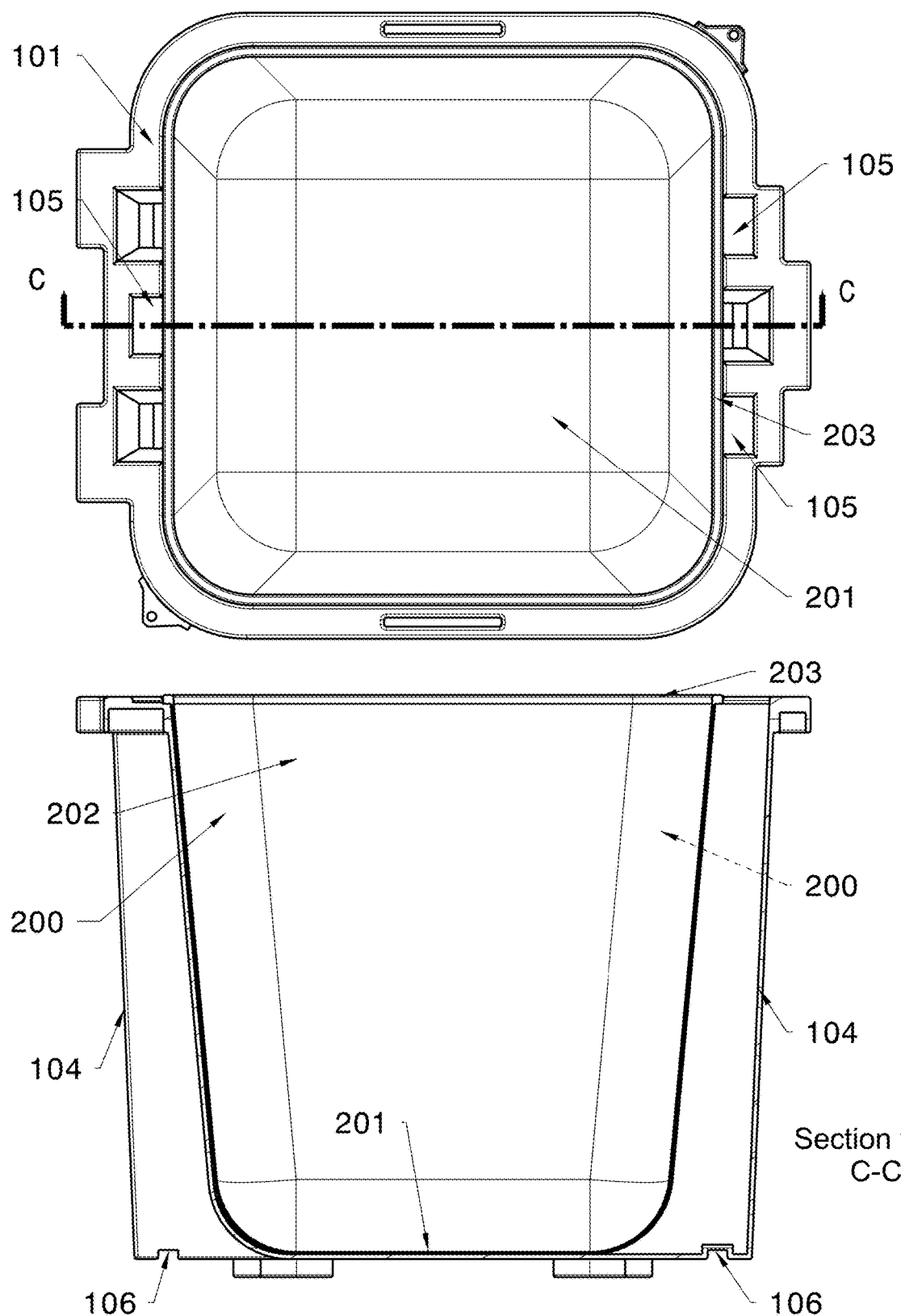
FIG. 11 shows a top view with a section of the C-C segment of the external container (100) and the internal container (200) of the reinforced containment system.
Figure 12:
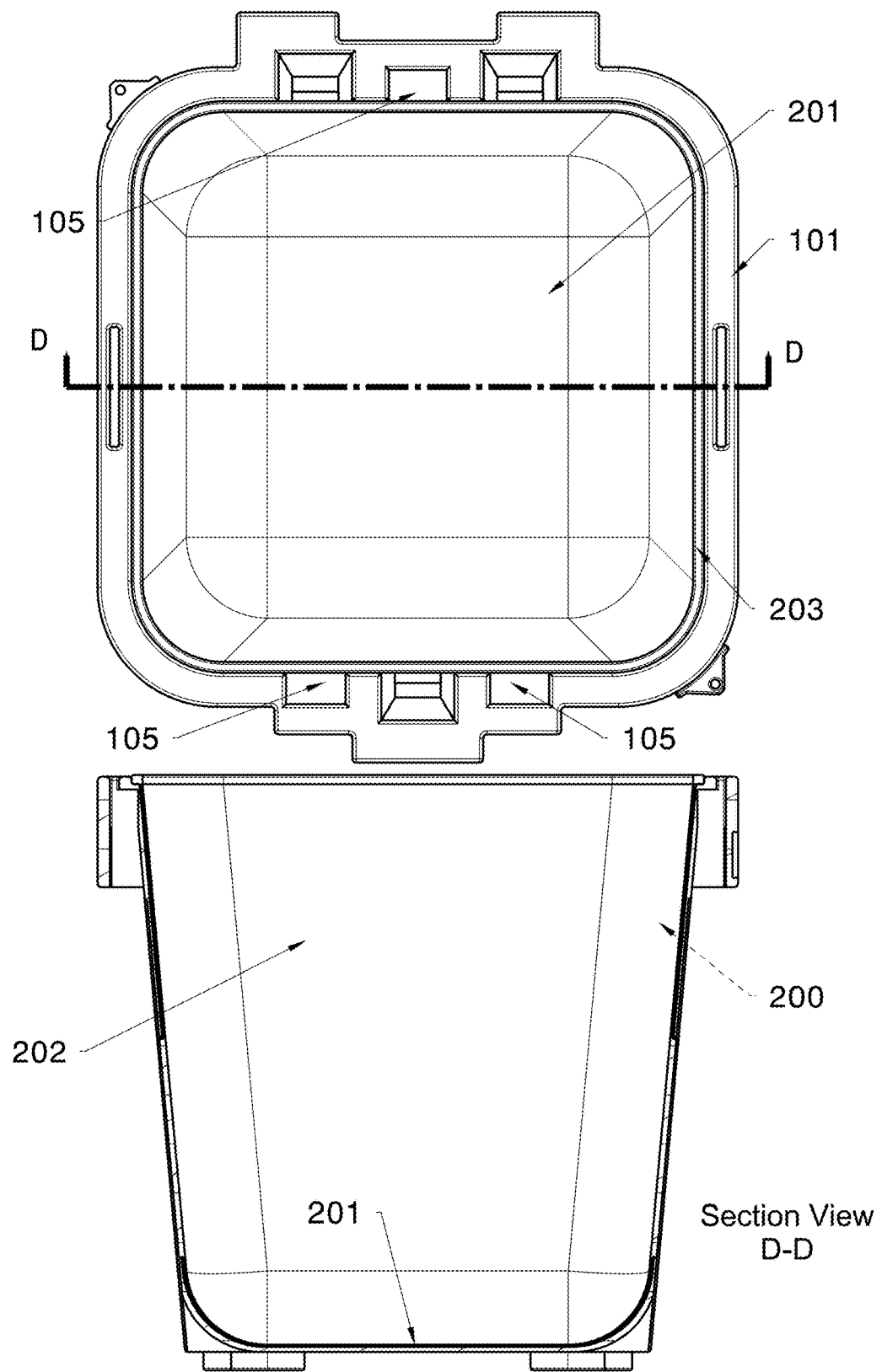
FIG. 12 shows a top view with a section of the D-D segment of the external container (100) and the internal container (200) of the reinforced containment system.
Figure 13:
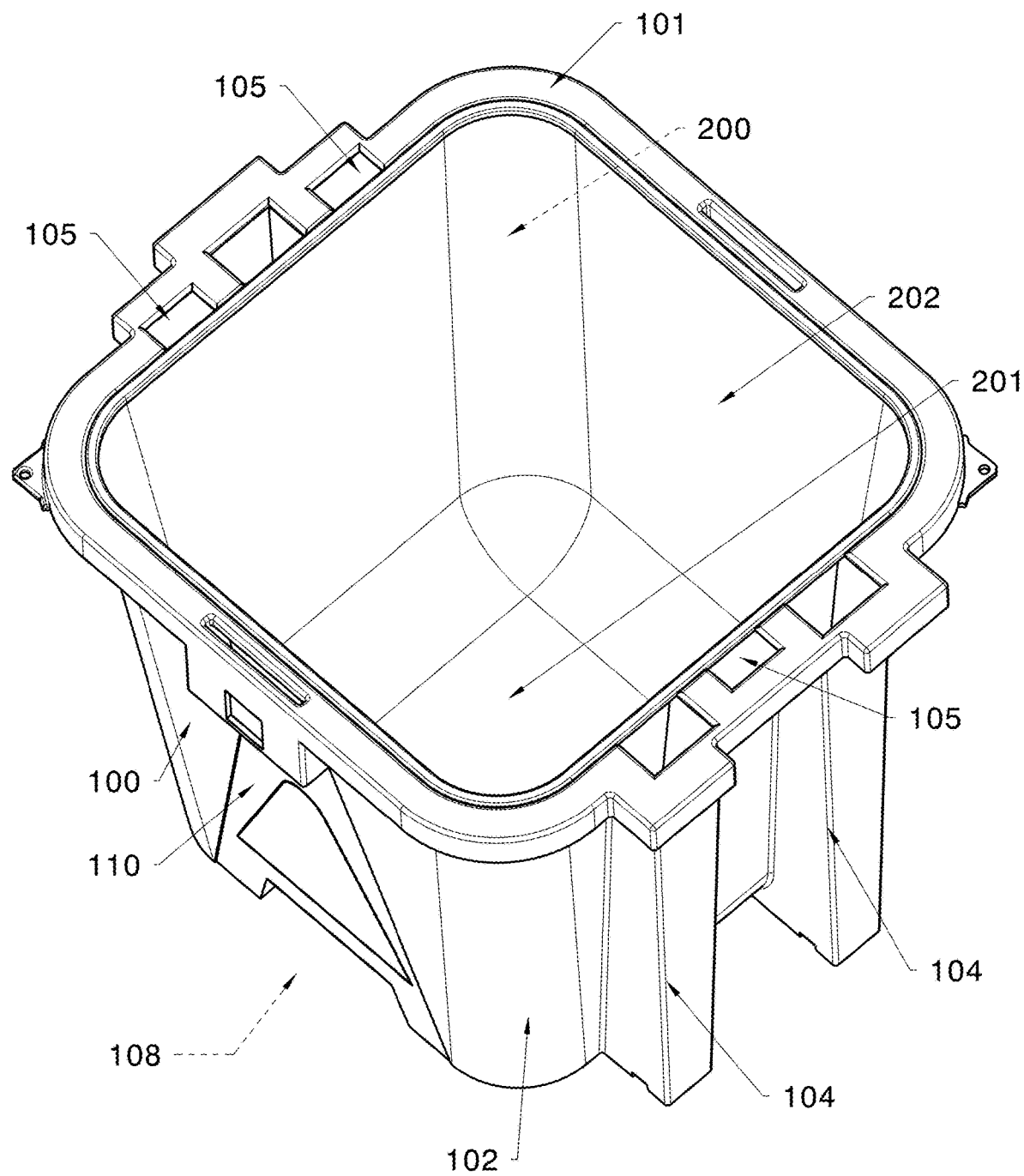
FIG. 13 shows a top-isometric view of the external container (100) and the internal container (200) of the reinforced containment system.
Figure 14A:
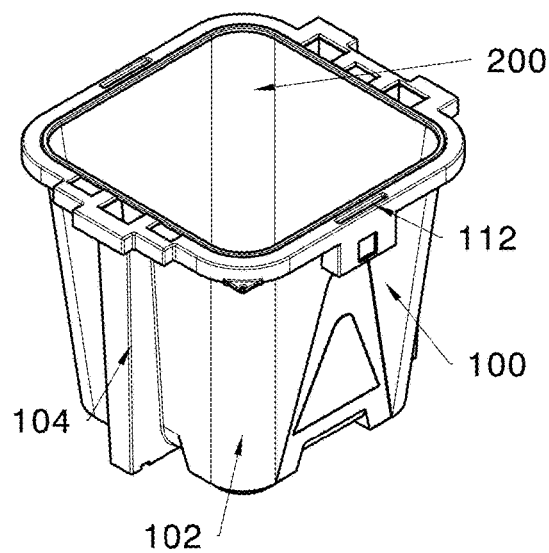
FIG. 14a shows a top isometric view of the external container (100) and the internal container (200) of the reinforced containment system.
Figure 14B:
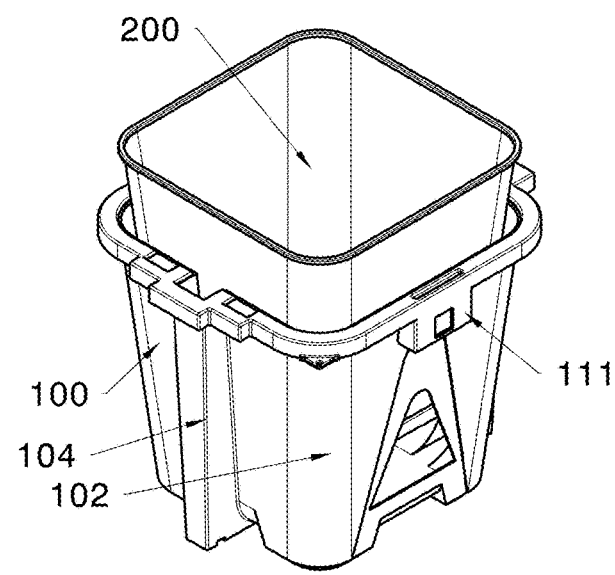
FIG. 14b shows another top isometric view of the external container (100) and the internal container (200) of the reinforced containment system.
Figure 14C:
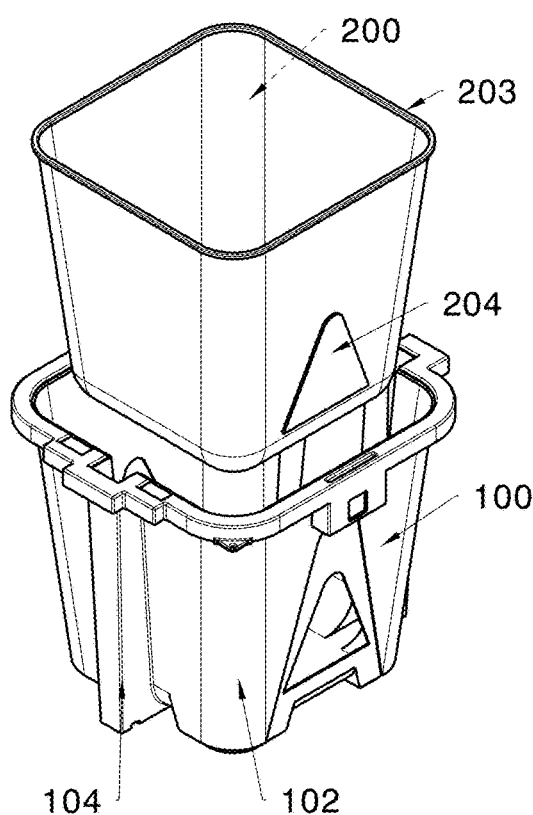
FIG. 14c shows another top isometric view of the external container (100) and the internal container (200) of the reinforced containment system.
Figure 14D:
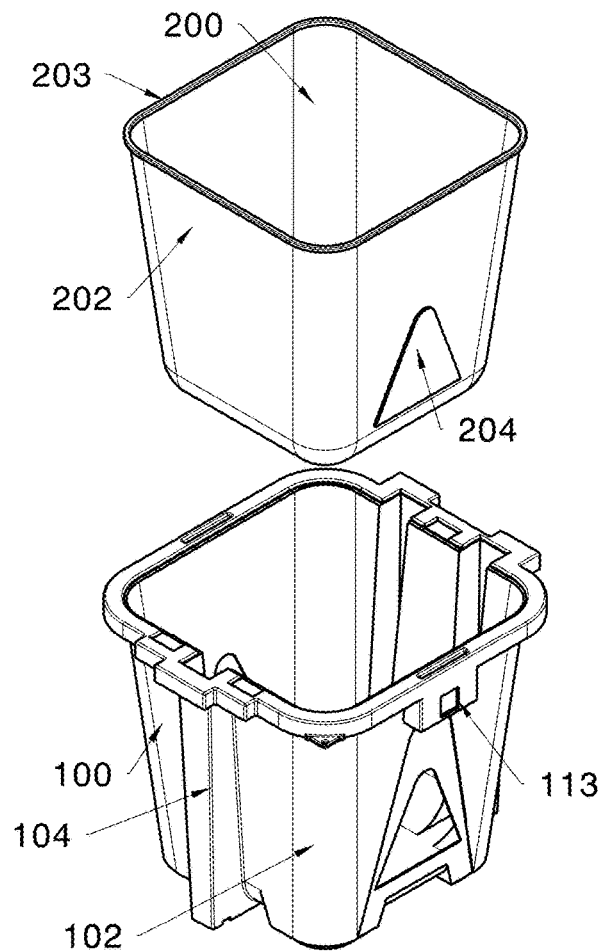
FIG. 14d shows another top isometric view of the external container (100) and the internal container (200) of the reinforced containment system.
Figure 15:
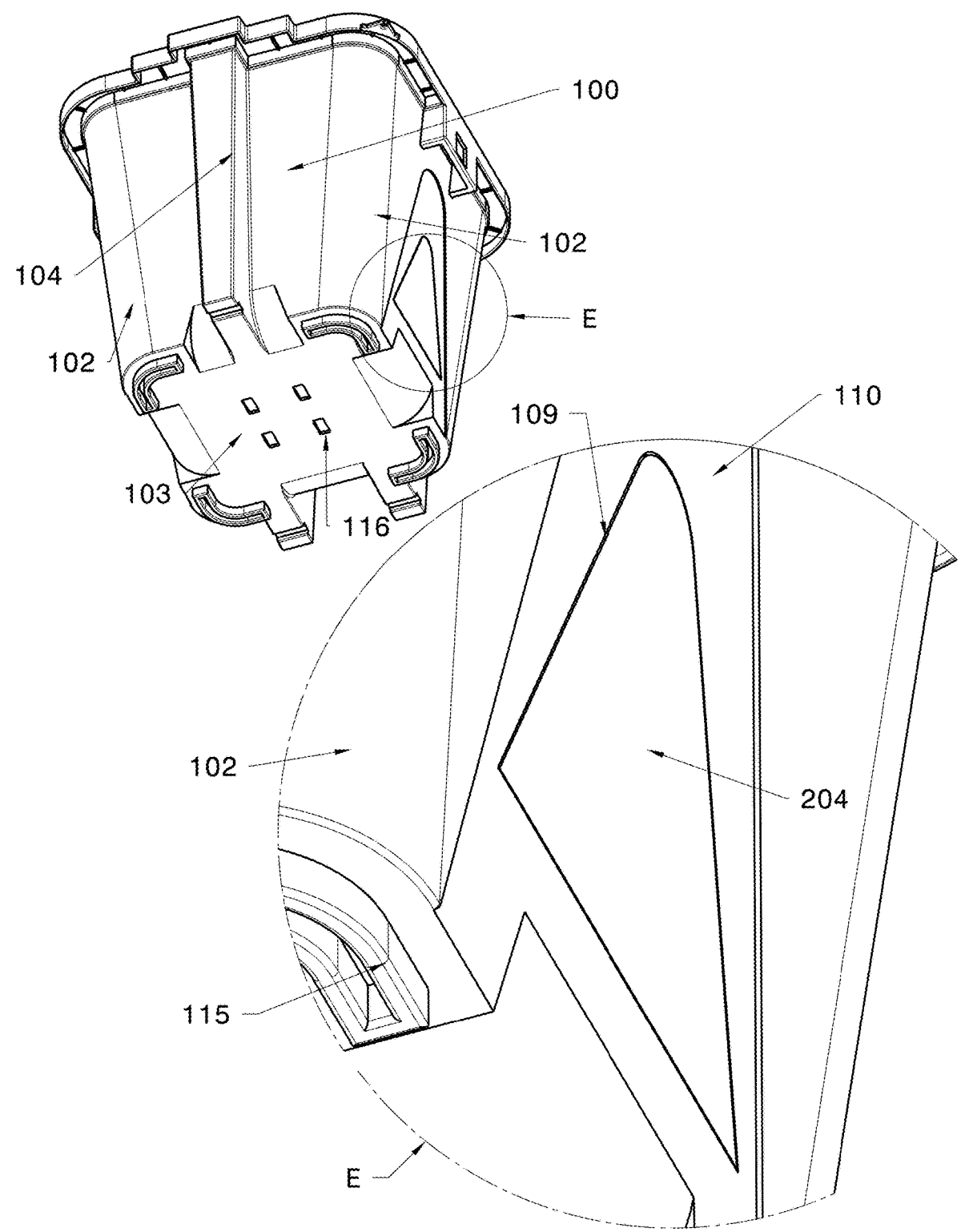
FIG. 15 shows a lower isometric view of the external container (100) and the internal container (200) of the reinforced containment system with an enlargement of section E.
Figure 16:
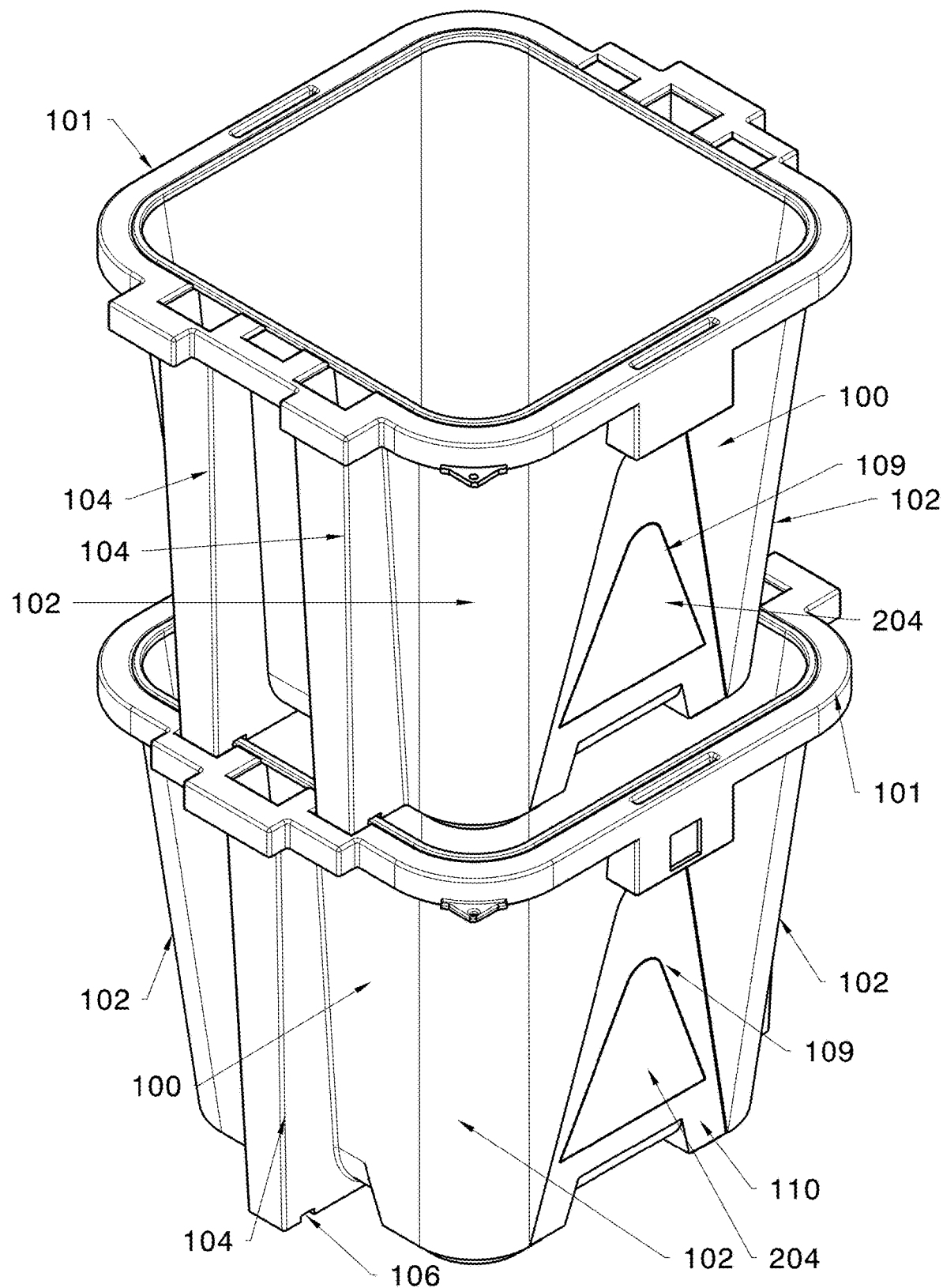
FIG. 16 shows a top isometric view of the external container (100) and the internal container (200) in a stacked arrangement.
Figure 17:
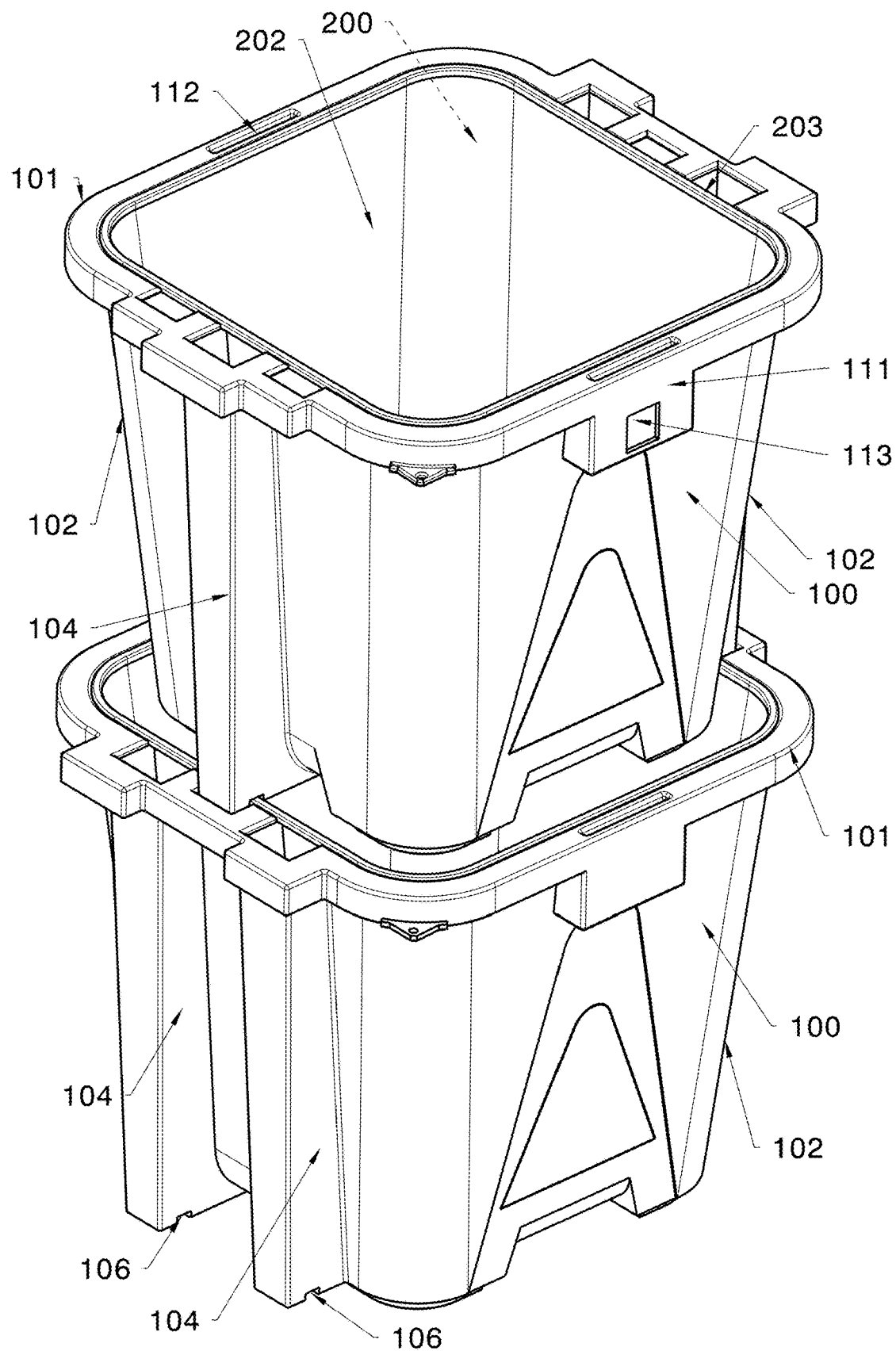
FIG. 17 shows a top isometric view of the external container (100) and the internal container (200) in a stacked arrangement.
Figure 18:
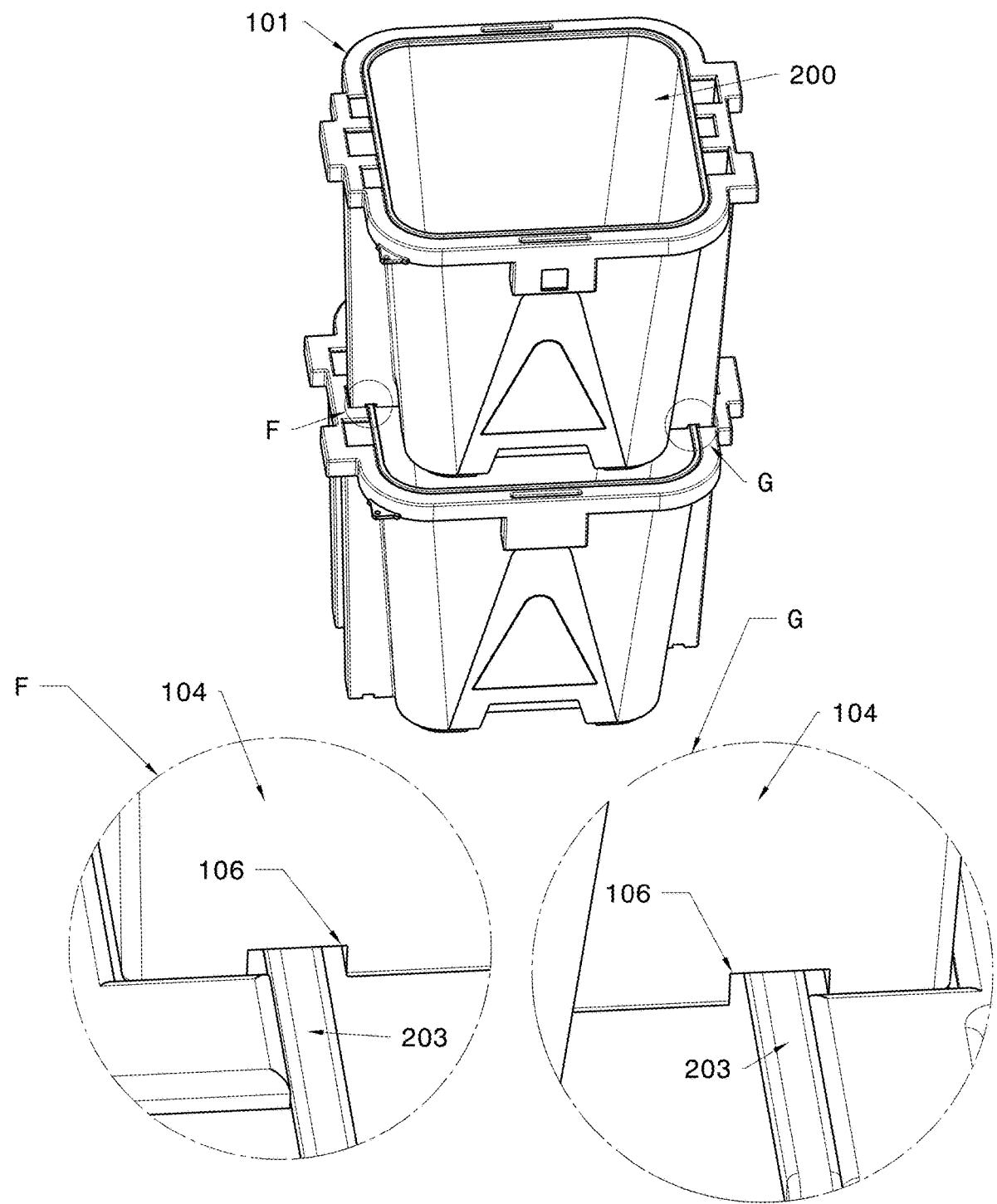
FIG. 18 shows a top isometric view of the external container (100) and the internal container (200) in a stacked arrangement and with enlargements in sections G and F.
Figure 19:
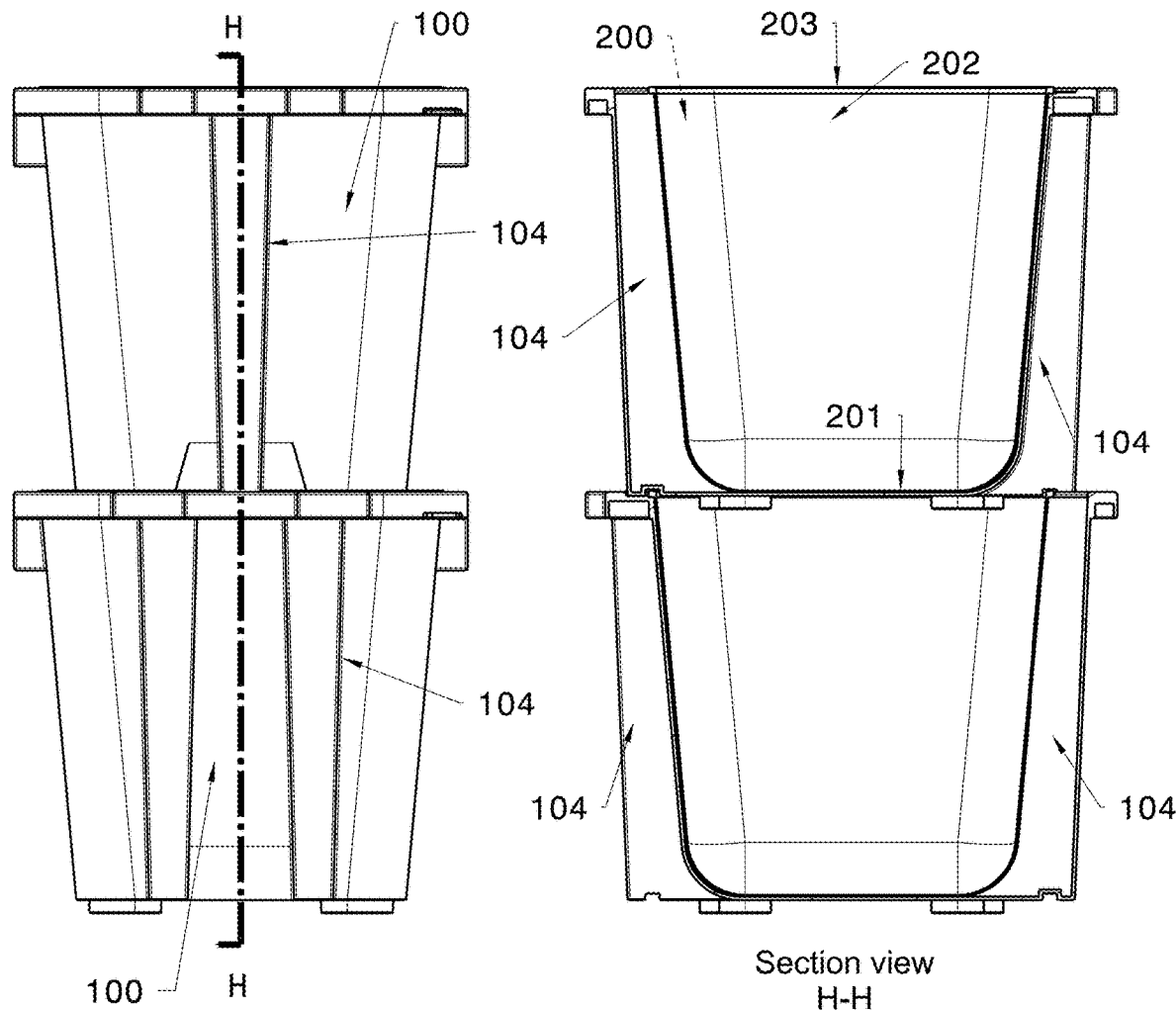
FIG. 19 shows a side view of the external container (100) and the internal container (200) in a stacked arrangement and with a sectional view of the H-H section.
Figure 20:
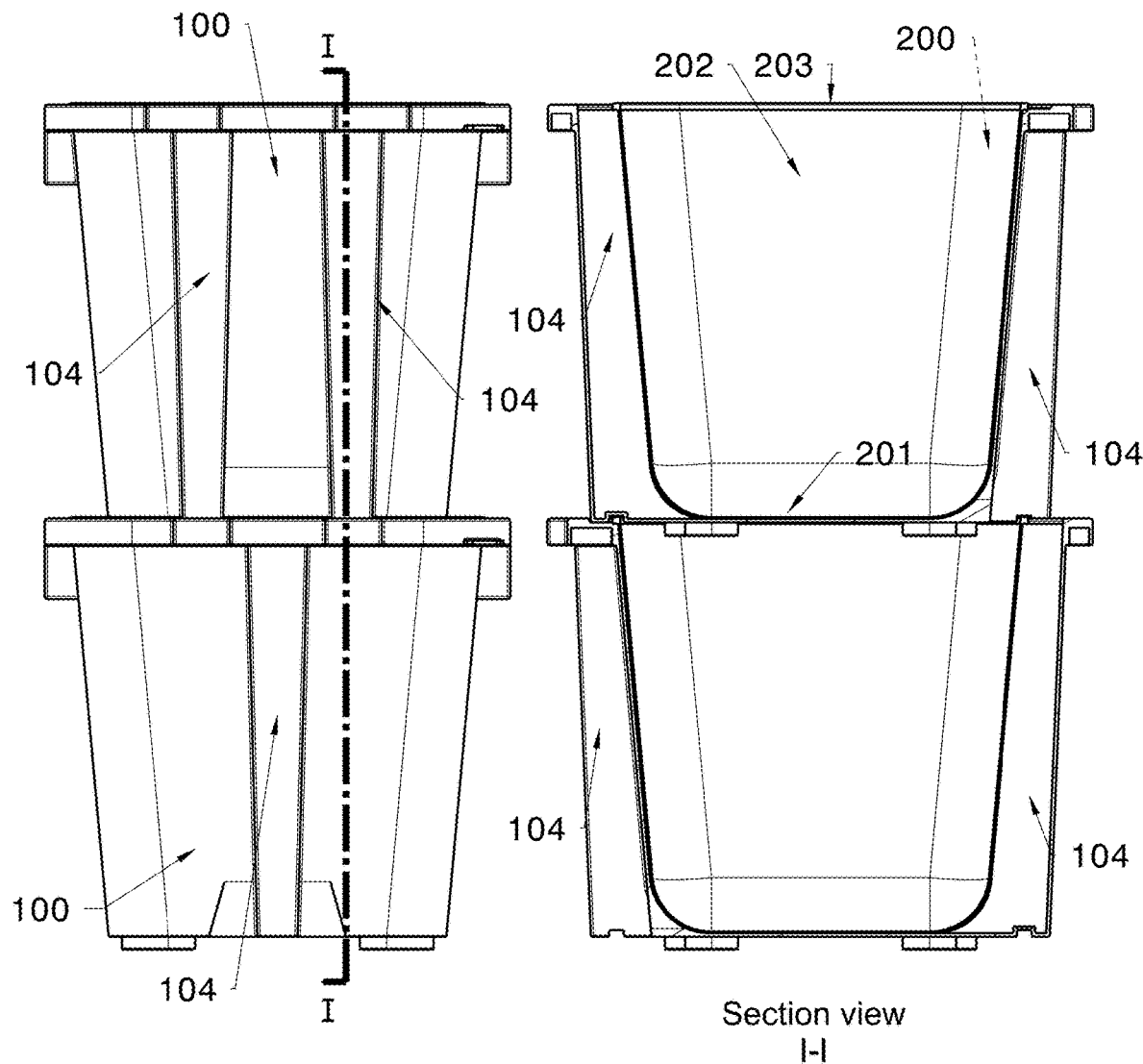
FIG. 20 shows a side view of the external container (100) and the internal container (200) in a stacked arrangement and with a sectional view of I-I section.
Figure 22A:
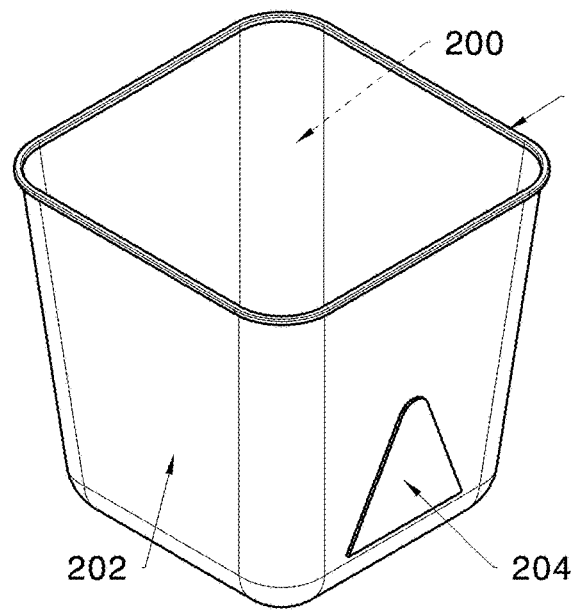
FIG. 22a shows a top isometric view of the internal container (200).
Figure 22B:
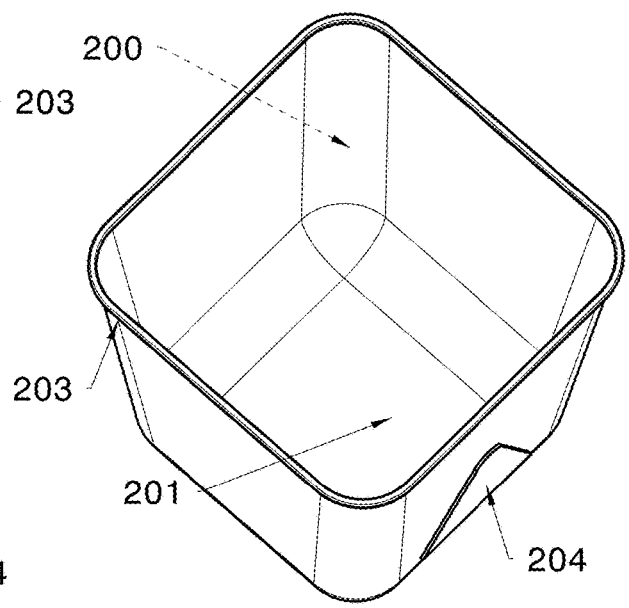
FIG. 22b shows a top isometric view of the internal container (200).
Figure 22C:
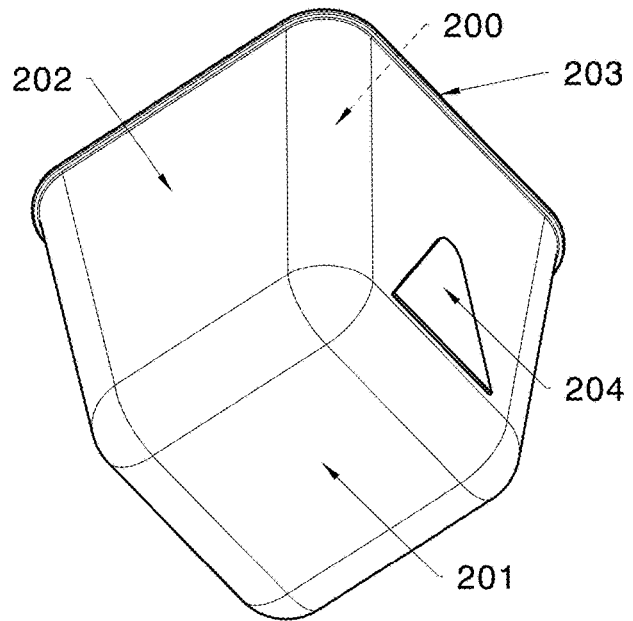
FIG. 22c shows a lower isometric view of the internal container (200).
Figure 23:
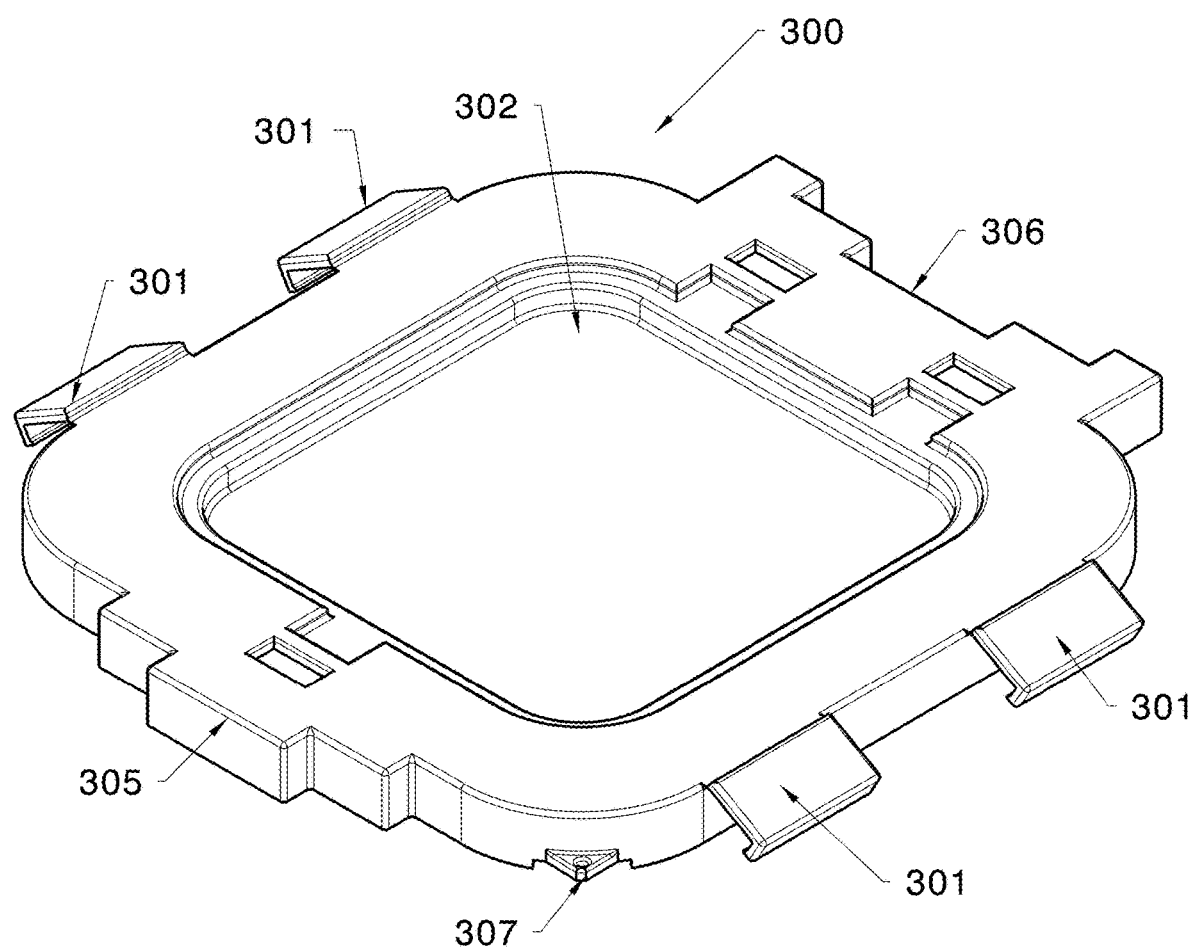
FIG. 23 shows a top isometric view of the cover (300).
Figure 24:
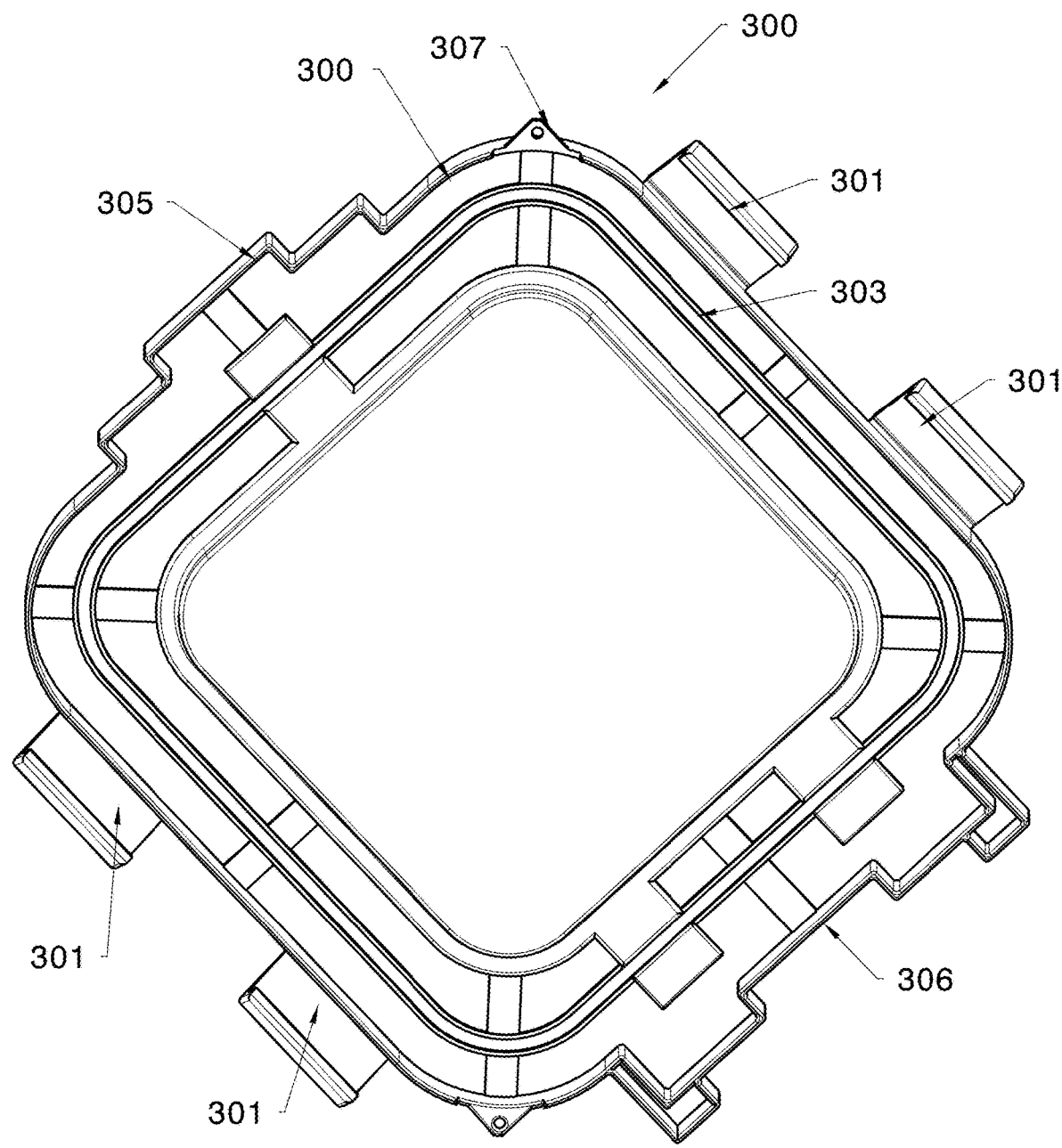
FIG. 24 shows a lower isometric view of the cover (300).
Figure 25:
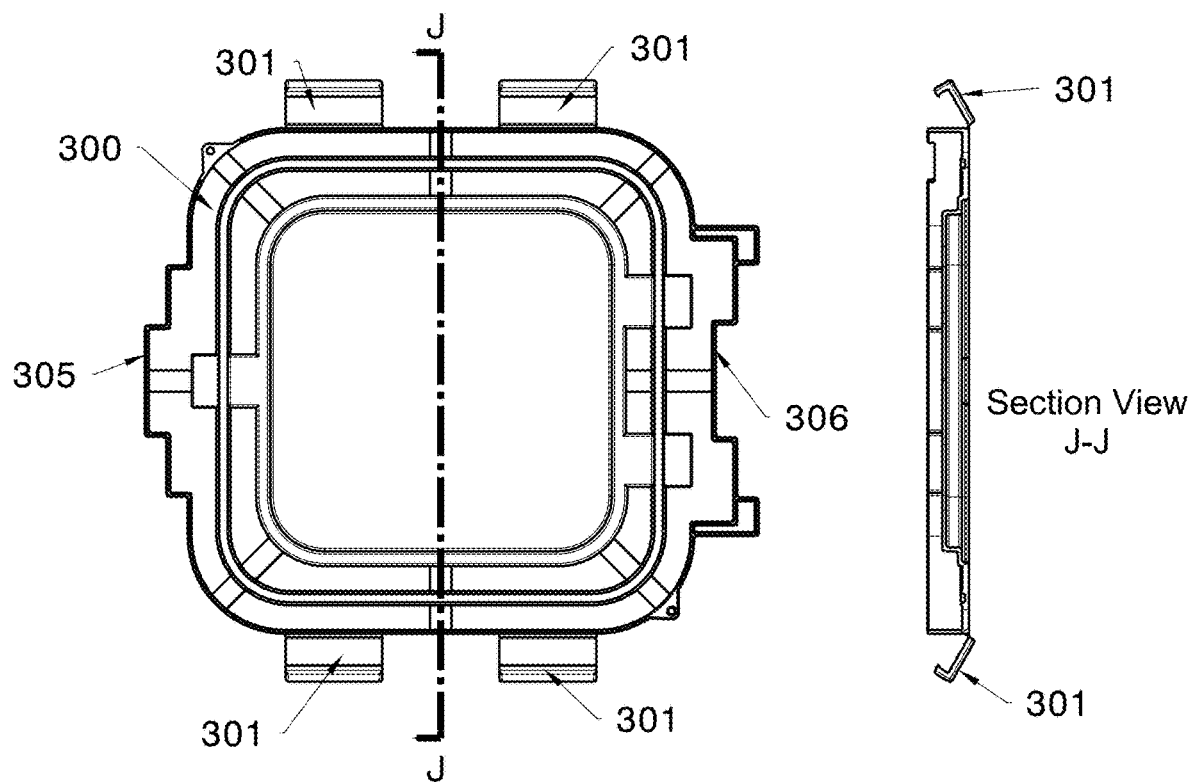
FIG. 25 shows a bottom view of the cover (300) with a sectional view of the J-J section.
Figure 26:
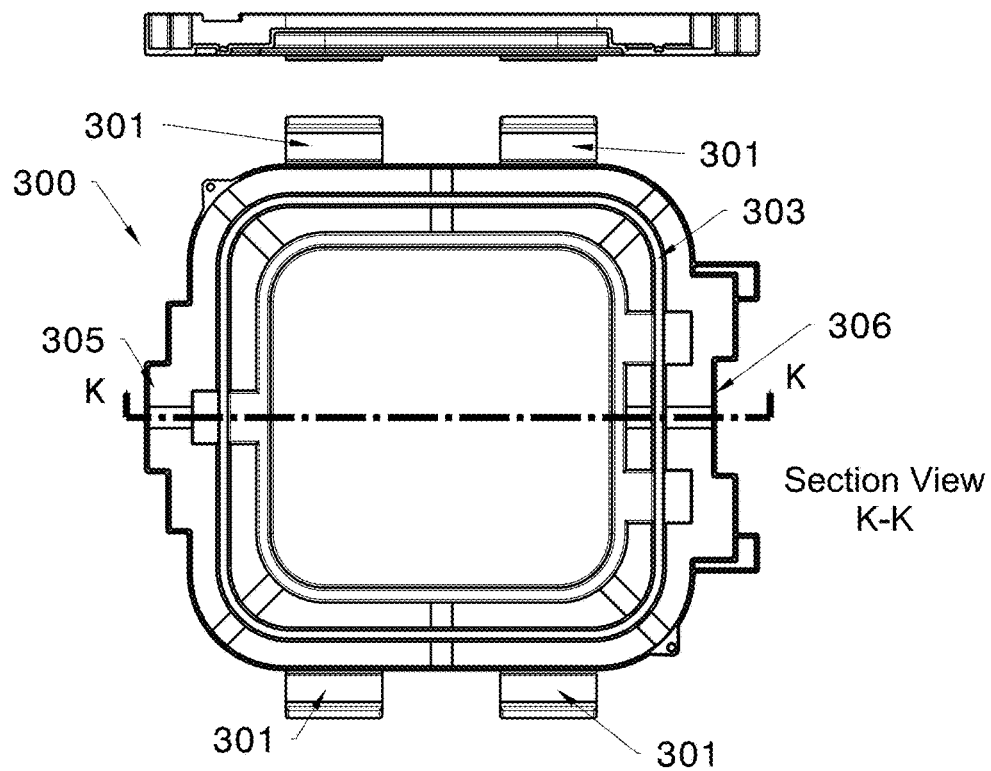
FIG. 26 shows a bottom view of the cover (300) with a sectional view of the K-K section.
Figure 27:
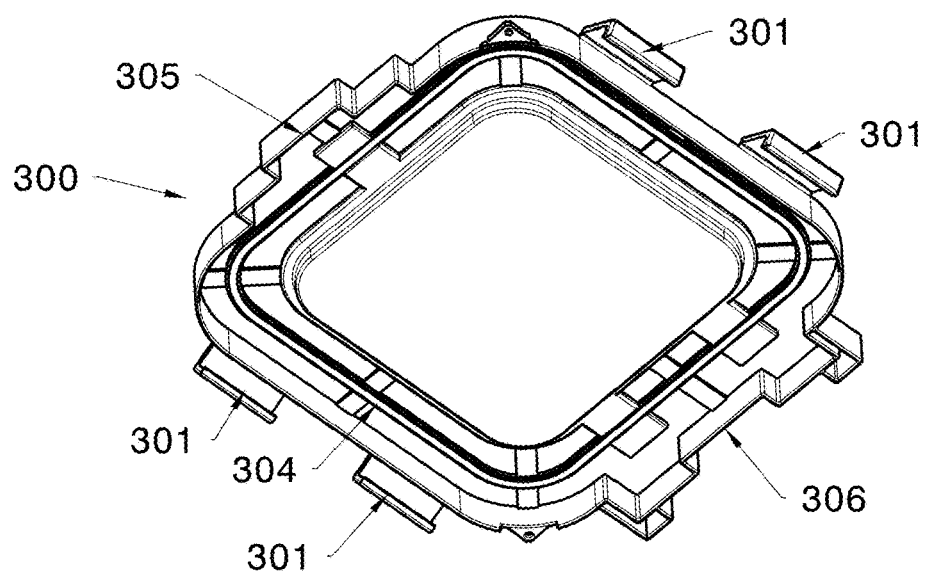
FIG. 27 shows a lower isometric view of the cover (300).
Figure 28:
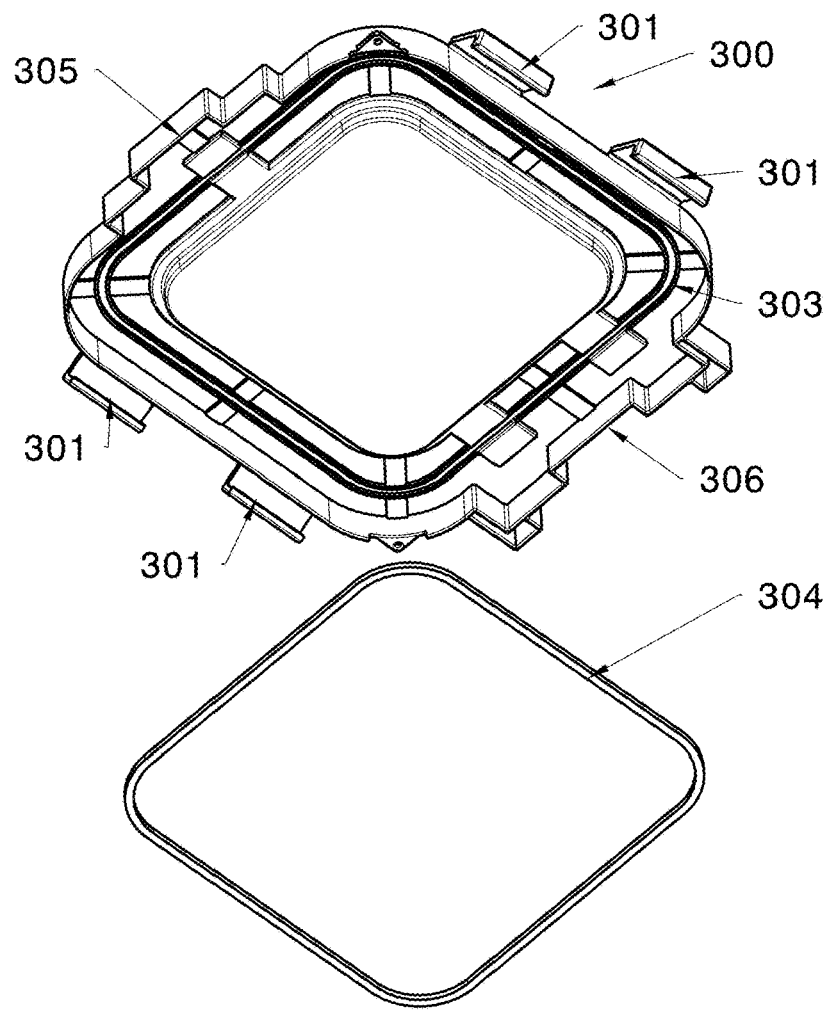
FIG. 28 shows a lower exploded isometric view of the cover (300) with the hermetic sealing (304).
Figure 29:
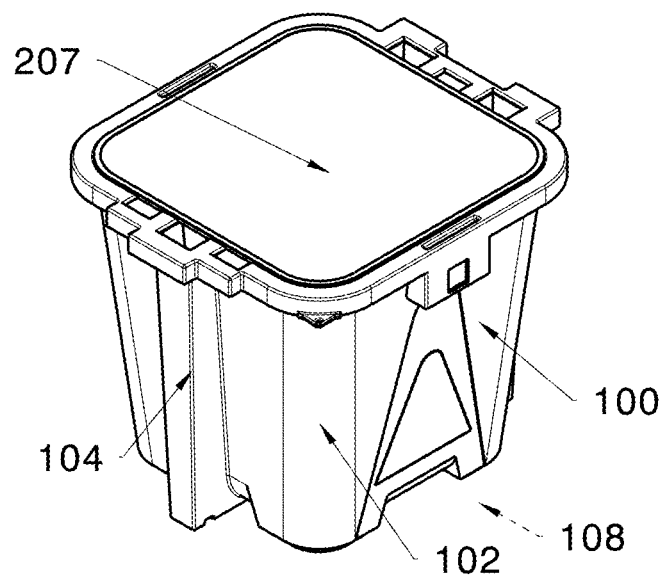
FIG. 29 shows a top isometric view of the external container (100) and the internal container (200) with a hermetic sealing for the internal container (200).
Figure 30:
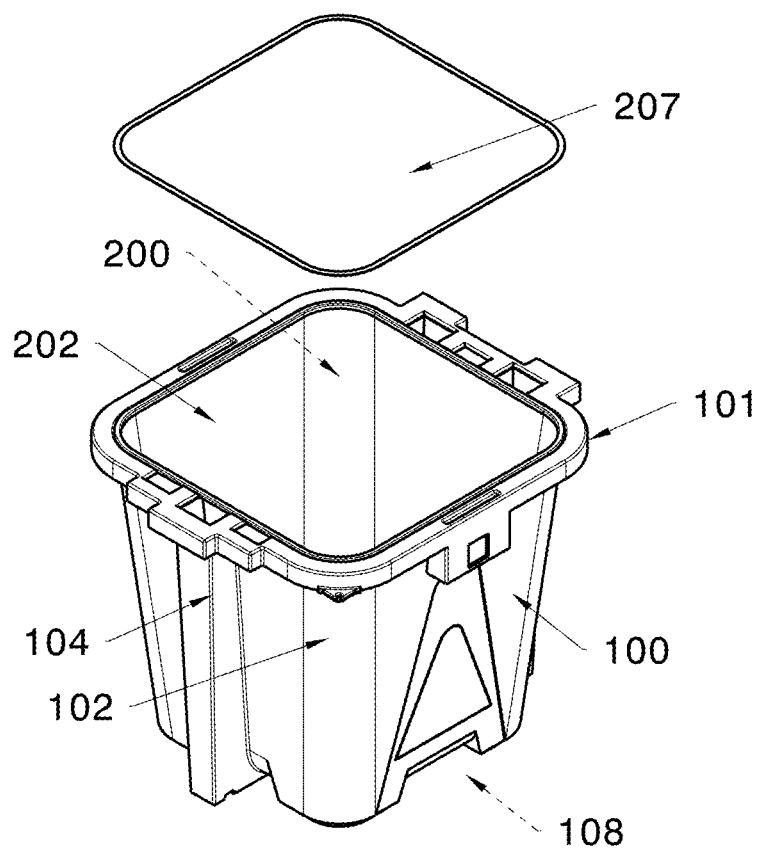
FIG. 30 shows a top exploded isometric view of the external container (100) and the internal container (200) with a hermetic sealing for the internal container (200).
Figure 31:
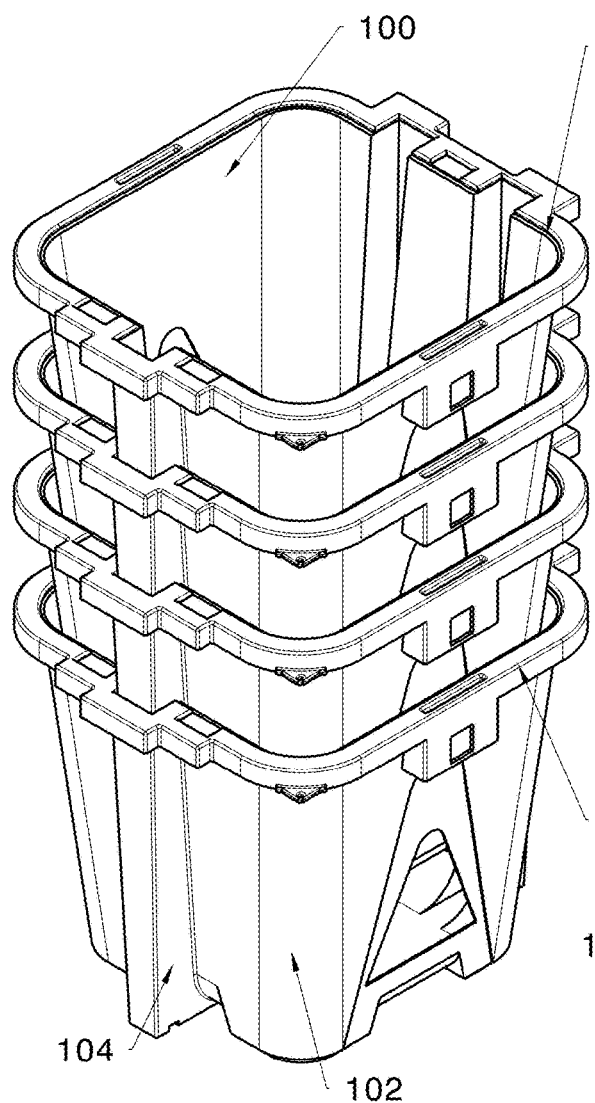
FIG. 31 shows a top isometric view of the external container (100) in a nestable arrangement.
Figure 32:
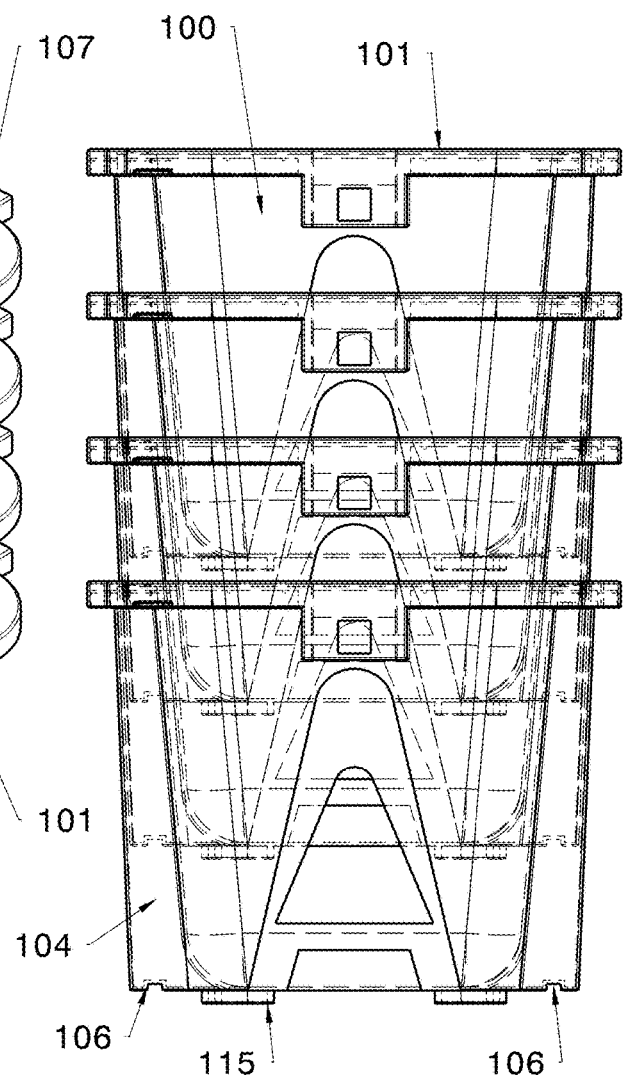
FIG. 32 shows a side view of the external container (100) in a nestable arrangement.
Figure 35:
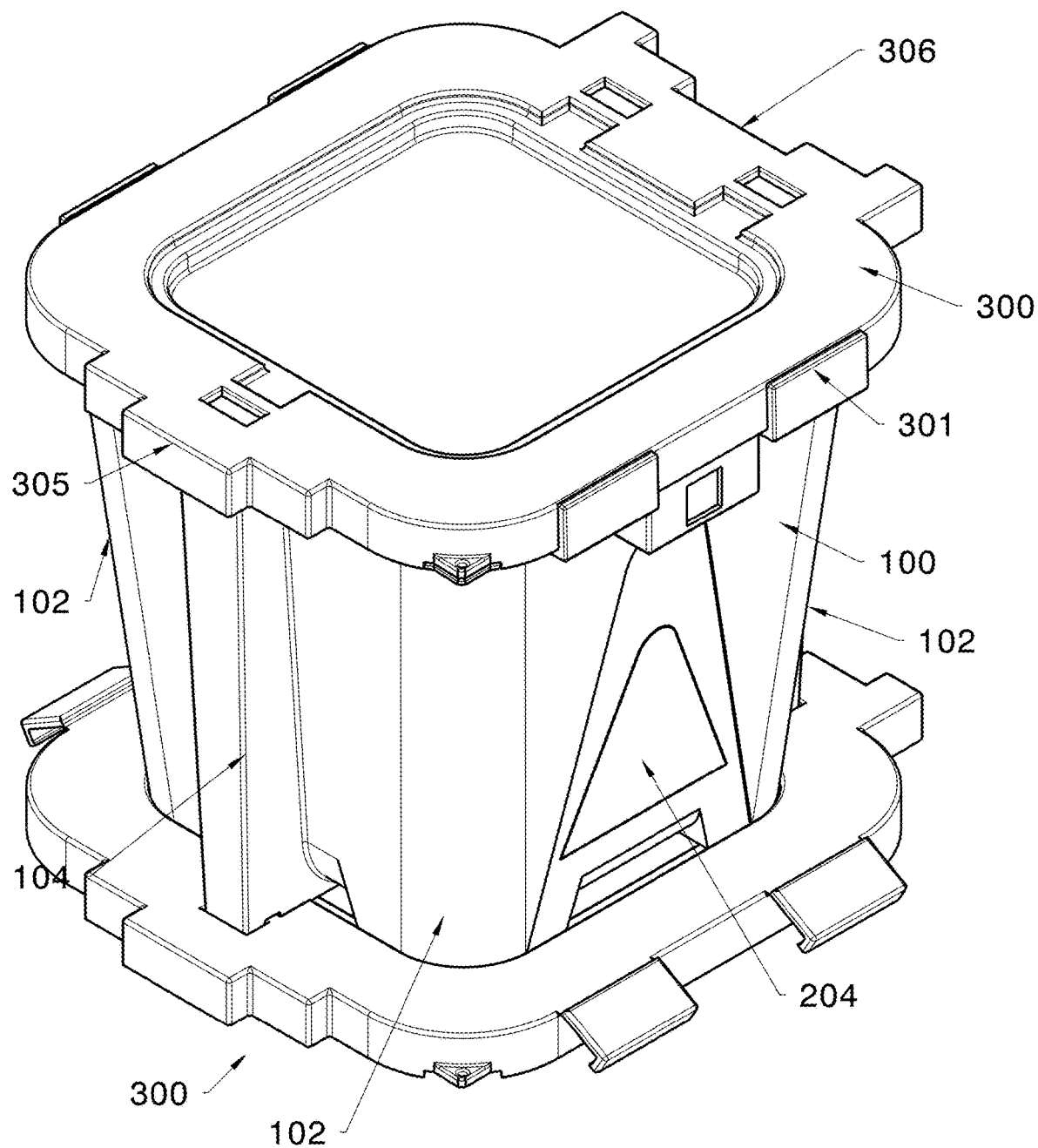
FIG. 35 shows a top isometric view of the reinforced containment system placed on top of a cover (300).
Figure 36:
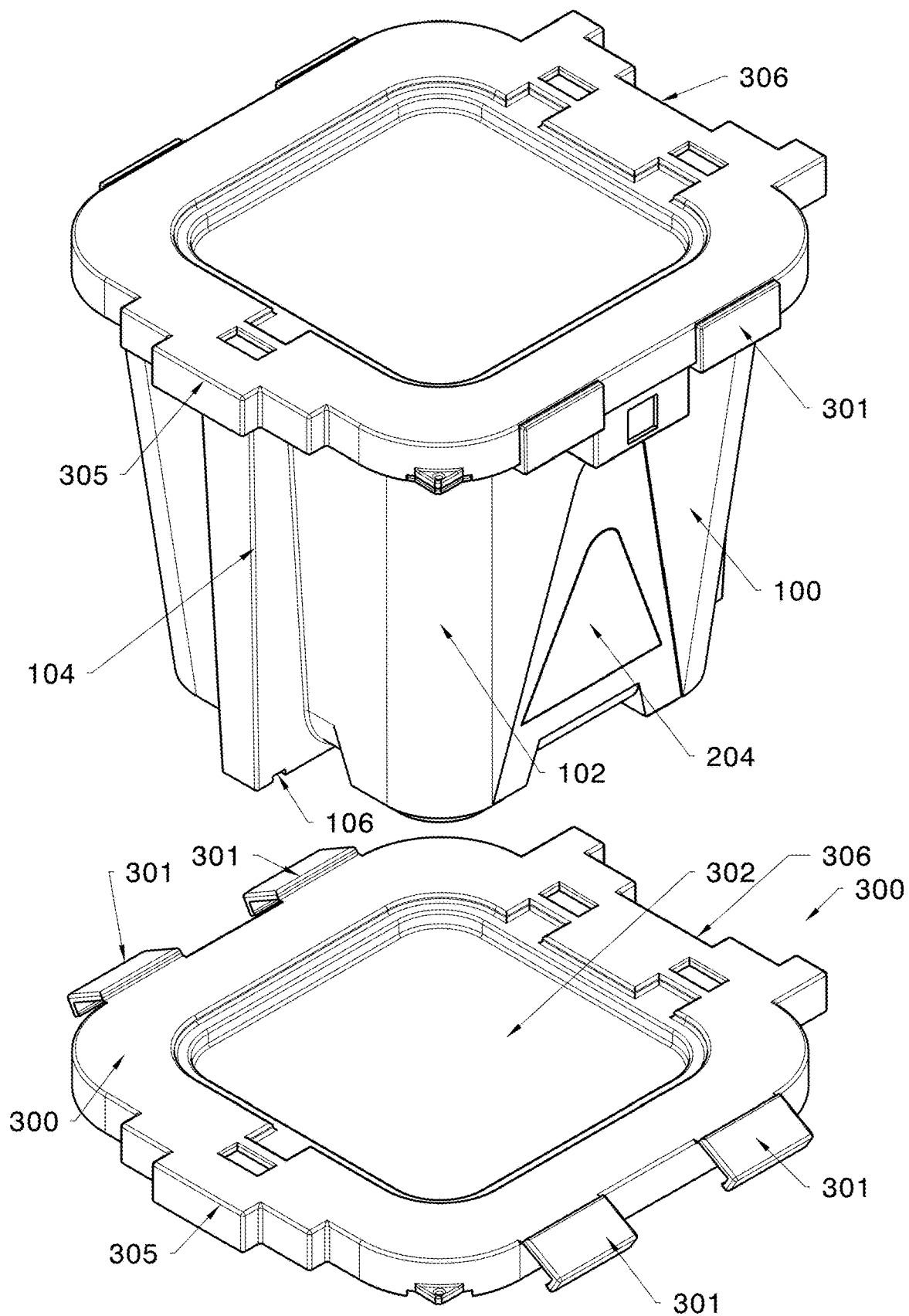
FIG. 36 shows a top exploded isometric view of the reinforced containment system placed on top of a cover (300).
Figure 37:
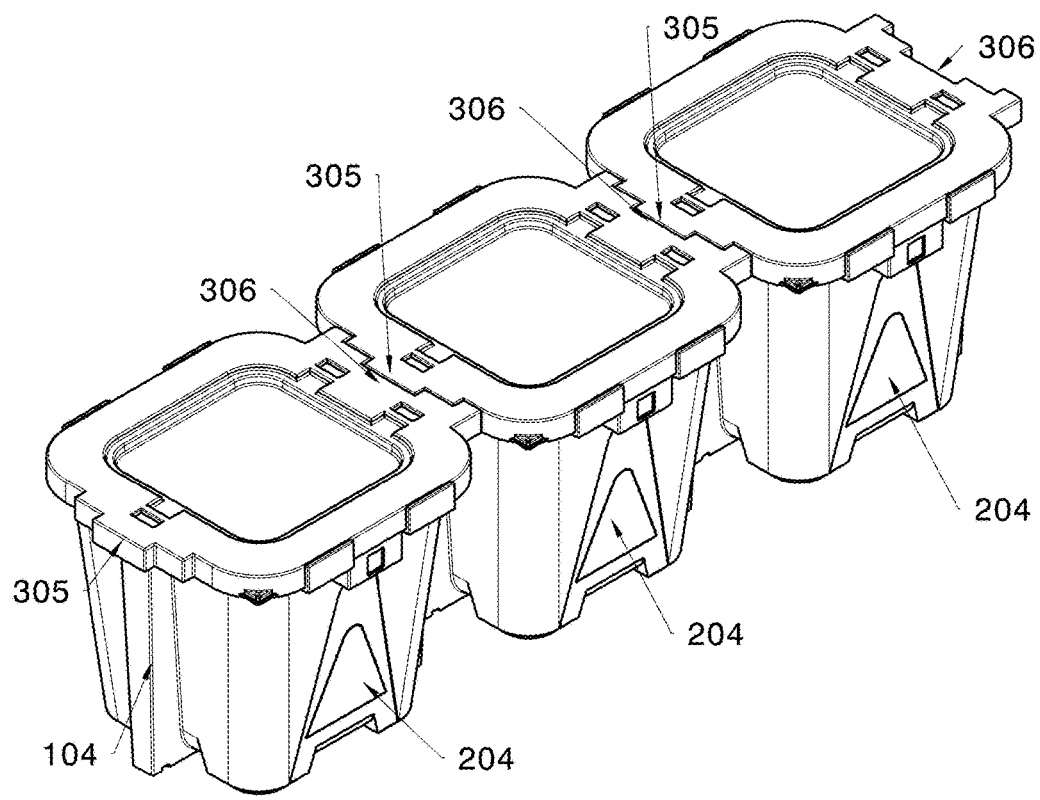
FIG. 37 shows a top isometric view of the reinforced containment system arranged interlocking in a linear arrangement.
Figure 38:
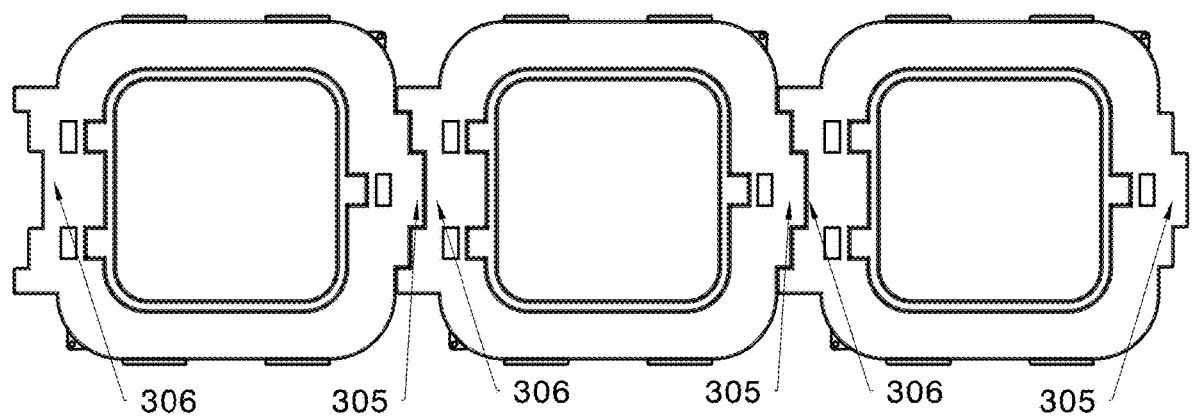
FIG. 38 shows a top view of the reinforced containment system arranged interlocking in a linear arrangement.
Figure 39:
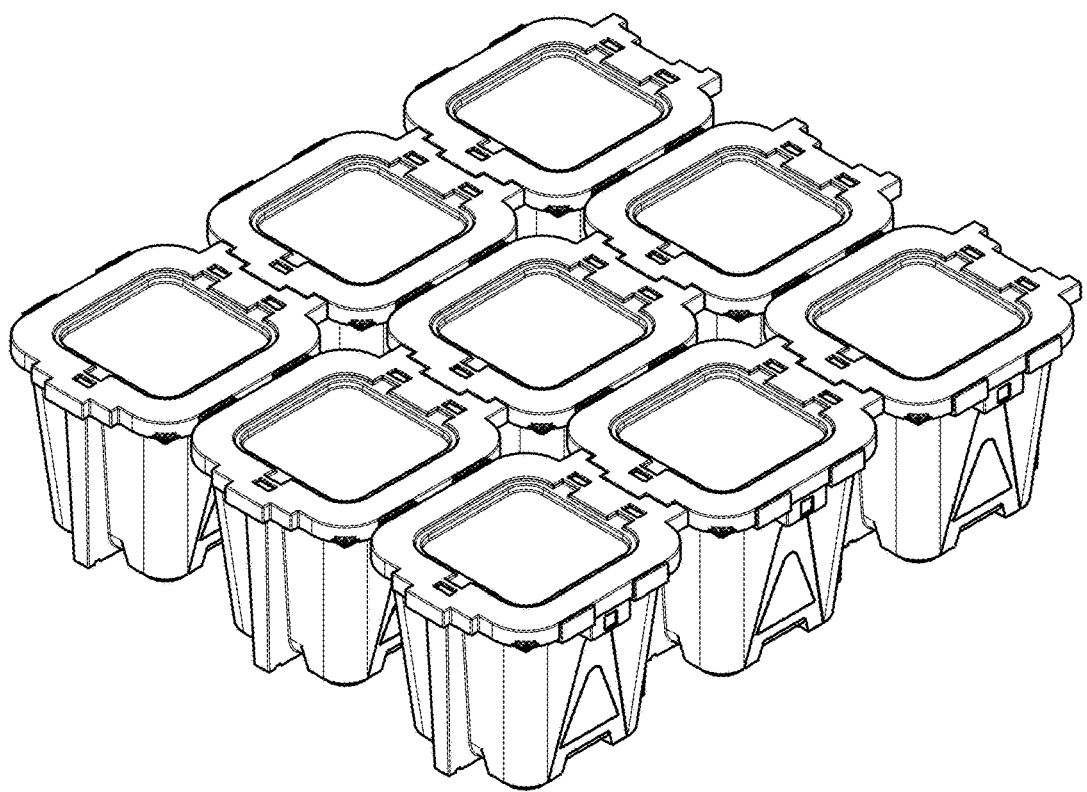
FIG. 39 shows a top isometric view of the reinforced containment system arranged interlocking in several linear arrangements.
Figure 40:
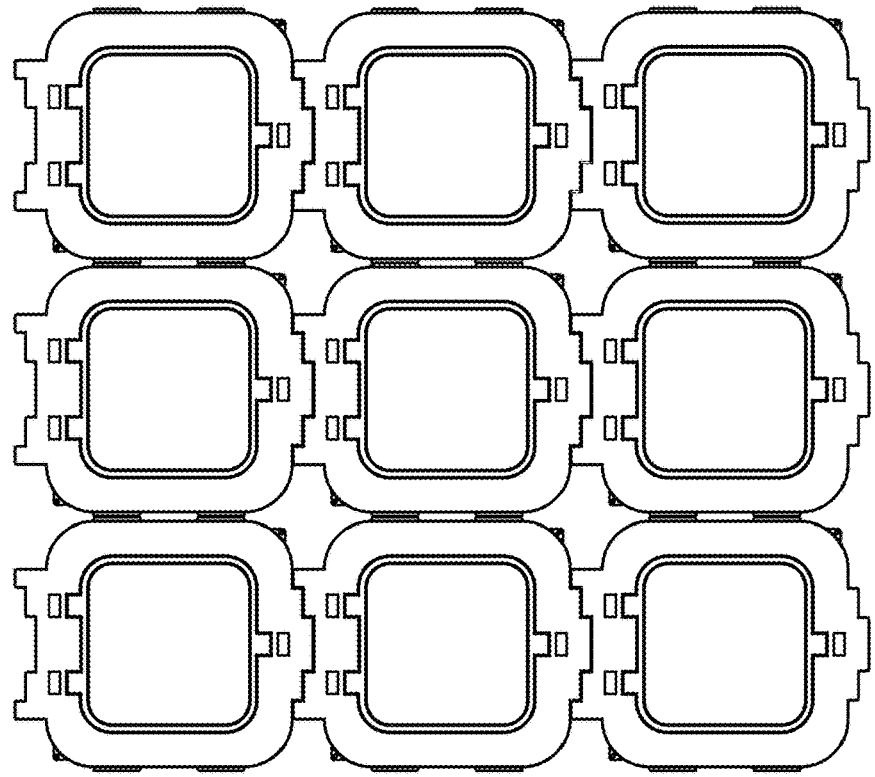
FIG. 40 shows a top view of the reinforced containment system arranged interlocking in several linear arrangements.
Figure 41:
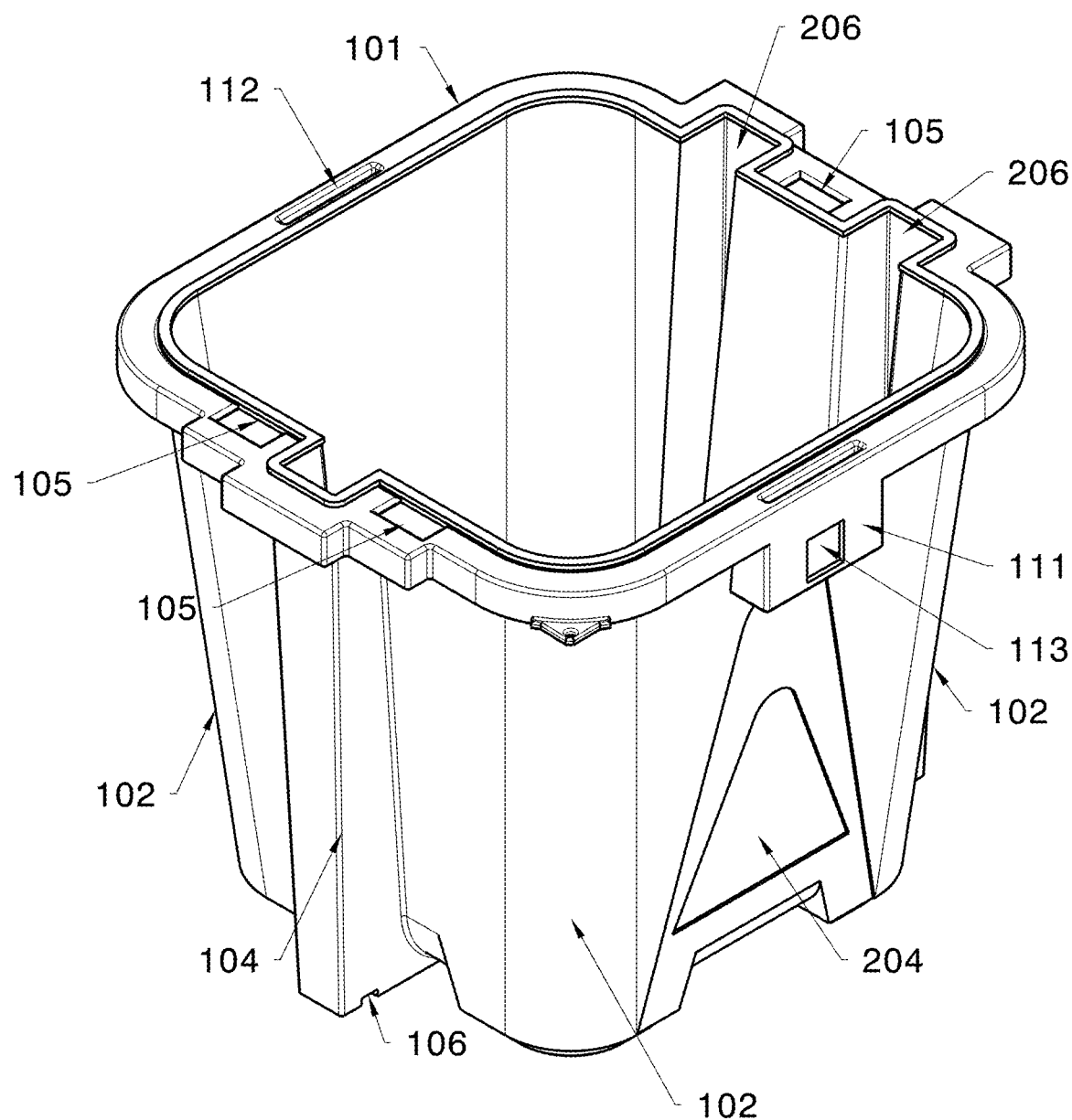
FIG. 41 shows a top isometric view of the external container (100) with an alternative embodiment of the internal container (200) of the reinforced containment system.
Figure 42:
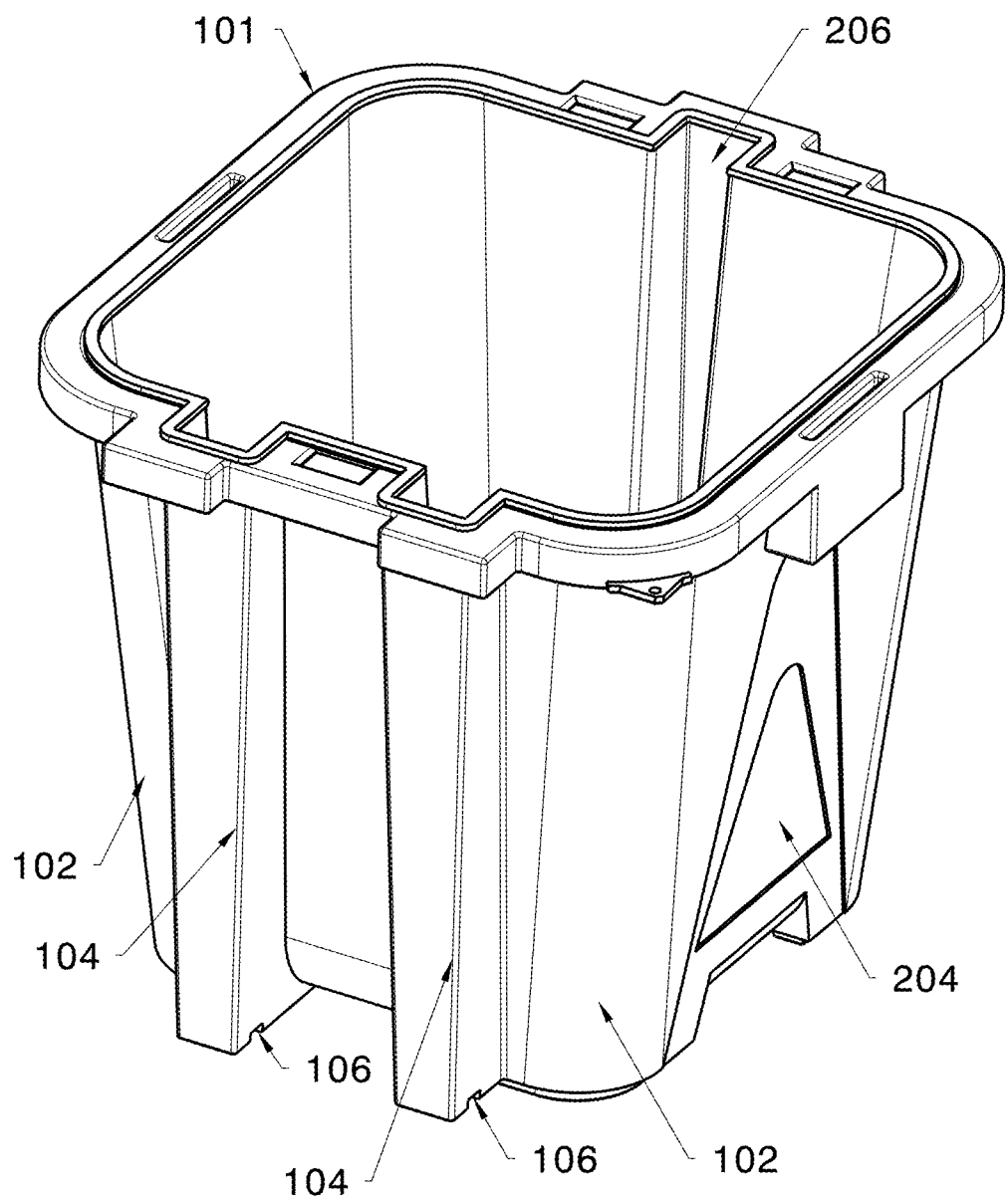
FIG. 42 shows a top isometric view of the external container (100) with an alternative embodiment of the internal container (200) of the reinforced containment system.
Figure 43:
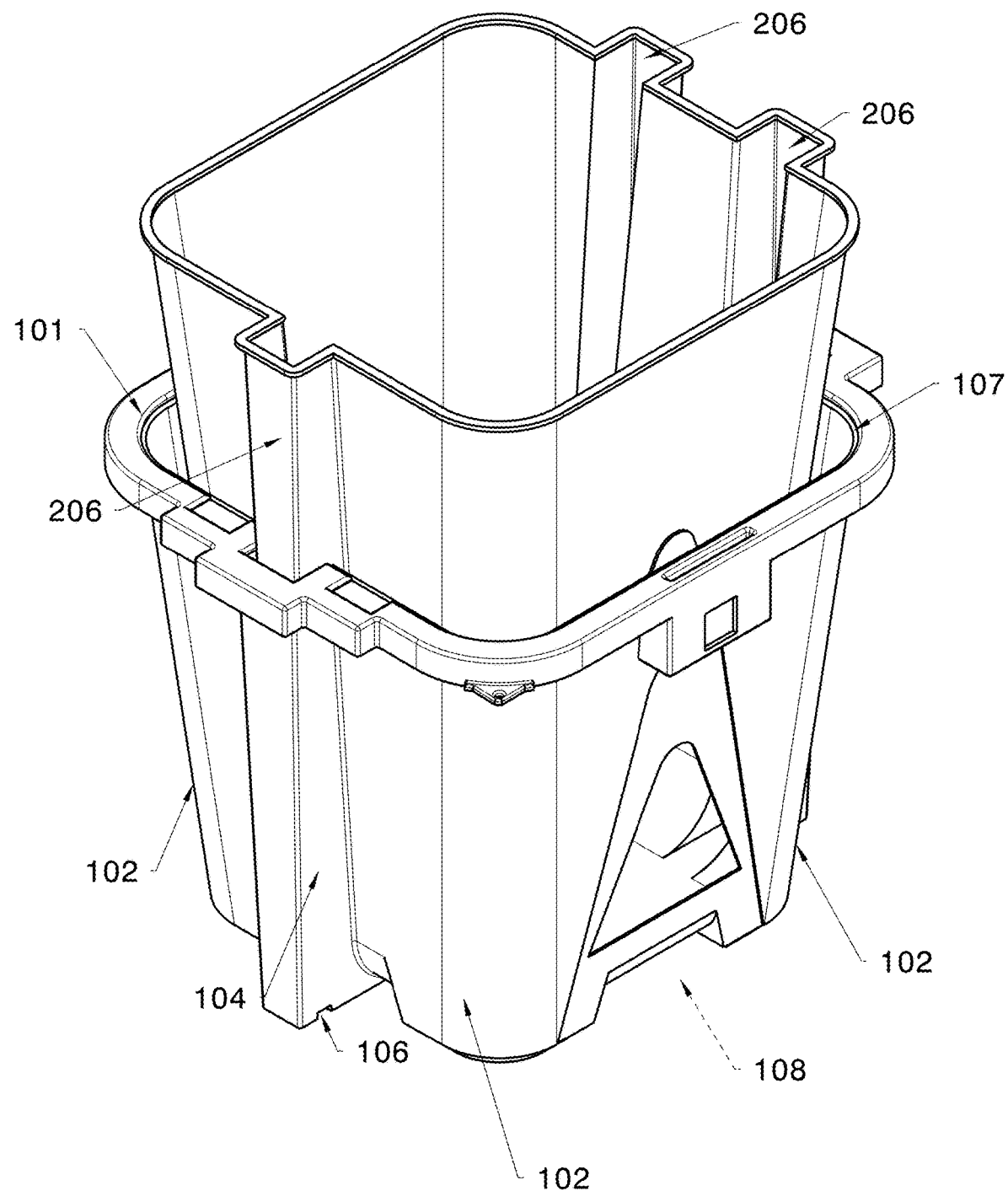
FIG. 43 shows a top exploded isometric view of external container (100) with an alternative embodiment of the internal container (200) of the reinforced containment system.
Figure 44:
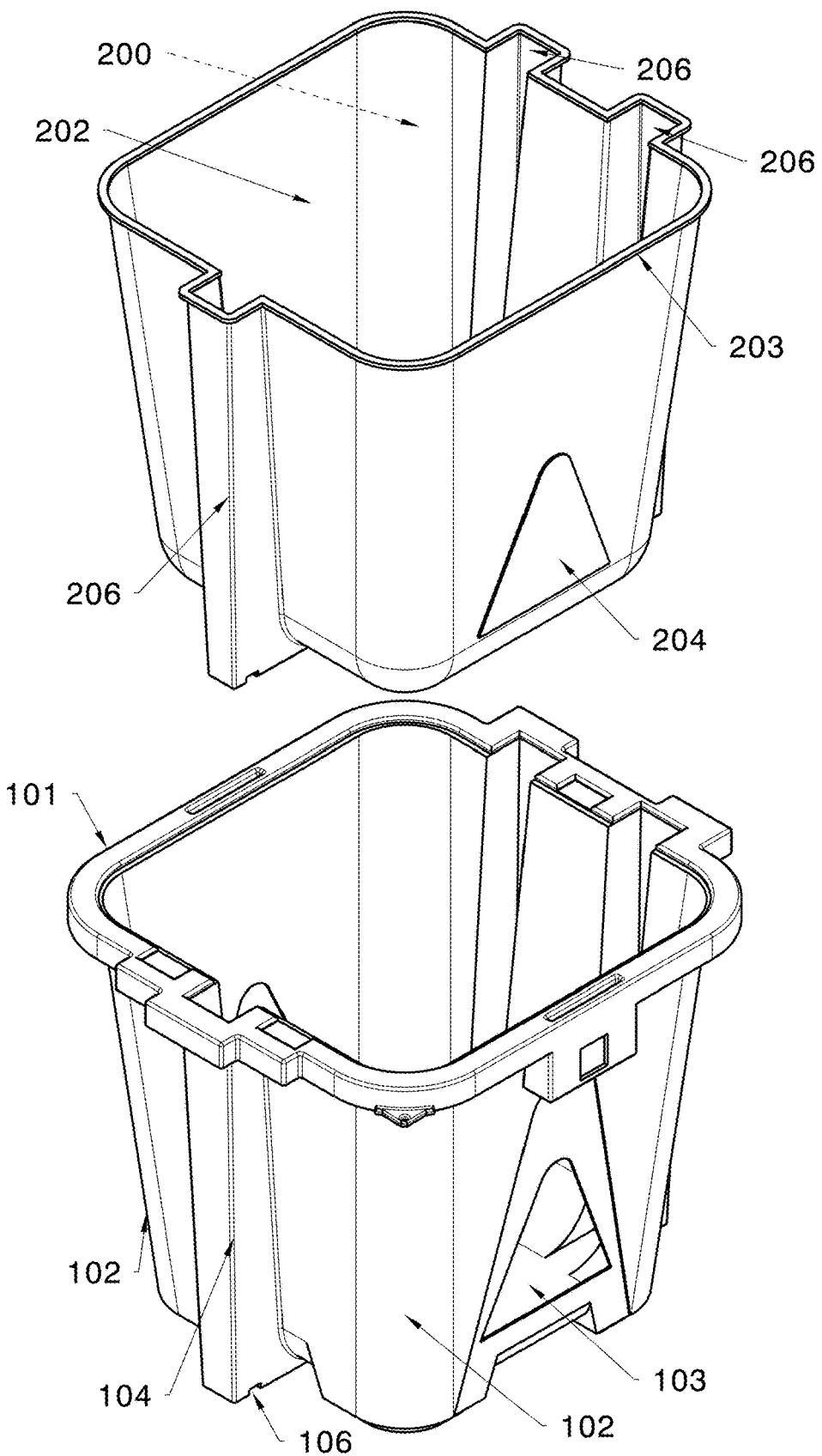
FIG. 44 shows a top exploded isometric view of external container (100) with an alternative embodiment of the internal container (200) of the reinforced containment system.
Figure 45:
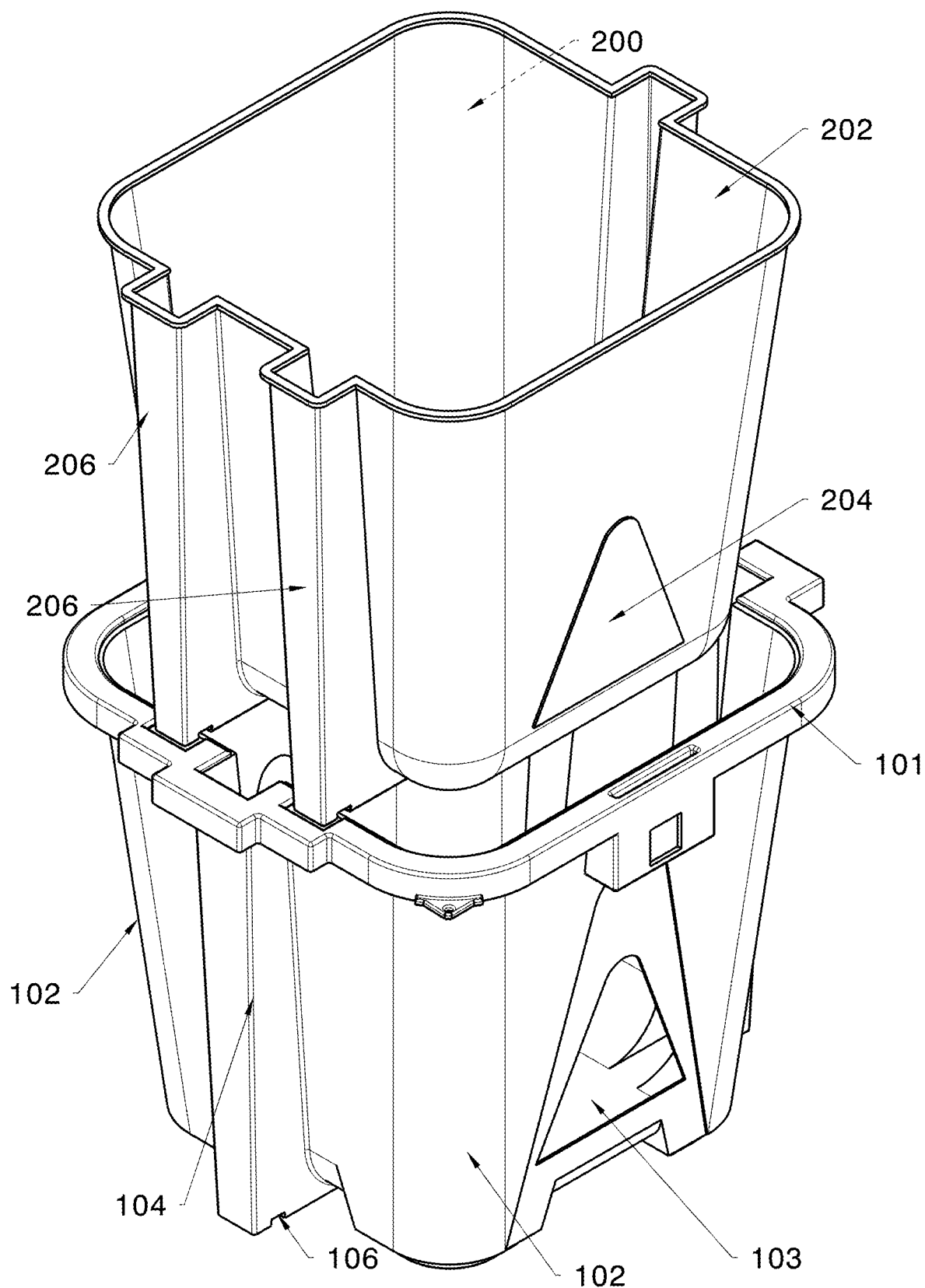
FIG. 45 shows a top isometric view of external container (100) with an alternative embodiment of the internal container (200) stacked from the reinforced containment system.
Figure 46:
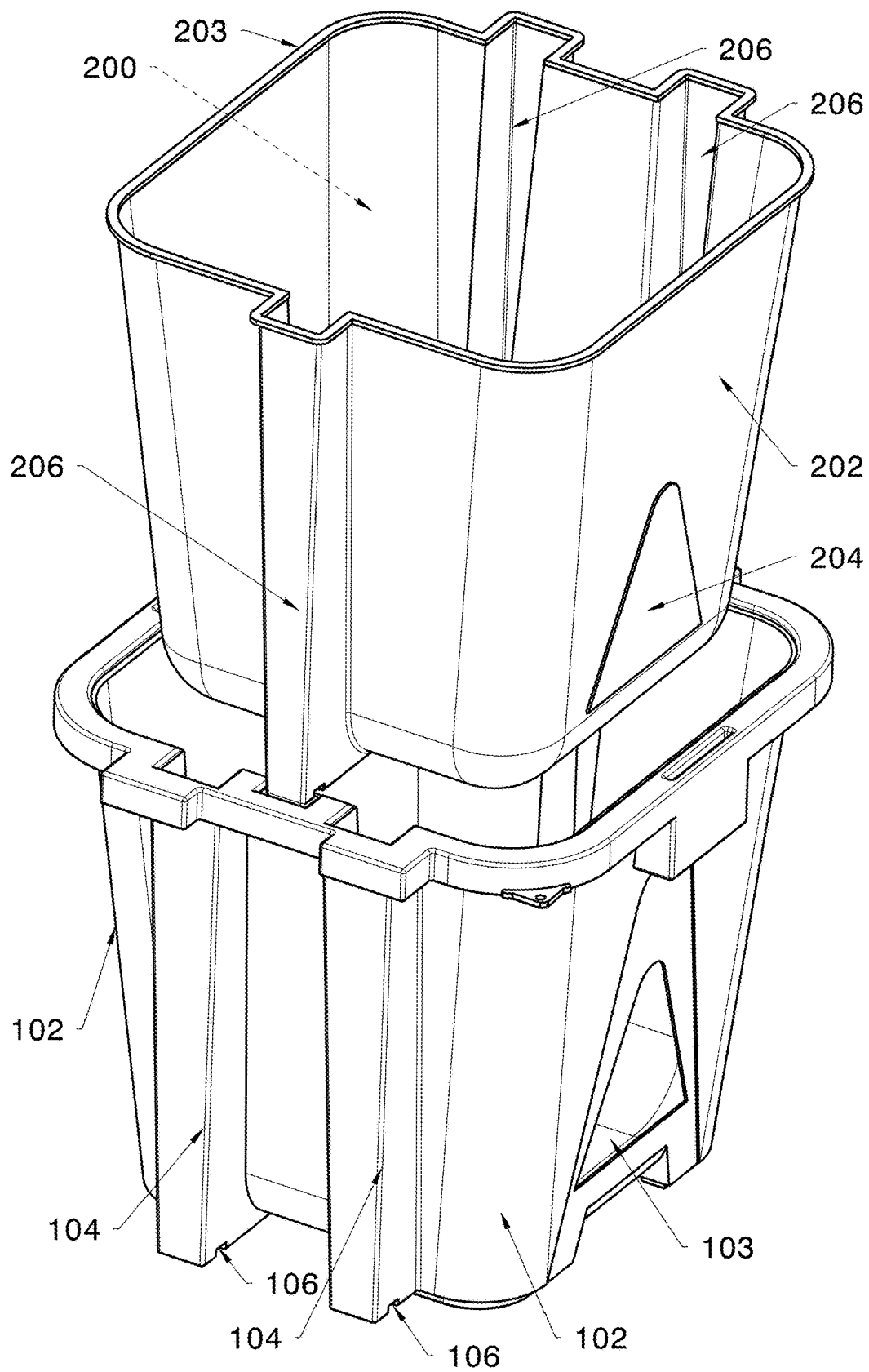
FIG. 46 shows a top isometric view of external container (100) with an alternative embodiment of the internal container (200) stacked from the reinforced containment system.
Figure 47:
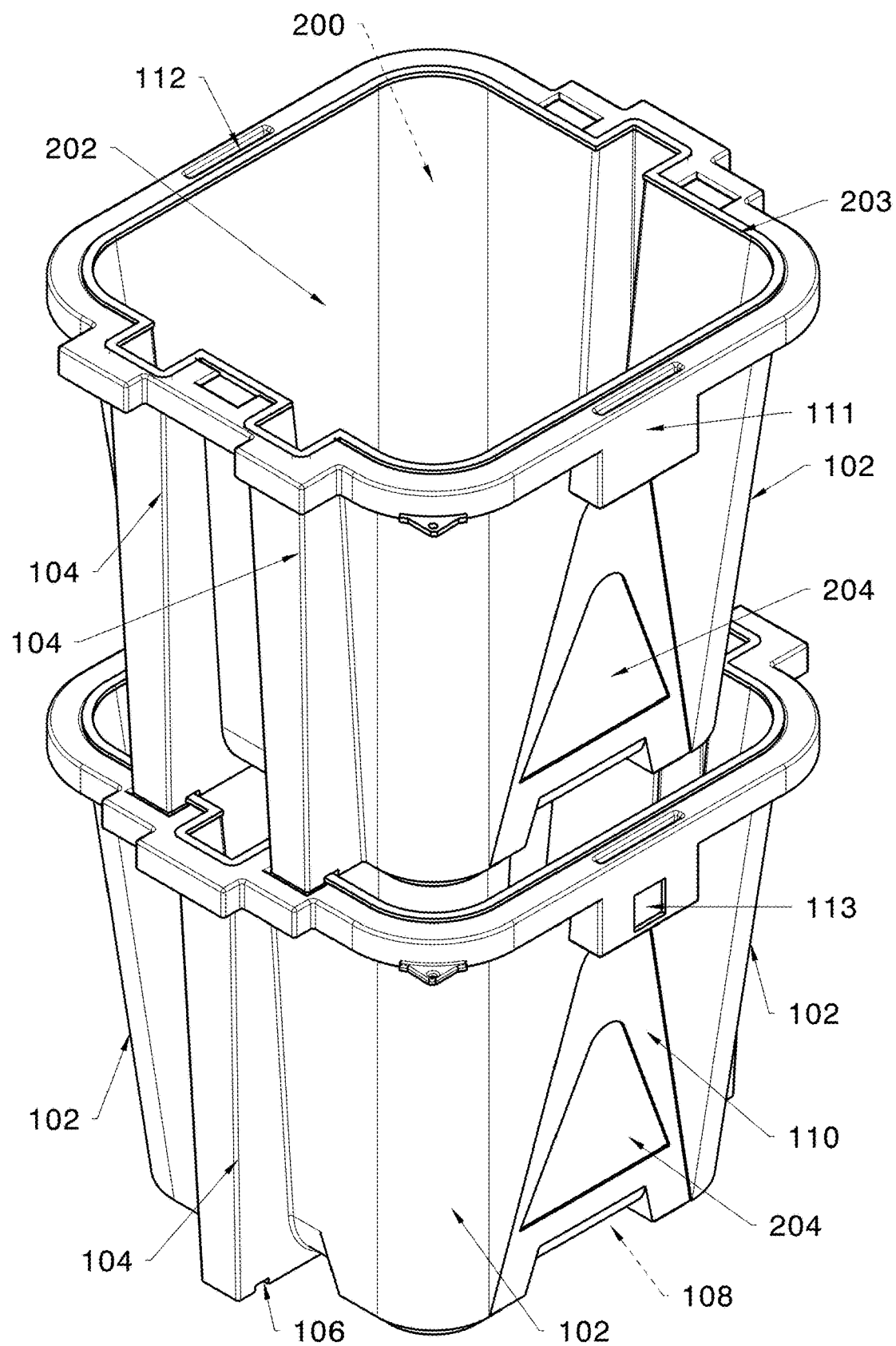
FIG. 47 shows a top isometric view of external container (100) with an alternative embodiment of the internal container (200) stacked from the reinforced containment system.
Figure 48:
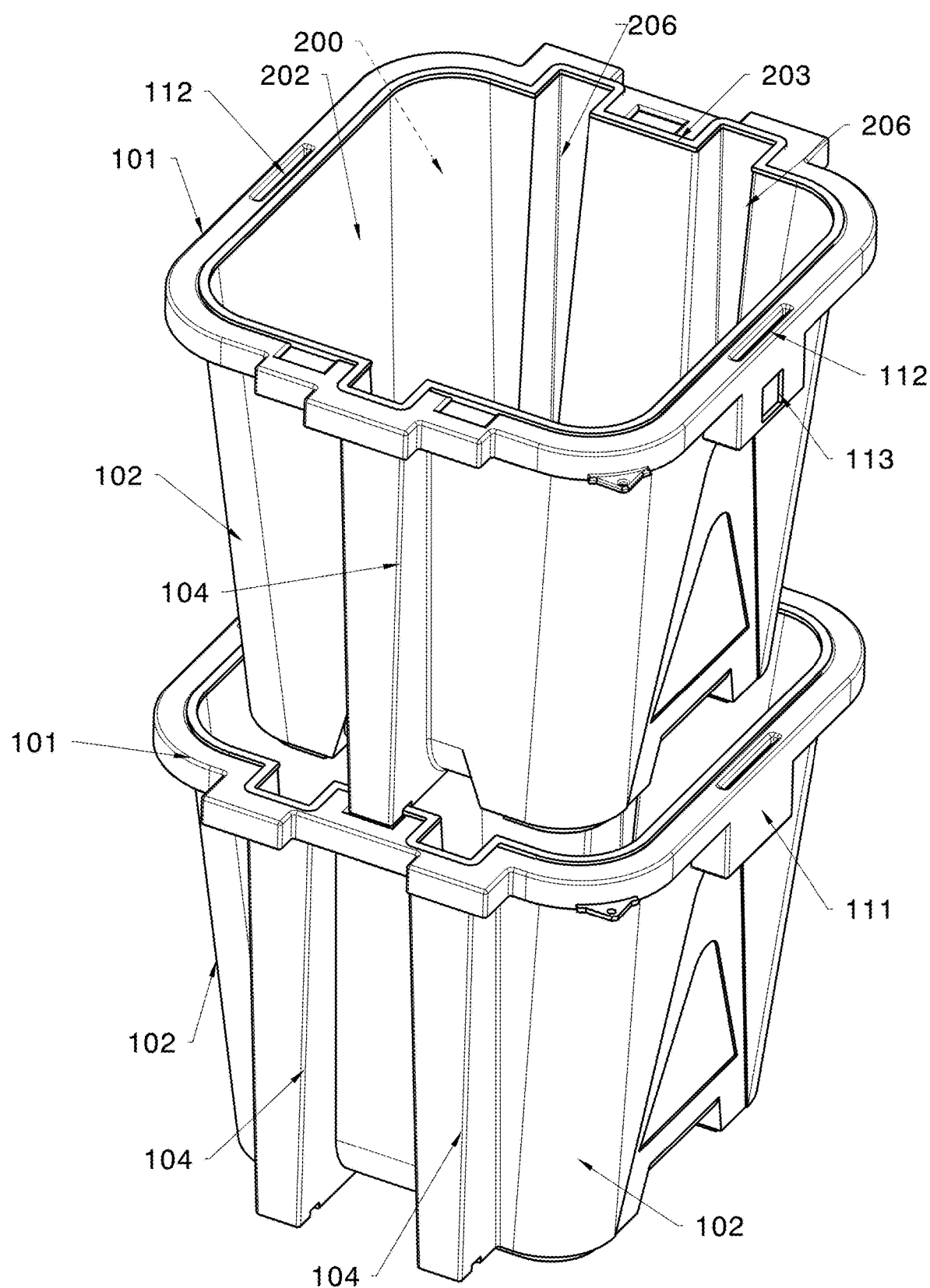
FIG. 48 shows a top isometric view of external container (100) with an alternative embodiment of the internal container (200) stacked from the reinforced containment system.
Figure 49:
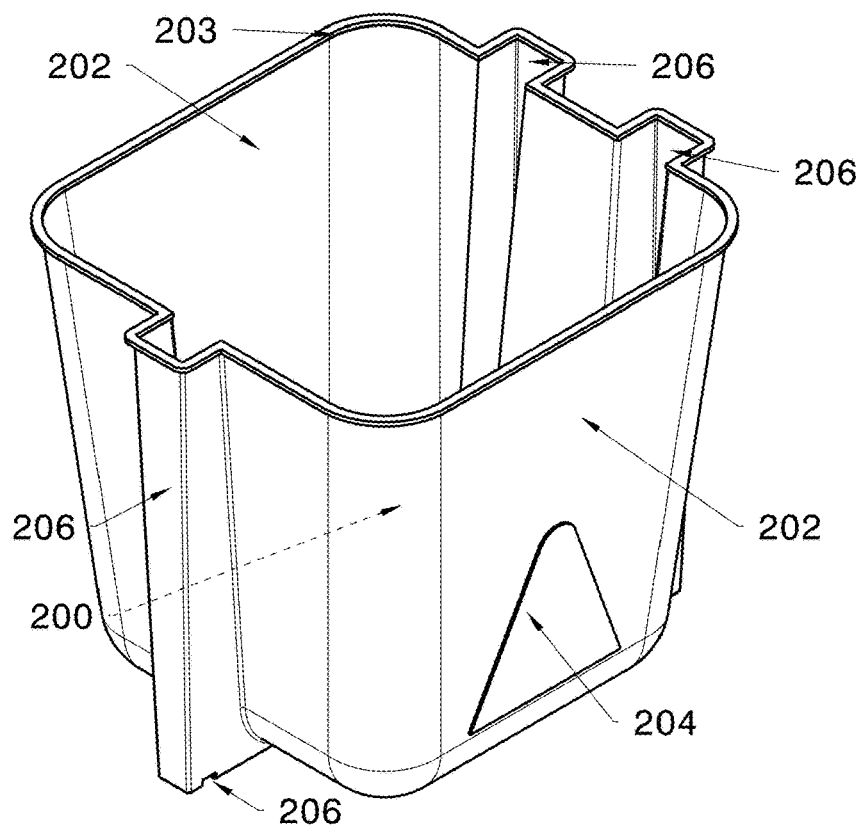
FIG. 49 shows a top isometric view of an alternative embodiment of the internal container (200).
Figure 50:
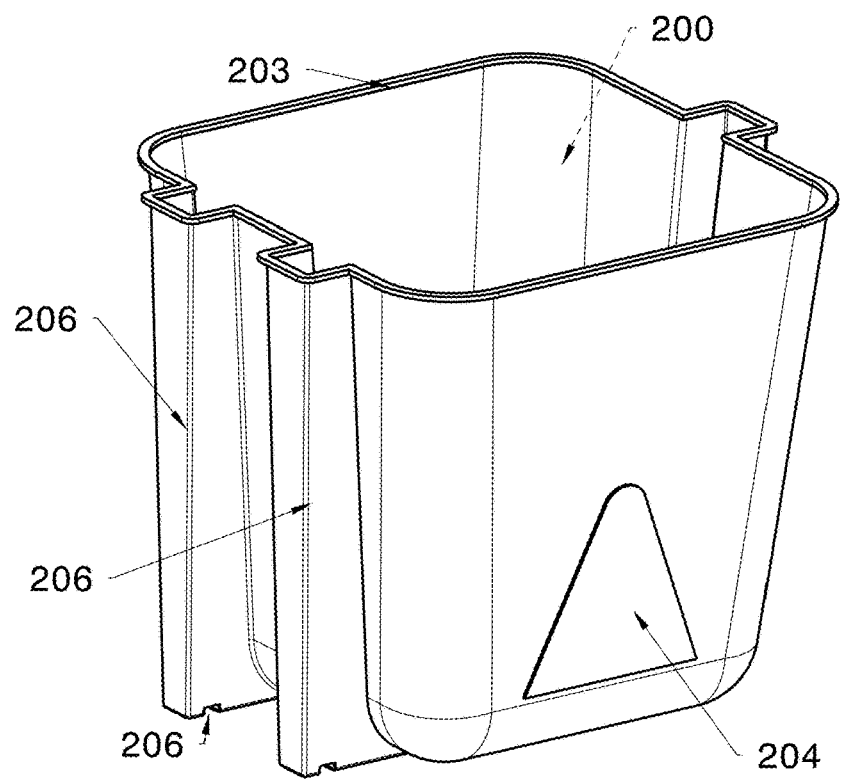
FIG. 50 shows a top isometric view of an alternative embodiment of the internal container (200).
Figure 51:
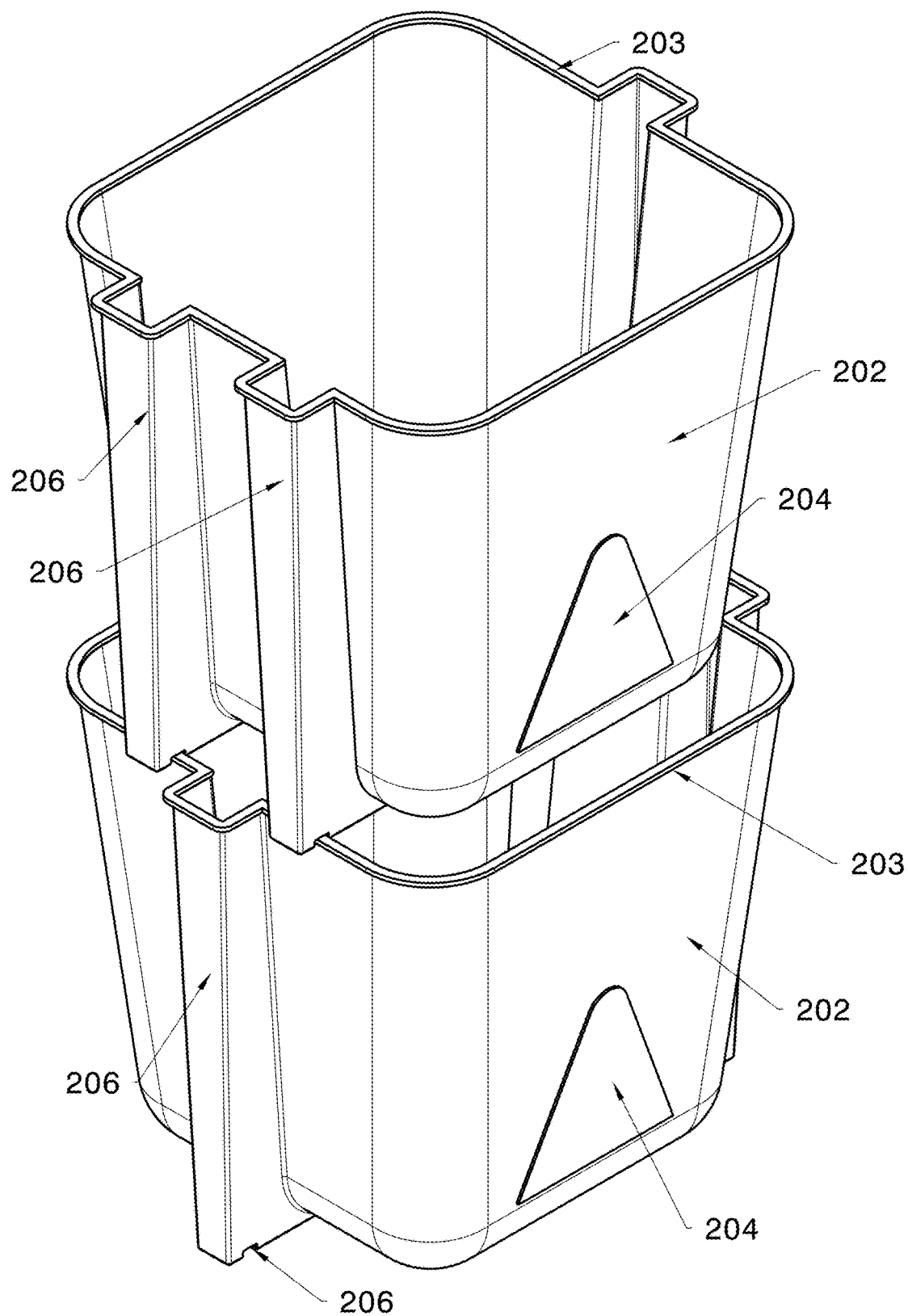
FIG. 51 shows a top isometric view of a stacking arrangement of an alternative embodiment of the internal container (200).
Figure 52:
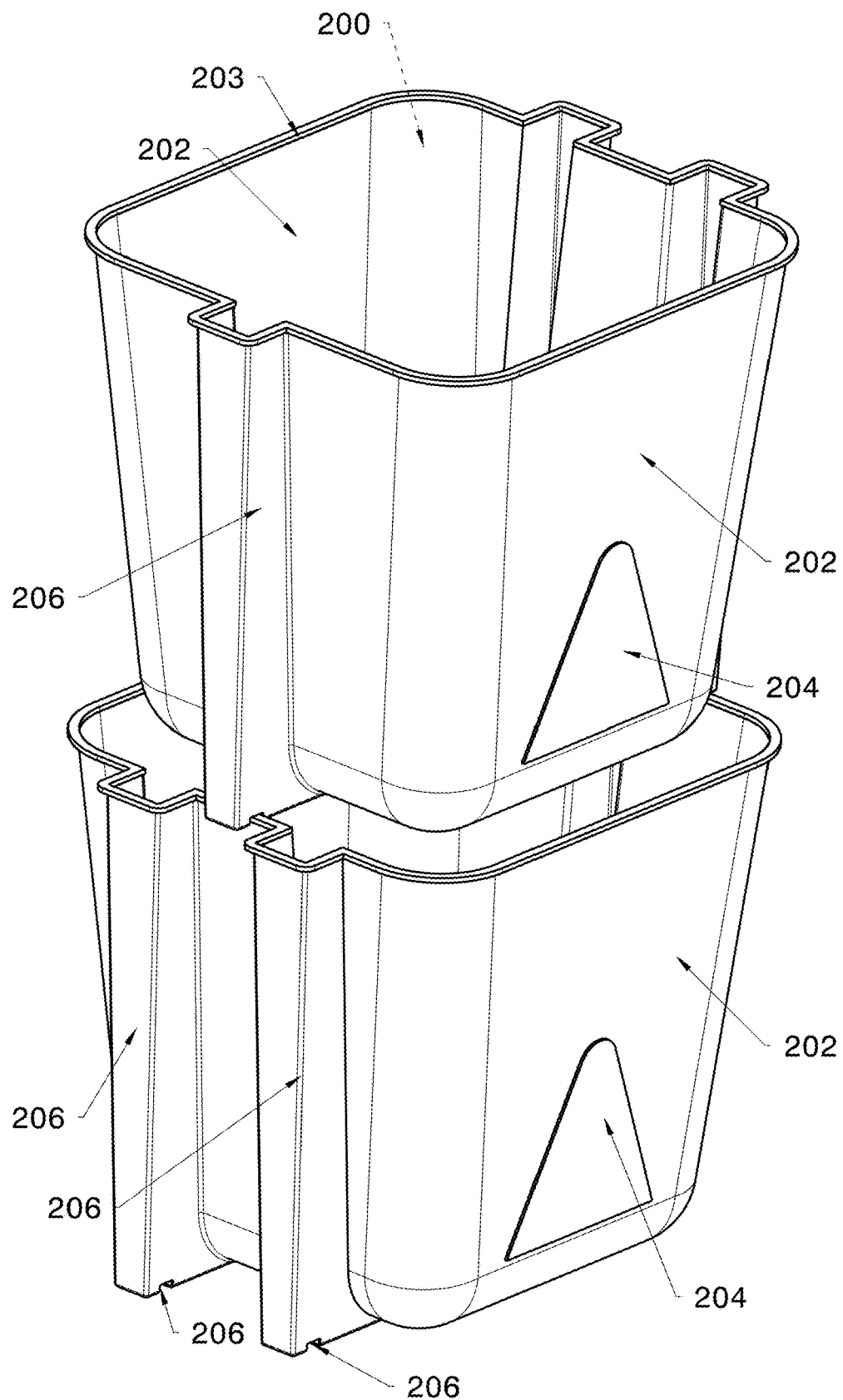
FIG. 52 shows a top isometric view of a stacking arrangement of an alternative embodiment of the internal container (200).
Figure 53:
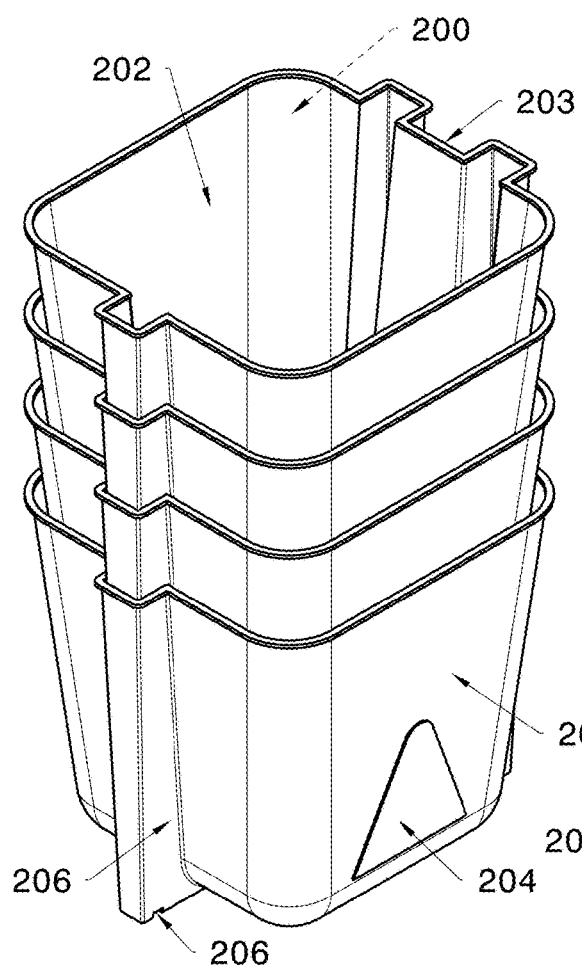
FIG. 53 shows a top isometric view of an inter-insertion arrangement of an alternative embodiment of the internal container (200).
Figure 54:
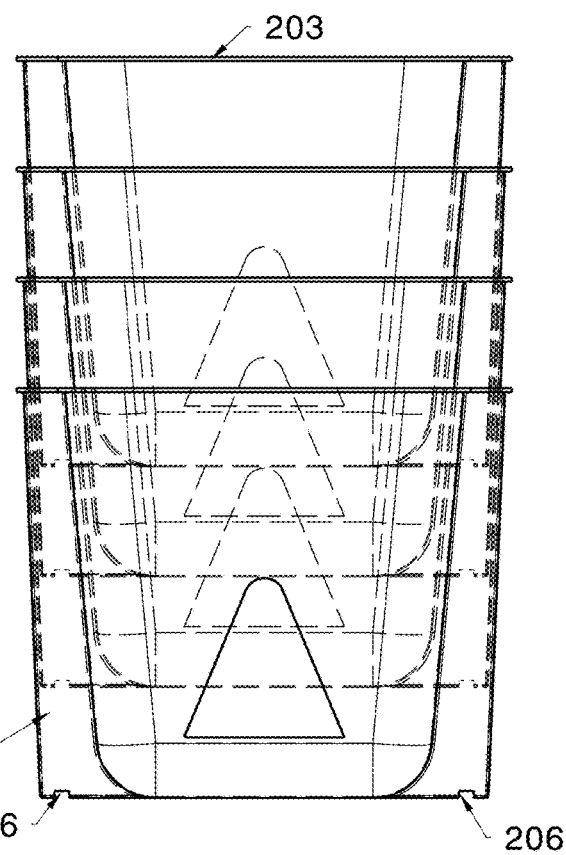
FIG. 54 shows a side view of an inter-insertion arrangement of an alternative embodiment of the internal container (200).
Figure 55:
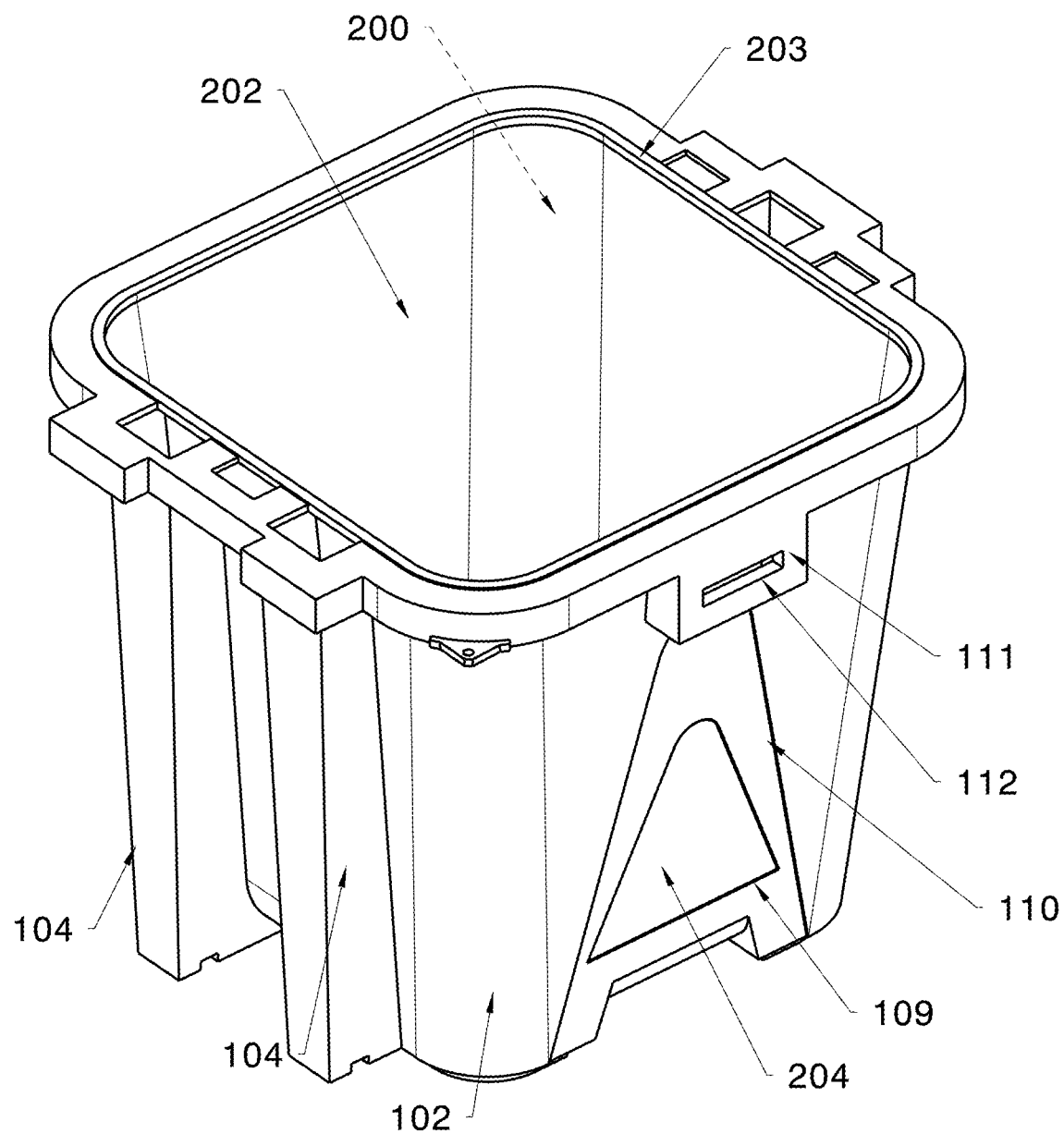
FIG. 55 shows a top isometric view of an alternative embodiment of the external container (100).
Figure 56:
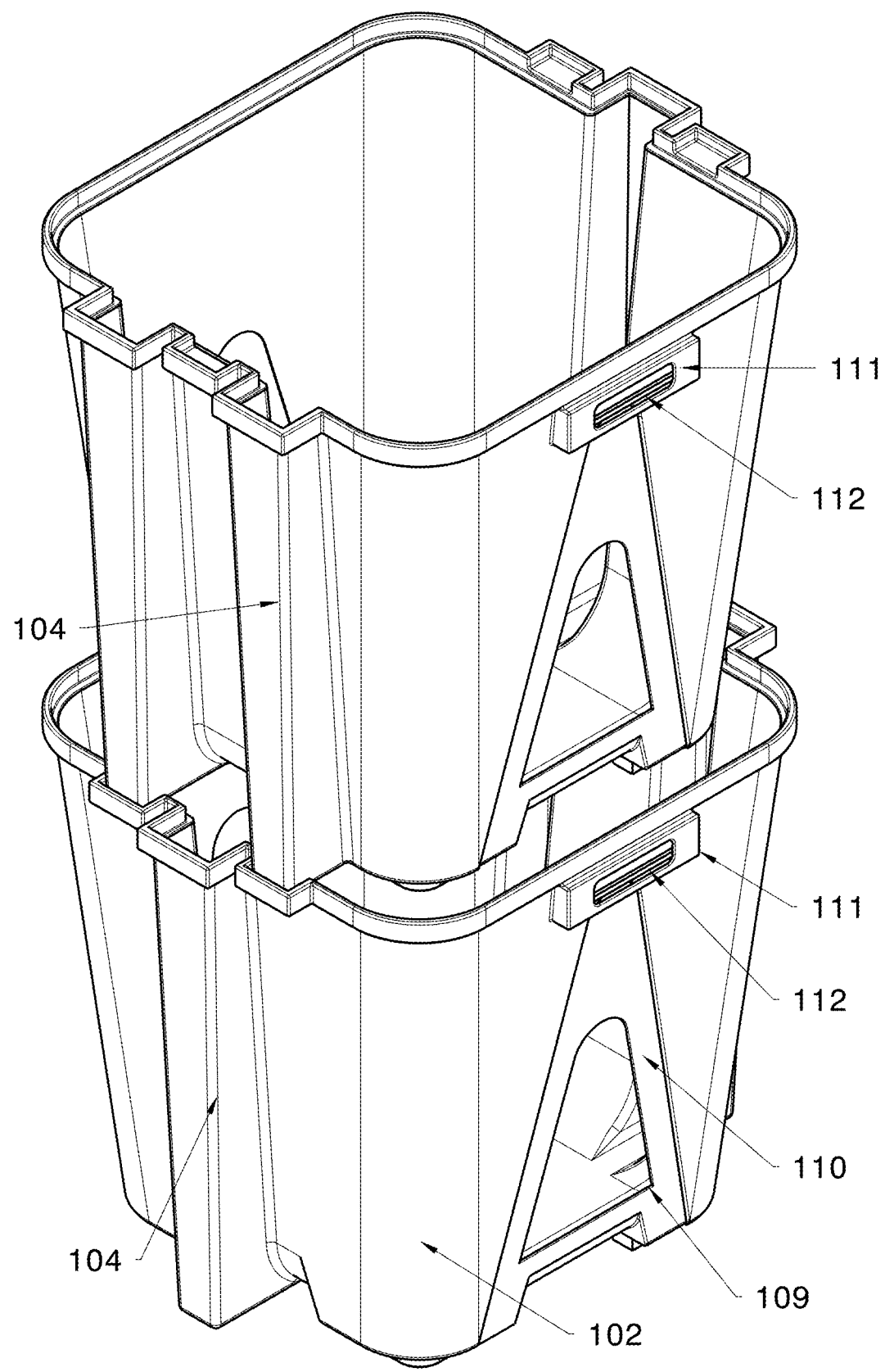
FIG. 56 shows a top isometric view of a stacking arrangement of an alternative embodiment of the external container (100).
Figure 57:
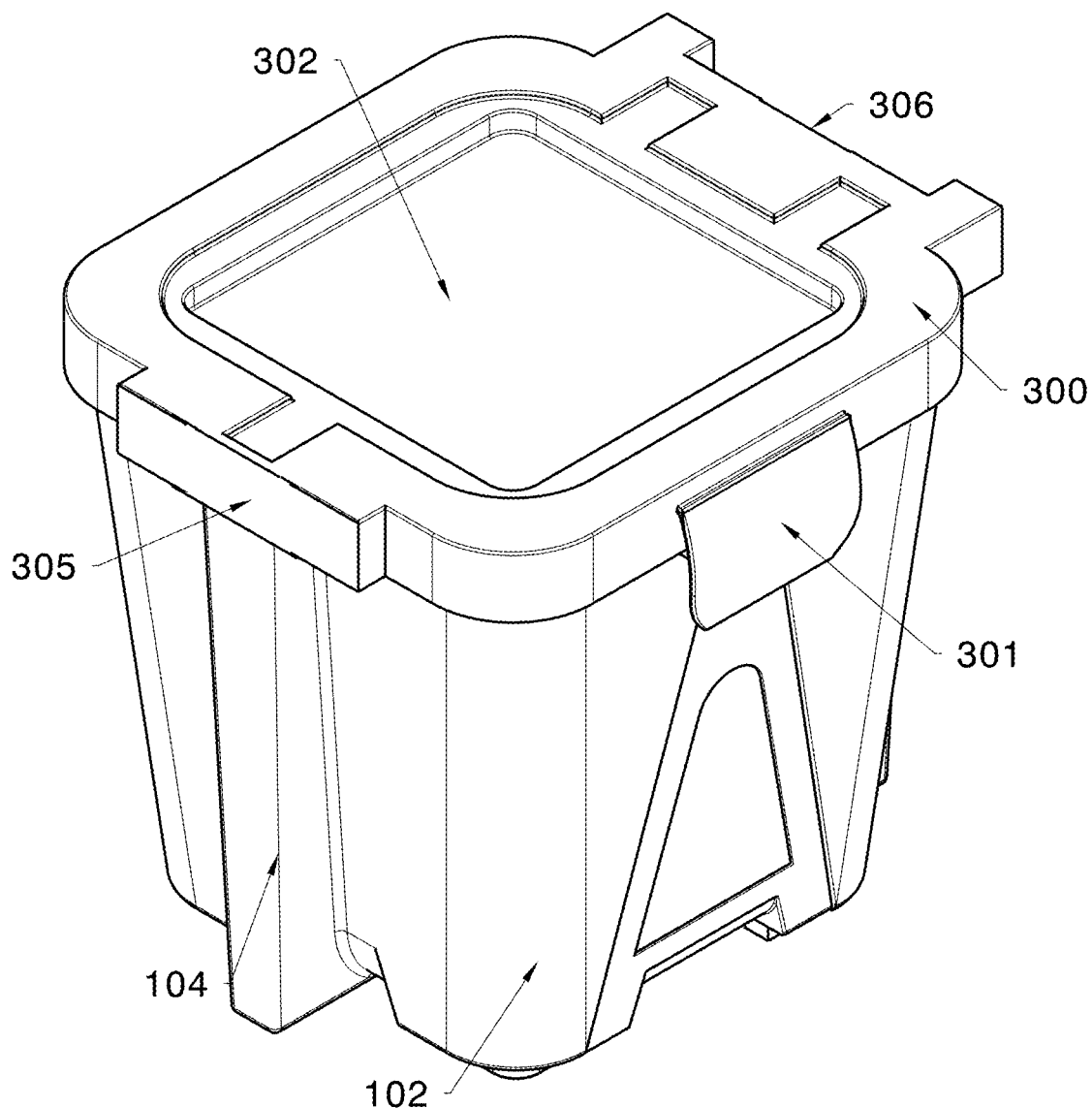
FIG. 57 shows a top isometric view of an alternative embodiment of the cover (300).
Figure 58:
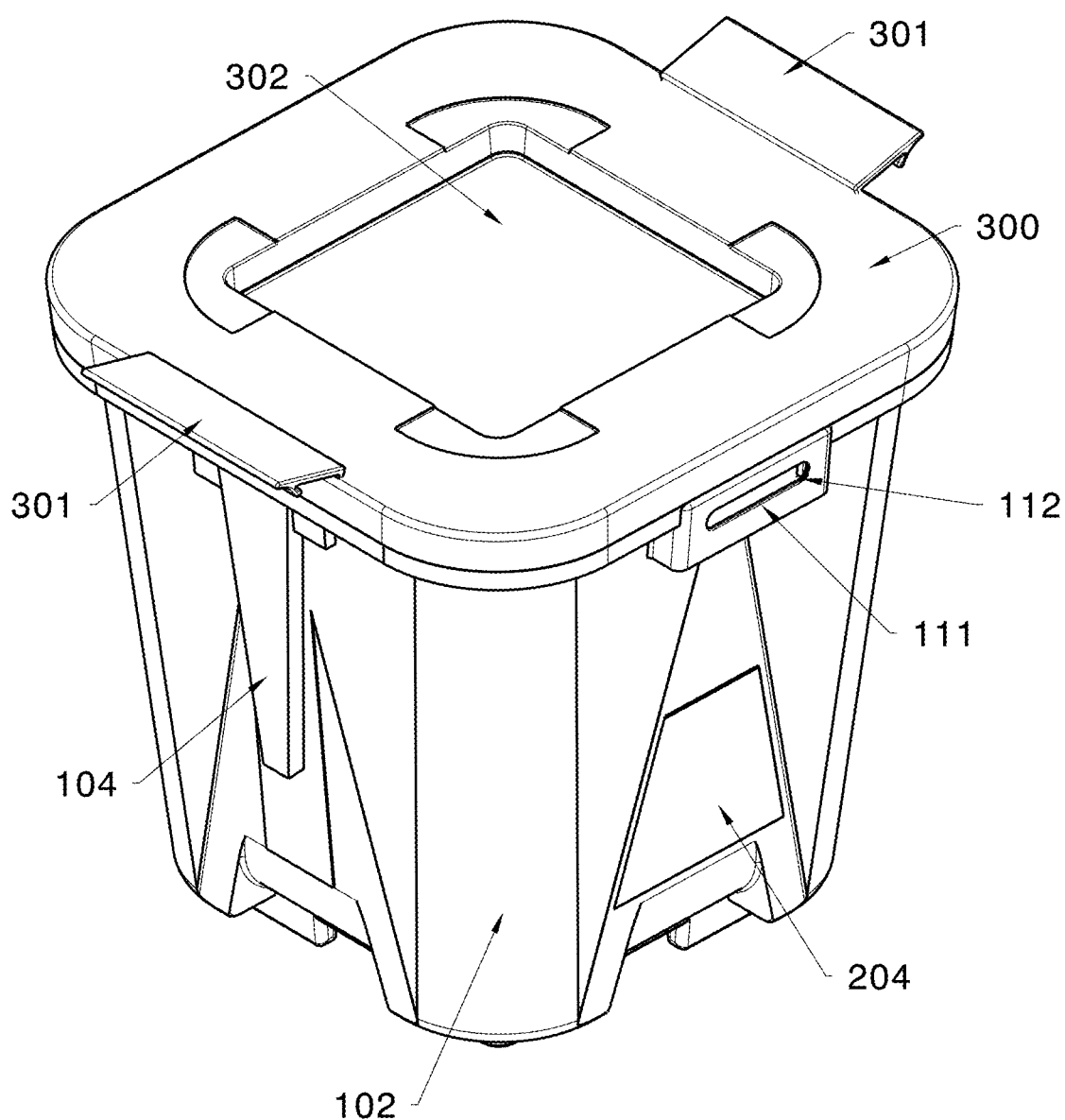
FIG. 58 shows a top isometric view of an alternative embodiment of the cover (300), the internal container (200) and the external container (100) of the reinforced containment system.
Figure 59:
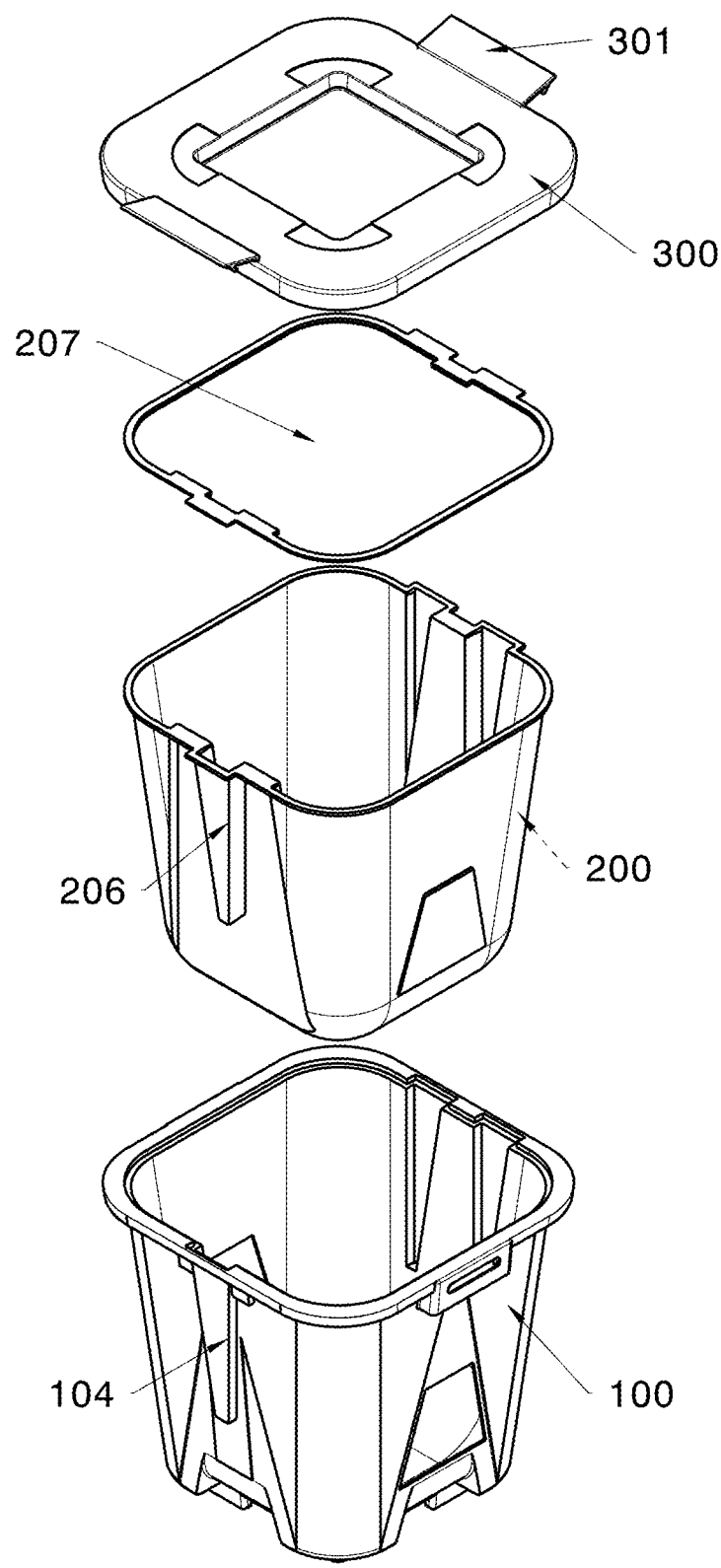
FIG. 59 shows a top exploded isometric view of an alternative embodiment of the cover (300), the internal container (200) and the external container (100) of the reinforced containment system.
Figure 60:
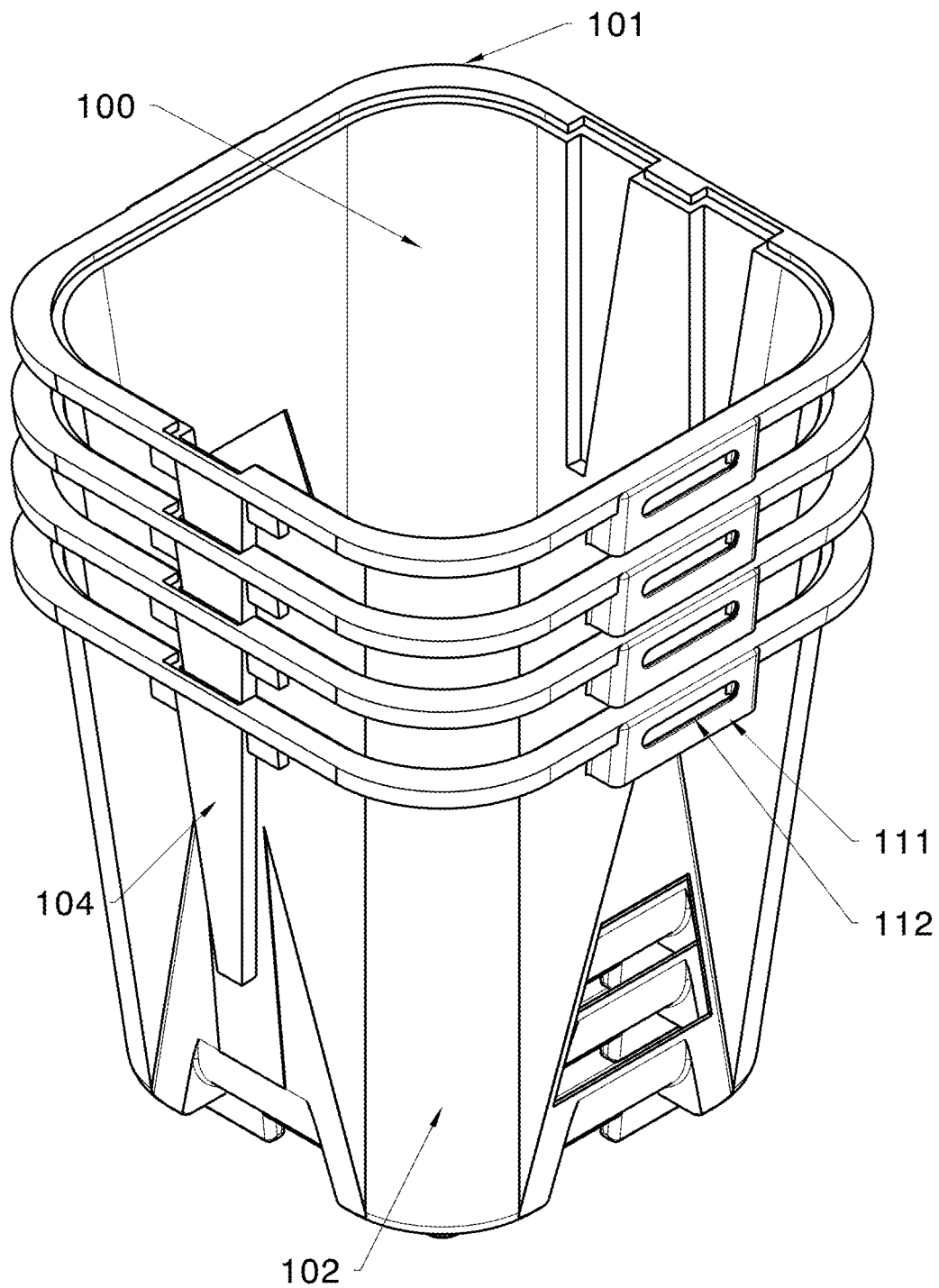
FIG. 60 shows a top isometric view of an alternative embodiment of the external container (100) of the reinforced containment system in an insert arrangement.
Figure 61:
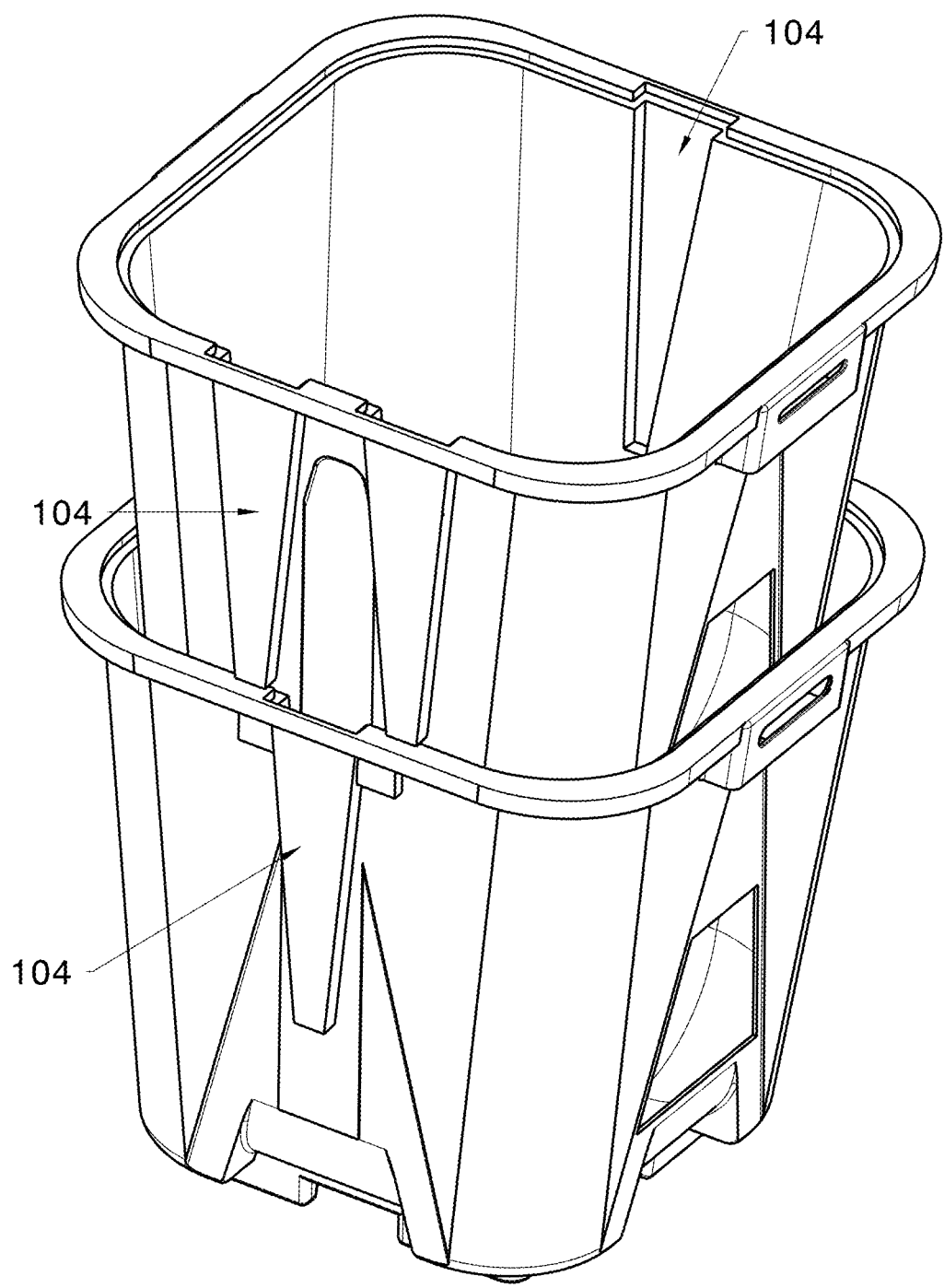
FIG. 61 shows a top isometric view of an alternative embodiment of the external container (100) of the reinforced containment system in a stacking arrangement.
Figure 62:
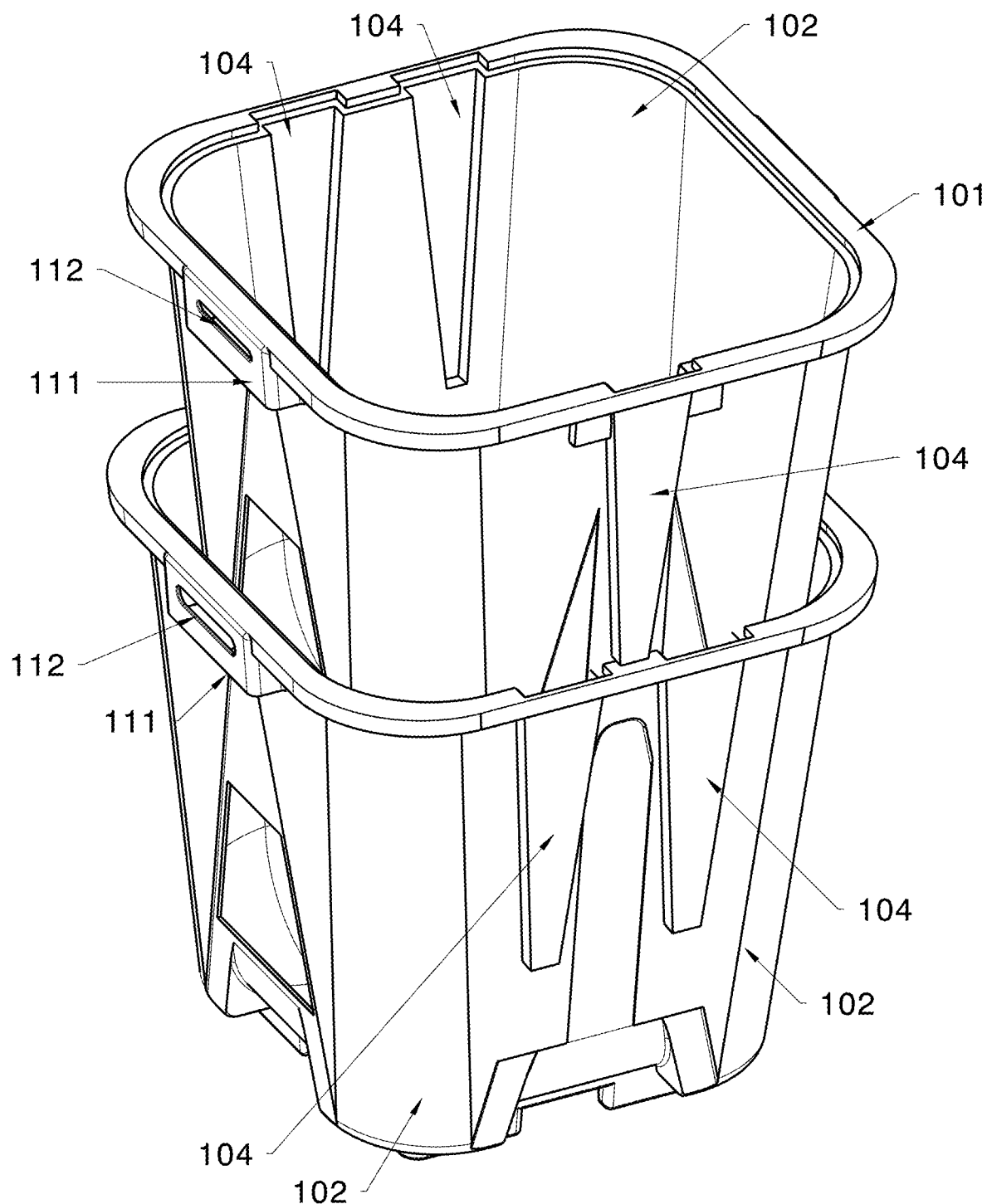
FIG. 62 shows a top isometric view of an alternative embodiment of the external container (100) of the reinforced containment system in a stacking arrangement.
Figure 63:
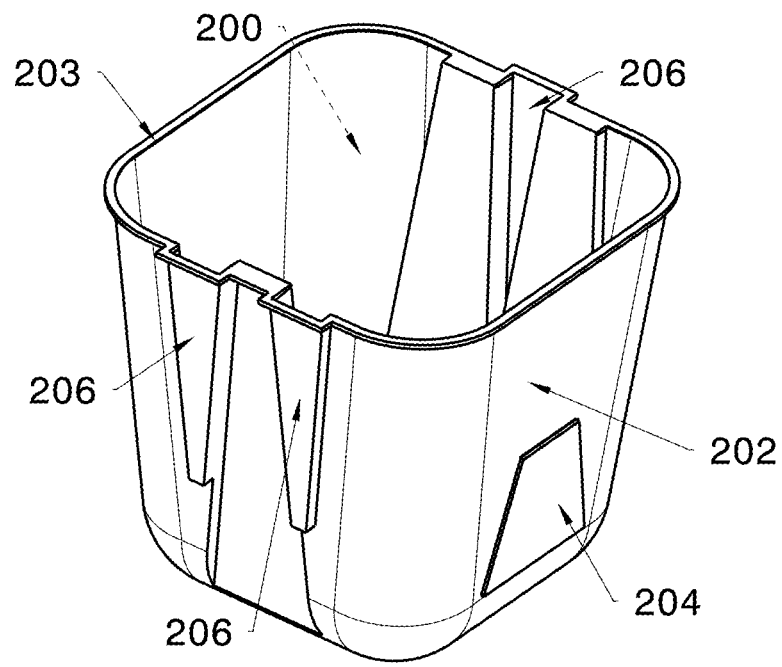
FIG. 63 shows a top isometric view of an alternative embodiment of the internal container (200).
Figure 64:
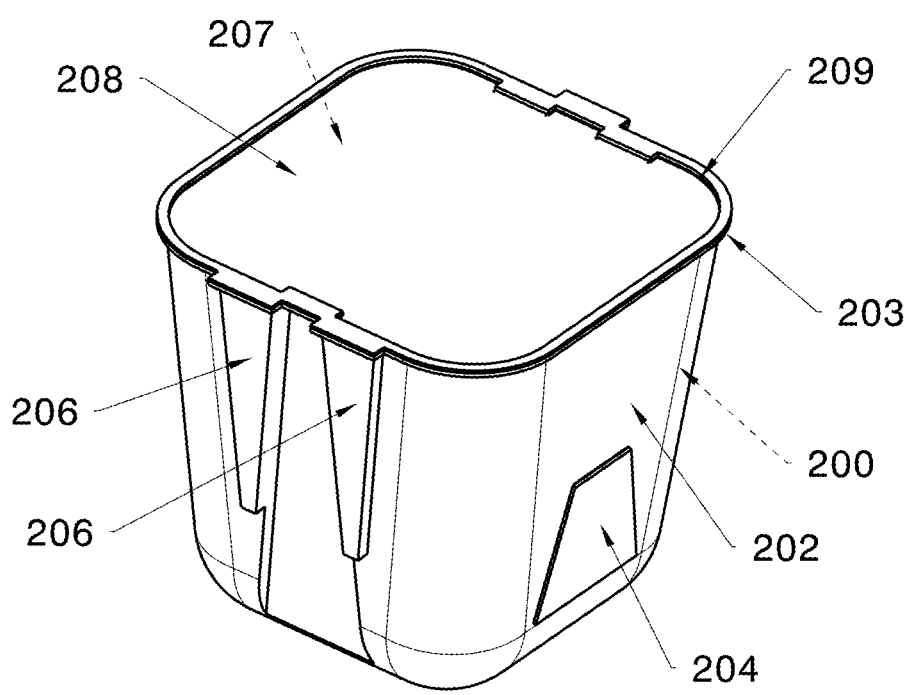
FIG. 64 shows a top isometric view of an alternative embodiment of the internal container (200).
Figure 65:
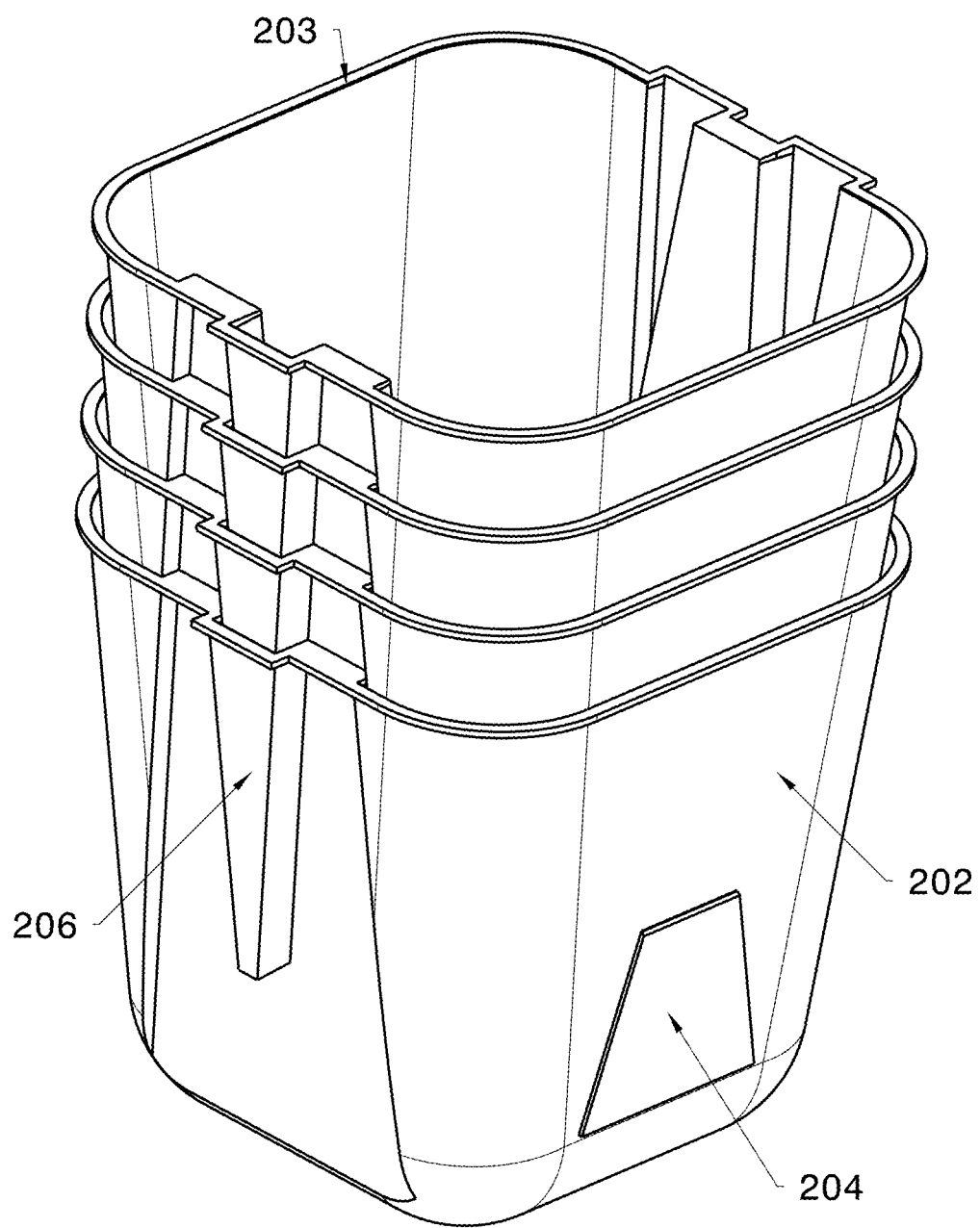
FIG. 65 shows a top isometric view of an alternative embodiment of the internal container (200) of the reinforced containment system in an insert arrangement.
Figure 66:
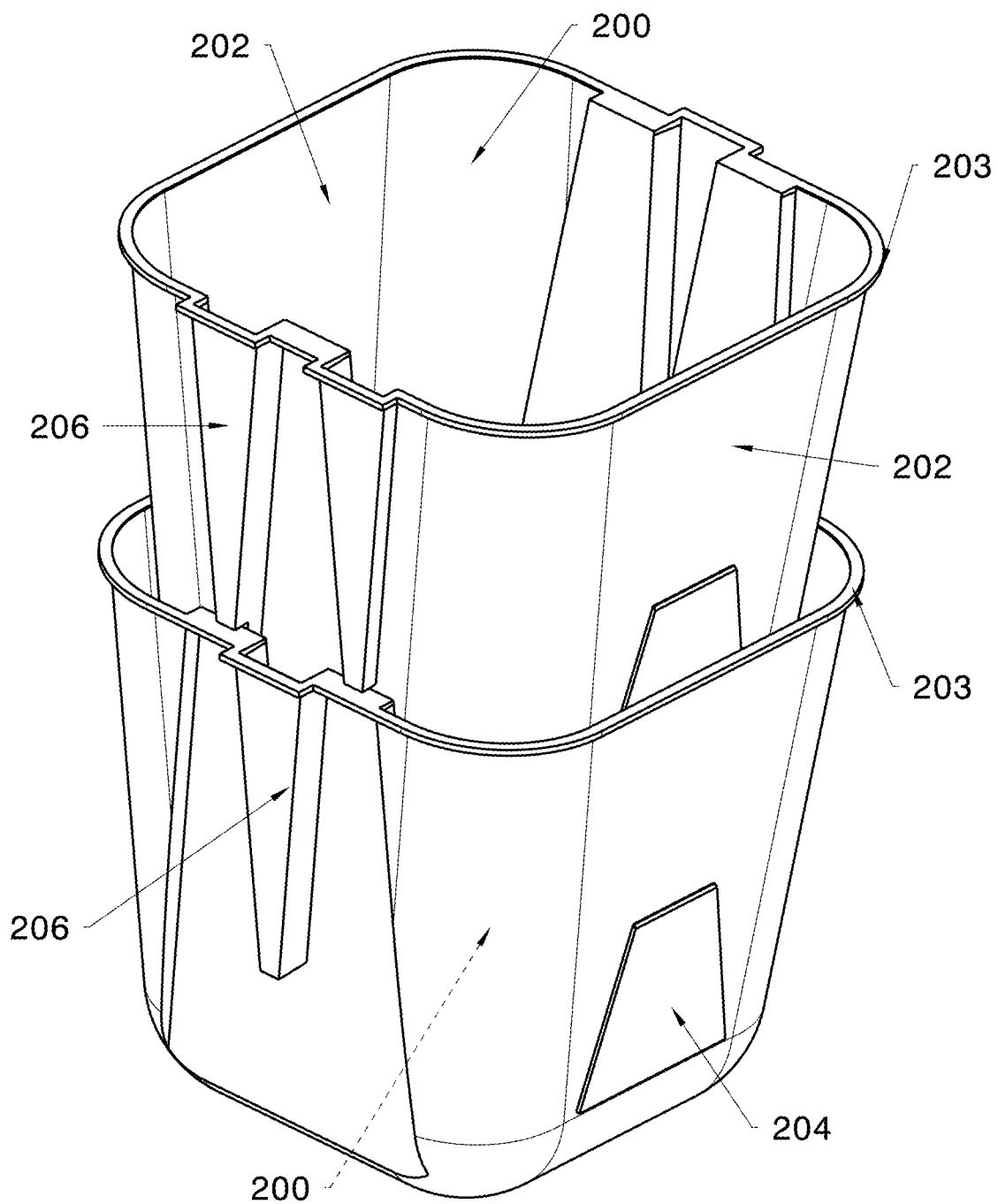
FIG. 66 shows a top isometric view of an alternative embodiment of the internal container (200) of the reinforced containment system in a stacking arrangement.
Figure 67:
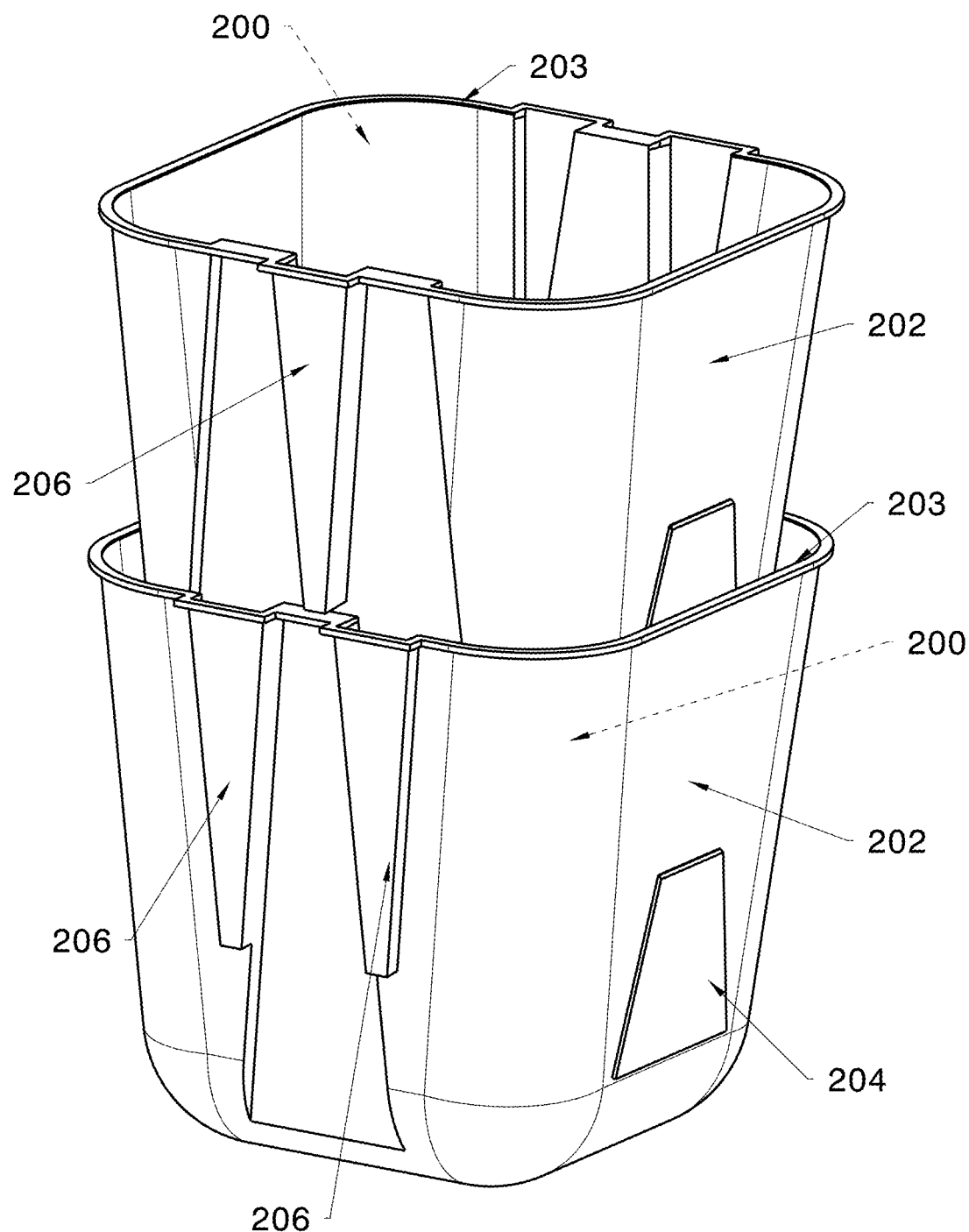
FIG. 67 shows a top isometric view of an alternative embodiment of the internal container (200) of the reinforced containment system in a stacking arrangement.
Figure 68:
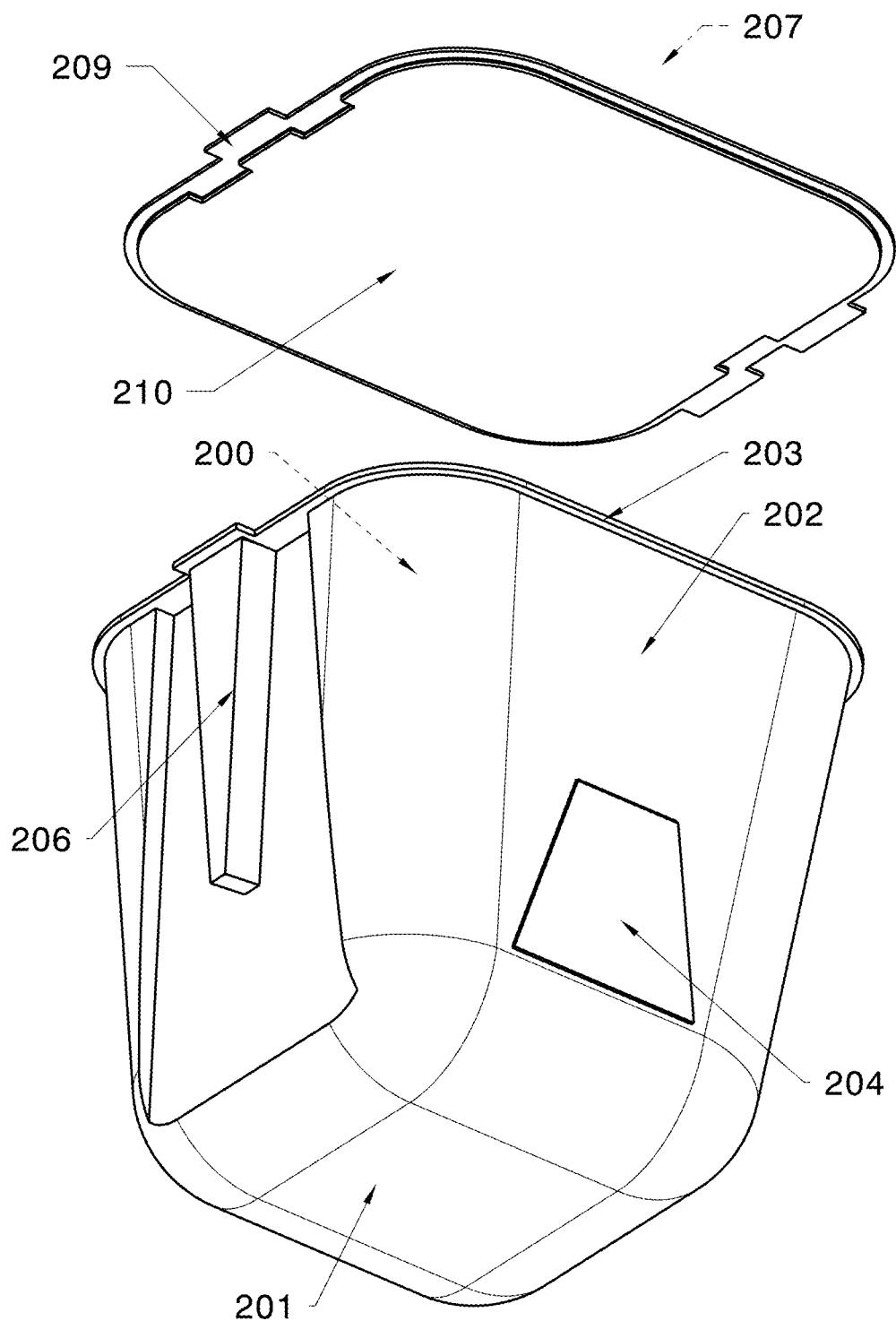
FIG. 68 shows a lower isometric view of an alternative embodiment of the internal container (200) of the reinforced containment system.

The embodiments described in this specification and the configurations shown in the drawings are only preferred embodiments of the present disclosure and, therefore, it should be understood that various modified examples are possible at this time that may replace the embodiments and the drawings described in this specification or that will be referenced to describe some structural component in this application.

Furthermore, similar reference numbers or symbols shown in the drawings accompanying this specification indicate members or components that perform substantially the same function.

The terms used in this specification are used to describe embodiments of the present disclosure. Consequently, it should be apparent to those skilled in the art that the following description of exemplary embodiments of the present invention is provided for illustrative purposes only and not for the purpose of limiting the invention as defined in the appended claims and their equivalents. It should be understood that singular forms include plural referents unless the context clearly dictates otherwise. It is understood that the terms "comprises," "comprising," "includes," and/or "including," when used in this specification, specify the presence of stated features, integers, structural components, or groups thereof, but do not exclude the presence or addition of one or more features, integers, structural components, or groups thereof.

Furthermore, it should be understood that, although terms like first, second, etc., may be used herein to describe various components, these components should not be limited by these terms. These terms are only used to distinguish one component from another. For example, a first component could be called a second component and, similarly, a second component could be called a first component without departing from the scope of the present disclosure. As used herein, the term "and/or" includes any and all combinations of one or more of the listed elements.

Furthermore, in the following description, the terms "inside", "outside", "bottom". "top", "sides", "external", internal", "interior," "exterior," "lower," "upper," "sides," "outside," "inside" are defined based on the drawings, and the shape and position of the components are not limited by the terms. For example, and merely as a reference, when indicating a portion, part, or "lower" zone of the reinforced containment system, it should be understood as the area of some structural component of the reinforced containment system that is closest to the surface where it is placed, such as the floor, a platform, a worktable, among others. Conversely, when indicating a portion, part, or "upper" zone of the reinforced containment system, it is the area of some structural component of the reinforced containment system that is farthest from the surface where it is placed, such as the floor, a platform, a worktable, among others.

According to a first aspect, a reinforced containment system is provided for housing, accommodation and transporting cargo, where said system has an external container comprising a portion configured to receive an internal container and to provide at its upper part a cover means with one or more retention means accessible externally from an upper portion of the external container, where each retention means is configured to releasably retain the external container.

In this way, the internal container can be conveniently placed inside the external container, and since the latter is configured to receive the internal container, it ensures that the latter, as well as the cargo it contains, is securely stored given the external covering provided by the external container. Additionally, couplable means or seating means with assembly or accommodation limit imposition lead the internal container in a releasable manner inside the external container.

The couplable means with assembly limit imposition ensure that the internal container can be easily coupled without the need to disassemble or change any configuration in the external container, in addition to defining a single error-proof entry possibility, which in turn reduces the risk of damaging parts of the containers during disassembly and reassembly when modules are changed, allowing easy use, a more robust container, and simplified manufacturing.

Furthermore, since the external container is not integrally formed with the internal container, they can be used interchangeably with other modules, even having improvements in terms of usability and adaptability, by allowing the user to easily add or replace any damaged internal or external container module.

Preferably, both the internal container and external container can, jointly or separately, also comprise one or more tracking means configured to send and receive data to or from a server. Based on this data, a processor can be configured in each of the containers to perform one or more procedures based on the received data. This allows creating a trackable system to the extent that it can be constantly monitored under various conditions with different parameters, in addition to the position such as transit time, storage temperature, humidity, or logistical issues, allowing the user to more precisely measure the status of various containment systems without having to inspect them personally in situ.

The processor can be configured to monitor status data, comprising the status of one or more of: the container, the device, and the items stored within the container. The processor can also be configured to send a message to a recipient based on the status data and/or the received data. For example, the message can be a request sent to a mobile device associated with the user to indicate that a particular type of module should be inserted, or it can be an alert that the wrong type of module has been inserted, increasing the functionality of the container and providing a significantly safer and more robust user experience.

An additional object of the invention comprises a reinforced containment system where the internal containers further comprise one or more cargo indication means by implementing functional signage on opposite faces, addressing not only signaling, indication, reference, or type of transported content issues but also providing advantages in terms of reinforcement and stability in the reinforced containment system, with each indication means being located in a respective recess on one or more opposite side faces of the external container, providing a clear visual guide for the user about the cargo content.

An additional object of the invention comprises a containment system where both the external and internal containers comprise a cover configured to cover one end of the body, which can be releasably connected to the respective container, allowing further protection of the container's content and preventing it from escaping when transported and subjected to movements in various axes, even when inverted.

An additional object of the invention comprises that the aforementioned cover means can also serve as an assembly means with other cover means present in other containment systems, allowing for organized, standardized cargo transport with minimal intervention of elements and resources to achieve accommodation.

An additional object of the invention relates to a containment system with reinforcement means for cargo in the lateral and bottom portions of the external container.

An additional object of the invention relates to a containment system with anti-slip means on the bottom portion of the external container.

An additional object of the invention relates to a containment system where the internal containers have a configuration that allows them to be coupled or stacked with other internal containers in one and only one assembly position.

An additional object of the invention relates to a containment system comprising containers with sloped walls that promote unlimited insertion of containers of the same type with each other, i.e., stacking internal containers with internal containers and stacking external containers with external containers.

An additional object of the invention relates to a containment system resistant to environmental temperature changes, humidity, sunlight exposure, and durability in daily use with various environmental agents.

An additional object of the invention relates to a containment system made of a moldable material such as a polymeric material like polyethylene or polyurethane.

An additional object of the invention relates to a containment system made, though not limited to, of two types of polyethylene where the external container is made of high-density polyethylene (HDPE) and the internal container is made of low-density polyethylene (LDPE).

An additional object of the invention relates to a containment system capable of storing and transporting (i.e., resistant to movements inherent to transport) liquids or solid foods.

An additional object of the invention relates to a containment system that can receive a liner food seal made of a polymeric or metallic material like aluminum foil that seals the container in which a food product requiring freshness preservation is stored, preventing its deterioration, and maintaining hygiene measures during transport and storage.

An additional object of the invention relates to a containment system suitable for use in outdoor storage applications.

An additional object of the invention relates to a containment system with passage means in different areas of its structure that allow the proper flow of a water current or a cleaning agent when cleaning conditions are established, preventing the stagnation of cleaning substances.

An additional object of the invention relates to a containment system with structural characteristics functional for stacking, assembly accommodation for transport, or providing a base for placing a container.

An additional object of the invention relates to a containment system that includes placement elements for security means such as locks or seals.

An additional object of the invention relates to a containment system with a cover that includes isolation means such as one or more polymeric seals to increase the hermeticity of the transported content.

One skilled in the art will understand that the present disclosure is a description of exemplary embodiments only and is not intended to limit the broader aspects of the present invention, which are incorporated in the exemplary construction. The repeated use of reference characters in this specification and drawings represents the same or analogous features or elements of the invention. Terms and style that appear redundant are intended to avoid any possible lack of clarity regarding the function, arrangement, structure, and advantages of any element of the invention.

The present invention refers to a reinforced containment system that comprises, in a first aspect, an external container (100) whose cavity receives an internal container (200) where both are covered by a cover (300) attachable to the external container (100), sealing and isolating the content of the containment system in general from the exterior in a releasable manner for activities of transporting objects or substances.

Initially, the external container (100) is a structure intended to provide a physical means of structural protection that encloses the internal container (200), reinforcing the containment system of the invention once the internal container (200) is inserted into the external container (100). The external container (100) comprises a reinforced containment body with inclined walls where the bottom has a smaller section compared to the upper part, having an inclination angle between 3 and 7 degrees relative to a vertical surface, more preferably 4 to 6 degrees, and most preferably 5 degrees. The external container (100) at its upper part defines an entry area whose perimeter comprises a load frame (101) at said upper part, which, as mentioned earlier, should be understood as the part farthest from the ground, and edge columns (102) located at each of the lateral edges of the external container (100) that extend from the top to the bottom of the external container (100), which, as mentioned earlier, should be understood as the part closest to the ground and even potentially in contact with the ground, although there will be situations where this is not fully implemented as it could be placed on a platform, a pallet, a table, a general cargo box, among others.

Furthermore, the external container (100) comprises an external portion and an internal portion, understanding the internal portion as the portion that contains a cavity where the internal container (200) is housed. This internal portion has a bottom wall (103), preferably quadrilateral and with rounded edges and vertices, from which load columns (104) are erected on two opposite sides of the external container (100) providing a stacking arrangement that comprises an asymmetric arrangement of load columns (104) starting from the bottom wall (103) and extending to the top of the external container (100), with these load columns (104) comprising an extension facing outward from the body of the external container (100). In one embodiment of the external container (100), there is an arrangement of two load columns (104) on one side of the external container (100) and, individually, a load column (104) on the opposite side of the two previously mentioned load columns (104), with this single load column (104) being centered relative to the arrangement of the two load columns (104) on the opposite side of the external container (100).

Furthermore, on the upper surface of the load frame (101), particularly on the sides of the load column (104) and in the center of the load columns (104) on each respective side, a column receiver (105) is arranged, which maintains a partial cavity shape in the load frame (101) that allows the bottom part of each load column (104) to accommodate during a stacking event achieved when two external containers (100), with or without an internal container (200) inside, are superimposed or stacked with an opposite orientation of 180° relative to a vertical axis to achieve their stacking. This is further assisted by a lower partial slot (106) at each lower end of each load column (104), providing space for the bottom of the external container (100) to be free from contact with the upper periphery of the internal container (200) during a stacking event.

Furthermore, the load frame (101) comprises an internal loading base (107) for the internal container (200), which encompasses the internal periphery of the load frame (101) and is positioned at a lower level compared to the level of the column receivers (105), supporting the upper periphery of the internal container (200).

Subsequently, on each side adjacent to the sides comprising an arrangement of one or more load columns (104), the external container (100) comprises a lateral insertion arrangement (108), which is defined by a through slot (109) and a peripheral recess (110) to the through slot (109), where the peripheral recess (110) provides a thinner wall in the external container (100) that allows it to deform so that a coupling portion of the internal container (200) can be inserted into it. Preferably, the through slot (109) has a triangular shape with a rounded top, although quadrilateral shapes such as squares, trapezoids, among others, are also considered.

On each face of the lateral insertion arrangement (108), a handle (111) is located near or close to the top of the external container (100). This handle (111) comprises a protrusion with an internal cavity that starts from the bottom of the handle (111) and preferably has a U-section connected to the lateral face of the external container (100), as well as an upper slot (112) that runs through the load frame (101) and allows access for cleaning tasks. In a preferred embodiment, one or both handles (111) include a slot (113) for inserting a tracking or monitoring device.

In another preferred embodiment, the handles (111) has the slot (112) positioned laterally instead of the previously mentioned upper position.

A preferred embodiment of the load frame (101) comprises one or several locking plates (114) placed in one or more corners of the load frame (101) parallel to the top of the load frame (101), where these plates include a through hole that allows the insertion of physical locking means such as padlocks or security tapes.

The bottom of the external container (100) comprises a plurality of loading bases (115), each located near the edges where the edge column (102) is situated. These loading bases (115) comprises an extrusion to achieve a certain separation from the ground of the external bottom part of the external container (100), thus avoiding possible wear that could deteriorate its optimal operating condition. Additionally, the loading bases (115) may have an anti-slip arrangement or an impact-absorbing element.

Moreover, in the middle part of the bottom of the external container (100), a plurality of central slots (116) are arranged, allowing the passage of an element, such as a liquid from cleaning tasks, from the interior to the exterior through the bottom of the external container (100). The central slots (116) are also useful for cleaning tasks or in case a container is outdoors and needs to filter and/or allow the exit of an environmental agent such as water or dust.

The external container (100) has a configuration that allows for only one stacking mode, as it comprises an asymmetric distribution of the load columns (104). Thus, in case of attempting stacking with a 180° rotation relative to the allowed insertion position, it ensures that one external container (100) remains on top of another external container (100) in one and only one insertion manner, promoting standardized work sequences, orderly load arrangement procedures, and the preservation of the container structure.

An alternative embodiment of the external container (100) includes load columns that do not extend to the bottom of the external container (100) but are only located up to an area near the middle height of it, allowing for a more invasive stacking that can be useful in accommodation tasks.

Regarding the internal container (200), it comprises a containment structure that will directly store the content to be transported, which can be an article or articles, and even liquid solutions for food, pharmaceutical solutions, personal items, hygiene products, among others.

The internal container (200) has a bottom (201) whose outer part coincides with the inner portion of the bottom wall (103) of the external container (100) and preferably has rounded edges as well as a plurality of side walls (202) that rise from the bottom (201) with a slope that is parallel to the side walls of the external container (100).

A support frame (203) is placed on the upper periphery of the external container (100) and coincides with the internal loading base (107) in such a way that this support frame protrudes or is at a higher level than the top of the external container (100) when the internal container (200) is inside the external container (100) to prevent the content of the internal container (200) from being contaminated or interfered with by agents present in the load frame (101) of the external container (100).

In a preferred embodiment, the internal container (200) is made of a food-grade polymeric material, injected, blow-molded, thermoformed, or any means of production and covered by a removable seal attached with an adhesive means.

Preferably, the internal container (200) has a wall thickness of a smaller magnitude than the external container (100), preferably one-third the wall thickness of the external container (100), more preferably two-thirds the wall thickness of the external container (100), and most preferably one-third the wall thickness of the external container (100).

The internal container (200) also comprises extrusions (204) on opposite faces of said internal container (200) where these are centered on the corresponding side wall (202) and preferably closer to the bottom of the internal container (200) and when the internal container (200) is inserted into the external container (100), these extrusions (204) align with the through slots (109) on the faces of the external container (100). Preferably, the extrusions (204) have a triangular shape and a compressible configuration that allows them to deform in the direction of the side wall (202) where they are located on the internal container (200) as it is being inserted into the external container (100) due to the pressure from the latter's side walls and extend when they align with each through slot (109), allowing their passage. This functional insertion provides reinforcement, creating a solid, resistant, and stable structure, where the surface of the extrusions (204) can preferably have an indicator means to identify or signal the content of the internal container (200), as it directly houses it. The indicator means can be an adhesive, a label, or printed, or even an indicator formed from the same material as the extrusions (204).

Preferably, on opposite faces of the internal container (200) that do not comprises an extrusion (204), there is an arrangement of load columns (206) with a lower slot (205) present from the top to the bottom of said internal container (200), where these can be inserted together with the body of the internal container (200) inside the external container (100) as their profiles and/or faces are parallel to the side walls of the external container (100).

This embodiment of the internal container (200) has a configuration that allows for only one stacking mode among internal containers (200), as it comprises an asymmetric distribution of load columns (206). In the event of attempting stacking with a 180° rotation relative to the permitted insertion position, it ensures that one internal container (200) remains on top of another internal container (200). This is particularly relevant in situations where it is necessary to access the content of the internal container (200), such as in a production line, worktables, or sequential activities where multiple containers with products need to be efficiently and orderly accessed, requiring smaller spaces compared to containers that do not have a stackable arrangement.

Finally, the top part of the internal container (200) comprises a support frame (203), which maintains a flat configuration and edges that coincide with the periphery of the internal loading base (107) of the external container (100), including the peripheral shape defined by the load columns (206). The peripheral edge includes an outward extension from the support frame (203), achieving a broader top termination of the external container (100) with a base that rests on the bottom of the internal loading base (107) during the accommodation of the internal container (200) in the external container (100).

One embodiment of the invention comprises an internal container lid (207), which aligns with the interior of the support frame (203) located at the top of the internal container (200). Additionally, the lid preferably has a partial recess (208) located on most of its upper surface, preferably near its peripheral edges, achieving a contact surface (209) as well as a lower extrusion (210) that peripherally aligns with the edges of the partial recess (208) and extends into the interior of the internal container (200) when the internal container lid (207) is placed on the internal container (200).

An alternative embodiment of the internal container (200) includes load columns for both the external container (100) and the internal container (200) that do not extend to the bottom of the external container, but rather are located up to an area near the middle height of it, allowing for a more invasive stacking of containers that can be useful for accommodation tasks.

The system structurally concludes with a cover (300), which comprises a closing structure that extends to encompass the external periphery of the upper of the external container (100) and comprises movable pressure closing means (301) on at least two of its ends, as well as a receiving base for the bottom of the external container (100). The cover (300) includes a stepped central recess (302) that has a delimiting periphery with a first contact surface that matches the lower shape of the edge columns (102), the load columns (104), and the loading bases (115) of the bottom wall of the external container (100). The stepped central recess (302) serves as a loading means for the lower walls of the external container (100), comprising the edge columns (102) and the load columns (104), while the loading bases (115) may or may not contact the bottom part corresponding to a second contact surface of the stepped central recess (302), thus ensuring that the cover (300) is functional in preventing the external container (100) from being placed in direct contact with the ground at any time.

In a preferred embodiment, the internal part coinciding with the internal container (200) and the external container (100) of the cover (300) comprises a receiving guide (303) for a hermetic sealing means (304) that matches the upper part of the support frame (203) of the internal container (200), ensuring closure and increasing the likelihood that the content of the internal container (200) does not escape to the outside.

Other embodiments include, in addition to a polymeric hermetic sealing means (304), a seal made of metallic material or even cellulose seals with an adhesive configuration on their periphery that adheres to the support frame (203) of the internal container (200) to seal its content when, for example, transporting food.

Furthermore, the cover means has an accommodation arrangement that comprises a laterally assemblable configuration with an insertion portion (305) that has a protruding body relative to the upper portion of the cover means, with an insertable means protruding from the protruding body, and a receiving portion (306) that comprises a receiving cavity for the protruding body and the insertable means of the insertion portion. This receiving portion is on the opposite side of the cover means from the insertion portion (305), allowing for a stable arrangement during transport that reduces the use of fixation means such as tapes, wraps, seals, or adhesive bonding means.

In an alternative embodiment, the cover (300) includes one or several locking plates (307) located at points coinciding with the locking plates (114) of the external container (100).

Alternative embodiments of the cover (300) include movable closing means (301) located in areas near the retention means (111) of the external container (100), as well as alternative retention means to the mentioned pressure, considering that the cover is also applicable to other types of closures, such as pressure closures that are removed by leverage, rotating closures that latch onto fasteners on the container.

The reinforced containment system also comprises tracking or monitoring systems for packages, which preferably include in the slot (113) that receives content in some part of the reinforced containment system structure, preferably and as an example in this descriptive memory, the lateral part of the retention means of the external container (100), where a slot (113) is provided, as well as incorporating a closure to seal the housing containing:

a network module,
a sensor module, and
a battery module.
where the battery module provides power to the network module and the sensor module, while the sensor module provides location information to the network module, and the network module transmits a shipment status message to an external device. It is even possible to include one or more labels with status information, position, temperature, time diagrams with positions, time diagrams with temperatures, and other parameters such as humidity during the shipment of the package so that a series of parameters related to the transport service is received on the external device, which can be a computer or computer systems, in a memory module. Variations in service level parameters can be detected by the sensor module to be compared, for example, with a logistics program. Tracking or monitoring the package is particularly relevant while the package is being transported between an origin and a destination, especially when the integrity of the cargo can be compromised by the waiting time upon arrival. Therefore, the sensor data obtained from the sensor module, which can include a plurality of sensors such as position sensors, accelerometers, temperature, and humidity sensors, can be compared with predetermined values to determine if the package has been exposed to a potentially harmful or dangerous environment. In addition to monitoring temperature, humidity, and other environmental factors, the sensors can also control the permissible opening of the main cover, movements, and changes in the location of the package. This allows users to track in real-time the location and conditions of the package throughout its journey.

Additionally, it is possible to provide immediate alerts if any unusual activity is detected, which can help prevent unintentional route deviation, theft, damage, or even the loss of the package. Furthermore, package monitoring can also provide valuable information on shipping and delivery patterns, which can help improve the efficiency and speed of package delivery.

Using a communication network, package monitoring data can be transmitted to the cloud and accessed in real time by shippers, recipients, and other stakeholders with access permissions to the information contained, turning the monitoring and tracking of this invention's containment system into a powerful tool that can provide significant benefits for transportation companies, e-commerce businesses, and anyone shipping or receiving packages. By allowing real-time monitoring of the package's location and conditions, security, efficiency, and customer satisfaction in package delivery can be improved.

Preferably, regarding the transmission of a shipping status message through the network module to an external device, the shipping status message is based on sensor data. A shipping information label can be included with the shipment package.

According to yet another aspect of the present invention, package tracking or monitoring systems can be provided as a replacement kit, where the kit contains insertion means in the slot (113) and simultaneously comprises a network module; a sensor module; and a battery module, with the latter being incorporated into a single electronic and sensor unit or even as individual connectable modules.

Alternatively, it is possible to attach a memory module to the network module, battery module, and sensor module to store the monitoring data. Once the package reaches its destination, the stored data can be downloaded and analyzed to obtain valuable information about security, performance, and other aspects of the shipping process. This also allows the containers to be subject to a collection service or any continuous collection cycle in which they are captured after being emptied regularly for reuse or recycling intervention.

In some embodiments, the package tracking or monitoring system implemented in the reinforced containment system is configured to establish mesh communications with other containers through short-range devices like Bluetooth or long-range networks like cellular networks, allowing for broader and more efficient package monitoring coverage.

Therefore, while the present invention has been illustrated by describing a specific embodiment, and although this embodiment has been described in considerable detail, it is not the intention of the applicant to restrict or limit in any way the scope of the appended claims to such details. Furthermore, those skilled in the art will appreciate additional advantages and modifications from the disclosure. Therefore, the invention in its broader aspects is not limited to the specific details, representative apparatus, and method, and illustrative example shown and described. Consequently, deviations from such details can be made without departing from the spirit or scope of the applicant's general inventive concept.

These and other deviations, modifications, and variations of the present invention can be practiced by those skilled in the art without departing from the spirit and scope of the present invention, as set forth more particularly in the appended claims. Furthermore, it should be understood that aspects of the various embodiments can be exchanged wholly or partly. Additionally, those skilled in the art will appreciate that the foregoing description is only by way of example and is not intended to limit the invention, which is described in greater detail in the appended claims. Therefore, the spirit and scope of the appended claims should not be limited to the description of the preferred versions contained therein.

The invention claimed is:

1. A reinforced containment system comprising:
an external container (100) that receives an internal container (200) where both are covered by a cover (300) attachable to the external container (100), wherein the external container (100) comprises inclined walls where the bottom has a smaller section with respect to the upper part, which defines an entrance whose perimeter includes a load frame (101) as well as edge columns (102) on each of the lateral edges that extend from the top to the bottom of the external container (100), and a bottom wall (103) from which load columns (104) are erected asymmetrically on opposite sides of the external container (100), comprising these load columns (104) an outward extension from the external container (100) and a lower partial slot (106),
column receivers (105) in the form of cavities on the upper surface of the load frame (101), and an internal loading base (107) for the internal container (200) which encompasses the internal periphery of the load frame (101), positioned at a lower level relative to the column receivers (105) and supporting the upper periphery of the internal container (200) when it is inserted into the external container (100) and which the internal container (200) has a bottom (201) whose outer part coincides with the internal portion of the bottom wall (103) of the external container (100), as well as rounded edges and side walls (202) that rise from the bottom (201) with a slope parallel to the side walls of the external container (100), further comprising a support frame (203) that aligns with the internal loading base (107), protruding or positioned at a higher level than the top of the load frame (101) when the internal container (200) is inserted into the external container (100) and which the cover (300) encompasses the outer periphery of the top of the external container (100) and comprises movable pressure closing means (301) on at least two of its sides, as well as a receiving base for the bottom of the external container (100) and an accommodation arrangement comprising an assemblable configuration with an insertion portion (305) and a receiving portion (306) on opposite sides of the cover (300).

2. The reinforced containment system according to claim 1, wherein on each side adjacent to the sides comprising an arrangement of load columns (104), the external container (100) comprises a lateral insertion arrangement (108) defined by a through slot (109) and a peripheral recess (110) to said through slot (109), allowing for a thinner wall in the external container (100) that is deformable for the insertion of a coupling portion of the internal container (200).

3. The reinforced containment system according to claim 1, wherein on each side adjacent to the sides comprising an arrangement of load columns (104), the external container (100) has a handle (111) near its upper part, which comprises a protrusion with an internal cavity starting from the bottom of the handle (111) with a U-section connected to the lateral face of the external container (100) and an upper slot (112) that runs through the load frame (101).

4. The reinforced containment system according to claim 3, wherein at last one of the handles (111) includes a slot (113) for inserting a tracking or monitoring device.

5. The reinforced containment system according to claim 1, wherein the load frame (101) comprises one or several locking plates (114) placed in one or more corners of the load frame (101) parallel to the top of the load frame (101), where these looking plates (114) include a through hole.

6. The reinforced containment system according to claim 1, wherein the bottom of the external container (100) comprises loading bases (115) that comprises an extrusion and are positioned in an area near each of the vertices where an edge column (102) is located, further comprising an anti-slip arrangement.

7. The reinforced containment system according to claim 1, wherein the lower middle part of the external container (100) has a plurality of central slots (116).

8. The reinforced containment system according to claim 1, wherein the external container (100) comprises load columns (104) that extend to an area near the middle height of the external container (100).

9. The reinforced containment system according to claim 1, wherein the internal container (200) is made of a food-grade polymeric material and covered by a removable liner seal attached with an adhesive means.

10. The reinforced containment system according to claim 1, wherein the internal container (200) comprises extrusions (204) on opposite faces centered on the corresponding side wall (202) and closer to the bottom of the internal container (200), coinciding with through slots (109) on the faces of the external container (100) and additionally, the extrusions (204) have a compressible configuration that allows them to deform towards the side wall (202) where they are located on the internal container (200), and the extrusions (204) also include an indicator means that identifies or signals the content of the internal container (200), which can be an adhesive means, a labeled or printed means, or even an indicator formed from the same material as the extrusions (204).

11. The reinforced containment system according to claim 10, wherein on opposite faces of the internal container (200) that do not have an extrusion (204), a load column arrangement (206) is incorporated from the top to the bottom of the internal container (200), where these can be inserted together with the body of the internal container (200) inside the external container (100).

12. The reinforced containment system according to claim 11, wherein the internal container (200) comprises load columns (206) that extend to an area near the middle height of the internal container (200).

13. The reinforced containment system according to claim 1, wherein the internal part of the cover (300) comprises a receiving guide (303) for a hermetic sealing means (304) that coincides with the top of the support frame (203) of the internal container (200).

14. The reinforced containment system according to claim 1, wherein the cover (300) includes one or several locking plates (307) located at points coinciding with locking plates (114) of the external container (100).

15. The reinforced containment system according to claim 1, further comprising a tracking or monitoring systems in a slot (113) of the external container (100) that contains a network module, a sensor module, and a battery module.

* * * * *